United States Patent [19]
Mitsuishi et al.

[11] Patent Number: 5,774,702
[45] Date of Patent: Jun. 30, 1998

[54] INTEGRATED CIRCUIT HAVING FUNCTION BLOCKS OPERATING IN RESPONSE TO CLOCK SIGNALS

[75] Inventors: Naoki Mitsuishi, Kodaira; Kenichi Ishibashi, Higashimurayama; Koichi Hashimura, Koganei, all of Japan

[73] Assignee: Hitachi, Ltd., Tokyo, Japan

[21] Appl. No.: 561,728

[22] Filed: Nov. 22, 1995

[30]     Foreign Application Priority Data

Nov. 22, 1994  [JP]  Japan .................................... 6-312430
Oct.  6, 1995  [JP]  Japan .................................... 7-286599

[51] Int. Cl.⁶ ........................................................ G06F 1/06
[52] U.S. Cl. ............................................................ 395/556
[58] Field of Search .................................... 395/556, 559

[56]               References Cited

U.S. PATENT DOCUMENTS

| | | | |
|---|---|---|---|
| 5,115,503 | 5/1992 | Durkin ..................................... | 395/556 |
| 5,432,468 | 7/1995 | Moriyama et al. ................. | 395/556 X |
| 5,479,644 | 12/1995 | Hongo .................................... | 395/556 |
| 5,479,648 | 12/1995 | Barbera et al. ...................... | 395/556 X |
| 5,537,581 | 7/1996 | Conary et al. .......................... | 395/556 |
| 5,560,017 | 9/1996 | Barrett et al. .......................... | 395/556 |
| 5,586,308 | 12/1996 | Hawkins et al. ....................... | 395/556 |

FOREIGN PATENT DOCUMENTS

| | | |
|---|---|---|
| 3-058207 | 3/1991 | Japan . |
| 3-286213 | 12/1991 | Japan . |
| 5-081447 | 4/1993 | Japan . |

*Primary Examiner*—Thomas M. Heckler
*Attorney, Agent, or Firm*—Loudermilk & Associates

[57]               ABSTRACT

A semiconductor integrated circuit comprising a clock pulse generator, peripheral function blocks and bus master modules. The peripheral function blocks are commonly supplied with a first system clock signal of a constant frequency generated on the basis of the output from the clock pulse generator. The bus master modules are fed with a second system clock signal generated on the basis of the pulse generator output. The frequency of the second system clock signal is variable and lower than that of the first system clock signal. The function blocks supplied with the first system clock signal are connected to a data bus separate from the one connected to the function blocks fed with the second system clock signal.

29 Claims, 32 Drawing Sheets

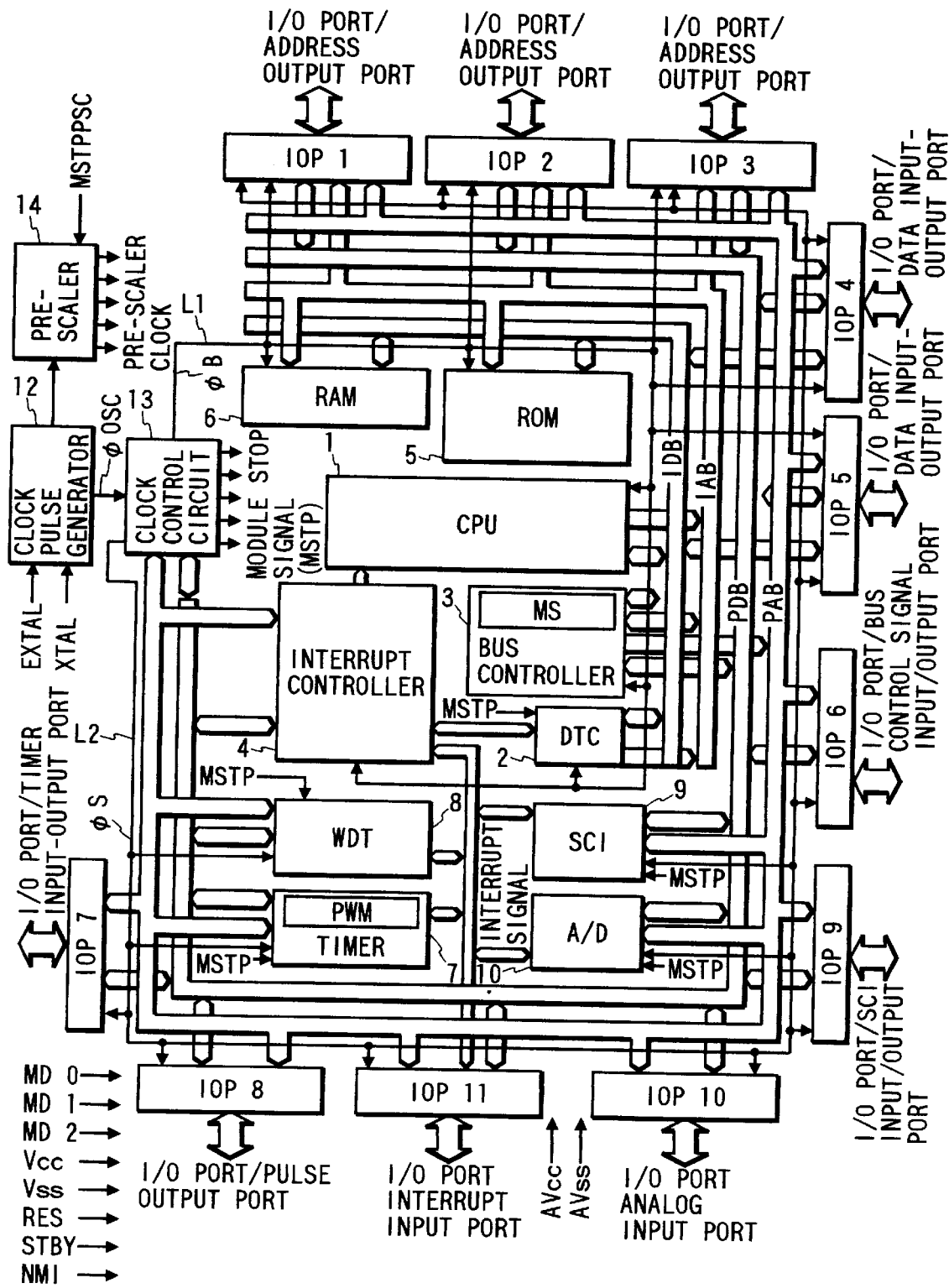

| MSME | CKS 1 | CKS 0 | φ B |
|---|---|---|---|
| 0 | - | - | φ OSC |
| 1 | 0 | 0 | φ OSC |
| 1 | 0 | 1 | φ OSC/2 |
| 1 | 1 | 0 | φ OSC/4 |
| 1 | 1 | 1 | φ OSC/8 |

FIG. 11(A)

CLOCK CONTROL REGISTER 132

| BIT: | 7 | 6 | 5 | 4 | 3 | 2 | 1 | 0 |
|---|---|---|---|---|---|---|---|---|
| | SSBY | - | - | - | - | MSME | CKS 1 | CKS 0 |
| INITIAL VALUE: | 0 | 0 | 0 | 0 | 0 | 0 | 0 | 0 |
| R/W: | R/W | - | - | - | - | R/W | R/W | R/W |

FIG. 11(B)

MODULE STOP CONTROL REGISTER 133

| BIT: | 7 | 6 | 5 | 4 | 3 | 2 | 1 | 0 |
|---|---|---|---|---|---|---|---|---|
| | MSTP 7 | MSTP 6 | MSTP 5 | MSTP 4 | MSTP 3 | - | - | - |
| INITIAL VALUE: | 1 | 1 | 1 | 1 | 1 | 0 | 0 | 0 |
| R/W: | R/W | R/W | R/W | R/W | R/W | R/W | - | - |

FIG. 12(A)

| BIT 7 | DESCRIPTION |
|---|---|
| MSTP 7 | |
| 0 | DTC OPERATION ENABLED STATE    (INITIAL VALUE) |
| 1 | DTC MODULE STOPPED STATE |

FIG. 12(B)

| BIT 6 | DESCRIPTION |
|---|---|
| MSTP 6 | |
| 0 | TIMER OPERATION ENABLED STATE    (INITIAL VALUE) |
| 1 | TIMER MODULE STOPPED STATE |

FIG. 12(C)

| BIT 5 | DESCRIPTION |
|---|---|
| MSTP 5 | |
| 0 | WDT OPERATION ENABLED STATE    (INITIAL VALUE) |
| 1 | WDT MODULE STOPPED STATE |

FIG. 13(A)

| BIT 4 | DESCRIPTION | |
|---|---|---|
| MSTP 4 | | |
| 0 | SCI OPERATION ENABLED STATE | (INITIAL VALUE) |
| 1 | SCI MODULE STOPPED STATE | |

FIG. 13(B)

| BIT 3 | DESCRIPTION | |
|---|---|---|
| MSTP 3 | | |
| 0 | A/D CONVERTER OPERATION ENABLED STATE | (INITIAL VALUE) |
| 1 | A/D CONVERTER MODULE STOPPED STATE | |

FIG. 14(A)

| BIT 7 | DESCRIPTION | |
|---|---|---|
| SSBY | | |
| 0 | CHANGE TO SLEEP STATE AFTER SLEEP INSTRUCTION IS EXECUTED | (INITIAL VALUE) |
| 1 | CHANGE TO STANDBY STATE AFTER SLEEP INSTRUCTION IS EXECUTED | |

FIG. 14(B)

| BIT 2 | DESCRIPTION | |
|---|---|---|
| MSME | | |
| 0 | MEDIUM-SPEED MODE DISABLED (ALWAYS $\phi B = \phi OSC$) | (INITIAL VALUE) |
| 1 | MEDIUM-SPEED MODE ENABLED | |

FIG. 14(C)

| BIT 1 | BIT 0 | DESCRIPTION | |
|---|---|---|---|
| CKS 1 | CKS 0 | | |
| 0 | 0 | $\phi B = \phi OSC$ | (INITIAL VALUE) |
| 0 | 1 | $\phi B = \phi OSC/2$ | |
| 1 | 0 | $\phi B = \phi OSC/4$ | |
| 1 | 1 | $\phi B = \phi OSC/8$ | |

FIG. 28(A)

| BIT: | 7 | 6 | 5 | 4 | 3 | 2 | 1 | 0 |
|---|---|---|---|---|---|---|---|---|
| | SSBY | — | — | — | PHIS | MSME | CKS 1 | CKS 0 |
| INITIAL VALUE: | 0 | 0 | 0 | 0 | 0 | 0 | 0 | 0 |
| R/W: | R/W | — | — | — | R/W | R/W | R/W | R/W |

FIG. 28(B)

| BIT 3 PHIS | DESCRIPTION |
|---|---|
| 0 | φS OUTPUT FROM φ TERMINAL (INITIAL VALUE) |
| 1 | φB OUTPUT FROM φ TERMINAL |

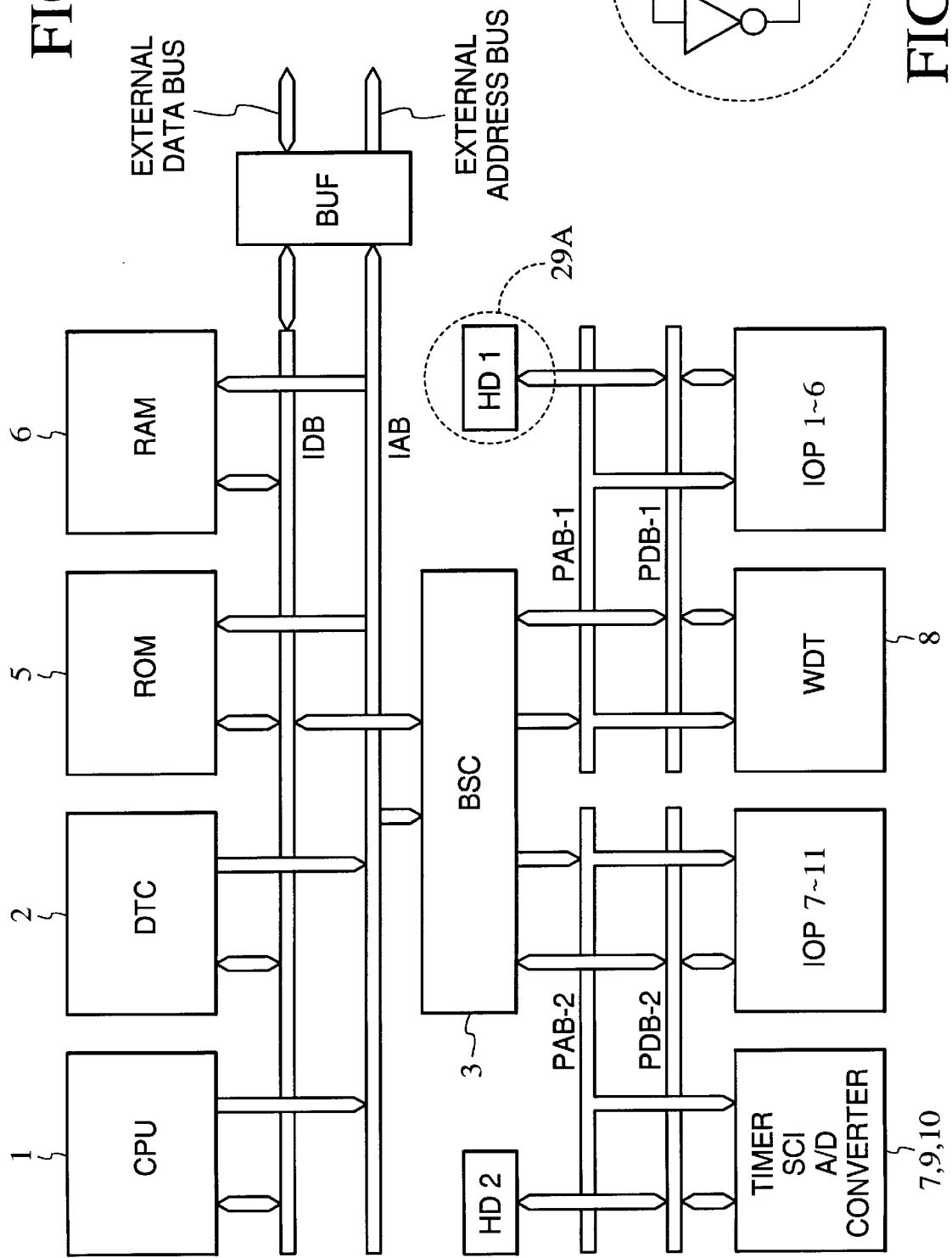

INTEGRATED CIRCUIT HAVING FUNCTION BLOCKS OPERATING IN RESPONSE TO CLOCK SIGNALS

BACKGROUND OF THE INVENTION

The present invention relates to a semiconductor integrated circuit having a plurality of function blocks operating in synchronism with clock signals. More particularly, the invention relates to a single-chip microcomputer operating at a reduced rate of power consumption.

The function blocks of a typical single-chip microcomputer operate with reference to a system clock signal $\phi$, as described in "H8/3048 Series Hardware Manual" issued by Hitachi, Ltd. in March 1994 (pp. 607–632). Such a system clock signal $\phi$ originates from an external clock signal input through an external clock input terminal (EXTAL) mounted on the single-chip microcomputer, or from an external source such as a crystal or ceramic oscillator connected to an oscillation terminal (EXTAL, XTAL) attached to the microcomputer. Japanese Patent Laid-Open NO. Hei 3-286213 discloses an example in which the function blocks of a microcomputer are each supplied with a unique clock signal. Japanese Patent Laid-Open No. Hei 5-81447 reveals a microcomputer comprising a CPU (central processing unit) and its peripheral circuits, the peripheral circuits being each furnished with a clock signal divider and clock selection means. Japanese Patent Laid-Open No. Hei 3-58207 discloses techniques whereby the output of an oscillation circuit is divided by a divider into a plurality of clock signals, one of the divided clock signals being selected for use as the system clock signal.

SUMMARY OF THE INVENTION

The inventors of the present invention studied the system clock signals of semiconductor integrated circuits such as single-chip microcomputer in the following aspects:

The frequency of the system clock signal $\phi$ may be selected typically from two alternatives: the same frequency as that of the source oscillator, or the frequency obtained by dividing the source oscillation (through the so-called gear function). Where the gear function is in use, it is preferable to switch frequencies of the system clock signal in keeping with what needs to be processed by the CPU. This feature is preferred in view of minimizing power dissipation of the single-chip microcomputer as a whole. Suppose that two setups are compared: one in which the source oscillation is always divided in two for use as the system clock signal, the other in which the frequency of the source oscillation is halved in advance for use as the system clock signal (i.e., its frequency being the same as that of the source oscillation). In the comparison above, if the frequency of the source oscillation is equalized for both setups, the frequency of the system clock signal in the former setup is twice as high as that in the latter setup. That is, the current consumed by the source oscillator in the former setup is twice as large as in the latter setup.

Meanwhile, another problem arises where frequencies of the system clock signal are switched halfway through operation in keeping with what is processed by the CPU. For example, suppose that the system clock signal $\phi$ is used as the reference clock for a serial communication interface (SCI) and that the division ratio of the system clock signal is 1/2. In that case, the bit rate or baud rate for the SCI in data transmission and reception is halved. This can disable the communication capability especially where a start-stop transmission system is in place. To avert the above problem requires altering the bit rate or baud rate setting for the SCI when frequencies of the system clock signal are switched, so that the switched system clock signal will be in line with the altered bit rate or baud rate. This means that the switching of the system clock signal frequency must take place while the SCI remains inactive.

Likewise, where the system clock signal is used as the clock source in ordinary timer applications, halving the frequency of the system clock signal doubles its period. Unless the timer setting is changed correspondingly, the absolute elapsed time on the timer would differ. Similar setting changes also need to be carried out on most peripheral circuits or functions other than the SCI and timers. The burdens on programming which stem from the need to make the changes are not negligible.

Similar consideration must be made where the division ratio of the system clock signal is changed from 1/2 to 1/1 so as to raise the frequency of the system clock signal. Raising the system clock signal frequency typical involves the CPU getting readied for high-speed processing. In such cases, having to execute necessary setting changes on most of the peripheral functions would result in huge time losses defeating the initial purpose of addressing the situation where high-speed processing is needed.

Japanese Patent Laid-Open No. Hei 3-286213 cited above shows that the function blocks of the microcomputer are each provided with a specific clock signal whose division ratio is set independently. It follows that in the above disclosure, changing the division ratio of the clock signal for a given function block leaves the other function blocks unaffected. This reduces the burdens on programming resulting from necessary changes.

However, the setup in which the function blocks are each furnished with an independent clock signal necessitates lengthening the total clock signal wiring. In other words, the wiring capacity is necessarily increased. Since current dissipation is expressed as the total sum of signal line capacity (C), voltage (V) and frequency (f) (i.e., $\Sigma C.V.f$), the current dissipated as it flows through the elongated clock wiring increases proportionately. Because the clock signal has the highest frequency (f) within the microcomputer, the concomitant current dissipation is not negligible. At least, the above scheme is not conducive to reducing power dissipation.

Where each of the function blocks of the microcomputer operates at a given frequency division ratio, a suitable interface needs to be established between any two blocks. In that case, it is difficult to determine that clock signal phase for one block to which the leading edge of the clock signal for the other block corresponds. That in turn makes it difficult to allocate the signal setup time and hold time; the interface between the blocks is necessarily asynchronous. The logic design of the asynchronous interface is complicated, and the logic scale associated with such an interface is large.

Where clock signal switchover is executed mainly on a software basis, certain events such as a reset and predetermined interrupt requests requiring the high-speed processing by the CPU are recognized as interruptions. Such interruptions are handled by an interruption handling routine, wherein frequency division ratios of the system clock signal are switched before the processing requested by the event is carried out. Under this scheme, the duration from the time an event occurs until the requested processing is performed is prolonged, which is not desirable.

It is therefore an object of the present invention to provide a semiconductor integrated circuit that consumes less power with respect to the system clock signal.

It is another object of the invention to provide a semiconductor integrated circuit capable of allowing the operating speed of internal function blocks such as the CPU to be variable while reducing the burdens on programming concomitant with the capability.

It is a further object of the invention to provide a semiconductor integrated circuit for reducing the time period required from the time a certain event occurs until the processing requested by the event is carried out.

It is an even further object of the invention to provide a semiconductor integrated circuit for facilitating the interface between function blocks of which the supplied system clock signals differ in frequency.

These and other objects, features and advantages of the invention will become more apparent upon a reading of the following description and appended drawings.

Major features of the invention disclosed in this specification are outlined below.

(1) The inventive semiconductor integrated circuit comprises: a clock pulse generator (12, in FIG. 1); a second clock signal line (L2) for commonly supplying to a plurality of function blocks a second system clock signal ($\phi$S) of which the frequency is generated on the basis of the output from the clock pulse generator (12); a clock control circuit (13) for generating a first system clock signal ($\phi$B) of which the frequency division ratio is made selectable with respect to the output from the clock pulse generator (12) and of which the frequency is lower than that of the second system clock signal; and a first clock signal line (L1) for supplying to predetermined function blocks the first system clock signal generated by the clock control circuit (13).

(2) The function blocks to which the first system clock signal is fed via the first clock signal line are regarded as bus masters (1 and 2). Acting as one of the bus masters in a data processor such as a microcomputer, the CPU frequently activates bus cycles in which instructions and data are fetched mostly. Because the CPU turns on bus cycles frequently, attempts to reduce the power consumption by the semiconductor integrated circuit should preferably involve supplying such bus masters with a system clock signal whose frequency division ratio is variable.

(3) The function blocks to which the second system clock signal is fed via the second clock signal line are regarded as bus slaves (7, 8, 9 and 10). Where the frequency of the system clock signal for the bus masters is changed, this arrangement keeps constant the bit rate or baud rate for the serial communication interface, the timing cycle on the timer and other related settings. Thus there is no need for design changes to be made on these peripheral function blocks.

(4) The clock control circuit (13) is furnished with register means (132) to which the bus masters are allowed to set information for selecting the frequency division ratio of the first clock signal ($\phi$B). This allows the bus masters such as the CPU to select a desired division ratio.

(5) The data bus is divided into two parts: a first internal data bus (IDB) connected to the function blocks which operate as the bus masters and to which the first system clock signal ($\phi$B) is supplied via the first clock signal line; and a second internal data bus (PDB) connected to the function blocks which operate as the bus slaves and to which the second system clock signal ($\phi$S) is fed via the second clock signal line. When any of the bus slaves connected to the second internal data bus is accessed by one of the bus masters connected to the first internal data bus, the first internal data bus is coupled to the second internal data bus by a bus controller (3). The second internal data bus comprises holding circuits (HD1 and HD2) which hold the status of the bus when the outputs from the connected function blocks are all in the high-impedance state, the holding circuits allowing the bus status to be changed when data is to be written to or read from any of the connected function blocks. When the function blocks such as the CPU that frequently starts bus cycles are connected to a data bus different from the one to which the bus slaves are connected, the burdens on the frequently accessed data bus are reduced. For the data bus whose access frequency is relatively low, the data over that data bus is retained by the holding circuits. That in turn reduces the number of times the data bus is charged and discharged, whereby power dissipation is lowered correspondingly.

(6) Each of the function blocks supplied with the first system clock signal ($\phi$B) has a non-overlapping signal generation circuit for generating a first non-overlapping two-phase clock signal ($\phi$1B, $\phi$2B) based on the first system clock signal. The function blocks fed with the second system clock signal ($\phi$S) each include a non-overlapping signal generation circuit (700) for generating a second non-overlapping two-phase clock signal ($\phi$1S, $\phi$2S) based on the second system clock signal. The first non-overlapping two-phase clock signal ($\phi$1B, $\phi$2B) partially coincides in phase with the second non-overlapping two-phase clock signal ($\phi$1S, $\phi$2S), the coincidence being exemplified by the leading edges of the signals $\phi$1S and $\phi$2B in FIG. 23. Each function block (e.g., bus slave in FIG. 19) fed with the second system clock signal changes the signal to be sent to any function block (e.g, bus master in FIG. 19) to which the first system clock signal is supplied, the signal change being effected in synchronism with the matched phase of the second non-overlapping two-phase clock signal (e.g., leading ledge of the signal $\phi$1S in state 3 of FIG. 23). With such interface specifications in effect, it is possible to secure a time period equivalent to at least one cycle of the second system clock signal ($\phi$S), from the time data is output across function blocks whose system clock signals are different, until the output data is admitted and latched. This feature facilitates the interface between the function blocks utilizing system clock signals of different frequencies. In other words, the design for interface timing is made easier.

(7) Each of the function blocks supplied with the first system clock signal ($\phi$B) has the non-overlapping signal generation circuit for generating the first non-overlapping two-phase clock signal ($\phi$1B, $\phi$2B) based on the first system clock signal. The function blocks fed with the second system clock signal ($\phi$S) each include the non-overlapping signal generation circuit (700) for generating the second non-overlapping two-phase clock signal ($\phi$1S, $\phi$2S) based on the second system clock signal. The low level period of the first-phase clock signal (e.g., $\phi$1B in FIG. 20) in the first non-overlapping two-phase clock signal coincides with the low level period of the first-phase clock signal (e.g., $\phi$1S in FIG. 20) in the second non-overlapping two-phase clock signal. The high level period of the second-phase clock signal (e.g., $\phi$2B in FIG. 20) in the first non-overlapping two-phase clock signal coincides with the high level period of the second-phase clock signal (e.g., $\phi$2S in FIG. 20) in the second non-overlapping two-phase clock signal. Whether the input and output of each function block are synchronized with the first or the second-phase clock signal, this arrangement makes it possible to secure a time period equivalent to at least one cycle of the second system clock signal ($\phi$S), from the time data is output across function blocks whose system clock signals are different, until the output data is admitted and latched. The arrangement thus facilitates the interface between the function blocks utilizing system clock signals of different frequencies. In other words, the design for interface timing is also made easier.

(8) The inventive semiconductor integrated circuit also includes output circuits (e.g., IOP60 and IOP61 in FIGS. 26 and 27) for selectively outputting the first system clock signal ($\phi$B) and second system clock signal ($\phi$S) to the outside, and logic circuits (1300, 1301 and 1302) for forcibly setting the clock input lines (1310 and 1311) of the output circuits to a predetermined level when the outputs from these output circuits are not selected. With this arrangement in use, the clock input lines are prevented from getting charged or discharged when the system clock signals need not be output to the outside, whereby power dissipation is reduced.

(9) The invention also envisages suppressing the generation of internal clock signals individually inside a plurality of function blocks. To achieve this object, the inventive semiconductor integrated circuit includes a plurality of function blocks (7, 8, 9 and 10) which receive the system clock signal ($\phi$S) stemming from the output of the clock pulse generator (12), which generate internal clock signals ($\phi$1S and $\phi$2S) of a plurality of phases synchronized with the received system clock signal, and which operate in accordance with the internal clock signals thus generated. The semiconductor integrated circuit also includes register means (133) for retaining in an updatable manner information for inhibiting the generation of internal clock signals individually in each of the function blocks. The function blocks further comprise first internal clock control means (700) for retaining the internal status by stopping in a predetermined state the change of a given internal clock signal when the generation of that internal clock signal is inhibited in accordance with the corresponding information in the register means. All these components are formed on a single semiconductor substrate. With this feature in effect, the change of internal clock signals is stopped in the inactive function blocks inside. This reduces power dissipation stemming from the currents being charged or discharged when the clock signals are changed unnecessarily. The fact that the internal status is retained while the internal clock signals are being stopped eliminates the need for setting anew the internal circuits when the signals are reactivated.

(10) Each of the function blocks further includes second internal clock control means (710) for generating internal timing signals ($\phi$1-PWM and $\phi$2-PWM) based on the above internal clock signals ($\phi$1S and $\phi$2S) of a plurality of phases when the operation of the function block in question is selected, the second internal clock control means retaining the internal status by stopping in a predetermined state the change of the internal timing signals when the operation of the function block in question is not selected. As long as the operation of any function block is not selected, the power consumption by the circuits for receiving the internal timing signals ($\phi$1S and $\phi$2S) in that block is suppressed. Because the internal status is retained when the function block operation is unselected with any change of the internal timing signals being stopped, the internal circuits need not be set anew when their operation is resumed.

(11) The internal timing signals ($\phi$1-PWM and $\phi$2-PWM) are non-overlapping two-phase timing signals. The circuits activated upon receipt of the timing signals are composed of two circuits: a dynamic circuit (23) operating dynamically on receiving the first-phase timing signal, and a static circuit (21) which is connected serially to the dynamic circuit and which operates upon receipt of the second-phase timing signal. Of the non-overlapping two-phase timing signals ($\phi$1-PWM and $\phi$2-PWM), the timing signal having the phase with the greater duty factor is supplied to the dynamic circuit; the timing signal having the phase with the smaller duty factor is fed to the static circuit. This arrangement relatively shortens the latch time and widens the range of frequency reductions even where the time for the dynamic circuit to hold its output load capacity is finite. Compared with the case where both circuits are static latch circuits, the arrangement reduces the physical scale of the circuits involved.

(12) The invention further envisages forcibly changing the frequency of the system clock signal in accordance with the detected event. To achieve this object, the inventive semiconductor integrated circuit comprises: a single or a plurality of function blocks (1 and 2); an event detection circuit (4) for detecting any of the internal and external events requesting any of the first function blocks to perform exception handling and for outputting to the corresponding first function block a signal calling for exception handling; a single or a plurality of function blocks (7, 8, 9 and 10) for generating events requesting the first function blocks to carry out exception handling; and selection control means (131 and 132) for making variably selectable the frequency of the first system clock signal ($\phi$B) supplied to the first function blocks and to the event detection circuit, and for forcibly setting the selected frequency to a predetermined state in accordance with specific events detected by the event detection circuit. When a specific event occurs, the selection control means forcibly sets the selected frequency to a predetermined state (e.g., the highest frequency selected state) regardless of the currently established frequency of the system clock signal being low. This feature shortens the time that elapses upon occurrence of an event before the appropriate processing of that event is carried out.

(13) The selection control means in the semiconductor integrated circuit comprises first register means (132) for retaining in an updatable manner control information for frequency selection, and a selector (131) for selecting the frequency of the first system clock signal in accordance with the control information held in the first register means. The first register means includes a first storage area (MSME) and a second storage area (CKS1 and CKS0). The first storage area designates selection of a specific frequency ($\phi$OSC) in a first state (=0), the area being forcibly set to the first state upon detection of a specific event by the event detection circuit. The second storage area accommodates information for selecting the frequency that is considered significant when the first storage area is in a second state (MSME=1). With this arrangement in use, the first storage area (MSME) need only be set forcibly to the first state (=0) when a specific event occurs. This simplifies the process of forcibly setting the system clock signal to a particular frequency.

(14) The first function blocks above may include the CPU (1). Given a signal from the event detection circuit calling for exception handling, the CPU sets the first storage area to the second state (MSME=1) when returning from the exception handling. It follows that when returning from the requested exception handling to the process that was in effect upon request or to the process next thereto, the CPU need not save and restore the value of the second storage area (CKS1 and CKS0).

(15) The first function blocks above may also include a data transfer controller (2). Given a signal from the event detection circuit calling for exception handling, the data transfer controller eventually outputs a signal (1325) designating the end of the exception handling. The logic circuits may set the first storage area to the second state (MSME=1) upon activation of the signal designating the end of the exception handling. This eliminates entirely the need for the CPU or software to take measures to restore the system clock signal.

(16) The second function blocks (7, 8, 9 and 10) include second register means (133) for generating internal clock signals ($\phi 1S$ and $\phi 2S$) based on the second system clock signal ($\phi S$) of which the frequency is constant and which is fed to the second function blocks. The second register means further operates in accordance with the internal clock signals thus generated and retains in an updatable manner information for inhibiting the generation of the internal clock signals individually in each of the second function blocks. When a specific event (e.g, reset) is detected by the event detection circuit, the second register means is initialized to the state that inhibits the generation of the internal clock signals. This arrangement reduces power dissipation in the initial state brought about upon generation of specific events such as the reset.

(17) The invention further envisages utilizing control information paired with vectors such as interrupt vectors for forcibly changing the frequency of the system clock signal. To achieve this object, the inventive semiconductor integrated circuit comprises: a central processing unit (CPU 1); an event detection circuit for outputting to the CPU a signal calling for exception handling; CPU peripheral circuits (7, 8, 9 and 10); first register means (132) for selectably designating the frequency of the first system clock signal ($\phi B$) to be fed to the CPU and to the event detection circuit; and second register means (133) for retaining in an updatable manner information for inhibiting the generation of the internal clock signals individually in each of the peripheral circuits that operate upon receipt of the second system clock signal ($\phi S$). On receiving a request for exception handling from the event detection circuit, the CPU acquires the control information to be set to the first and second register means, from one of the areas (addresses 0, 4, 8 and 12 in FIG. 30) paired with the vector applicable to the request. This feature makes it possible to establish finely classified low power dissipation-oriented settings depending on the event type.

(18) Upon receipt of a request for exception handling from the event detection circuit (4), the CPU (1) above saves, for eventual return from the exception handling, the values of the first and second register means before the control information acquired from the area paired with the vector relevant to the request is set to the first and second register means. This provides for the need to return, upon completion of the requested exception handling, to the state in effect immediately before the event occurred.

(19) The invention further envisages getting a frequency divider in each function block to generate individually a pre-scaler clock signal of a low frequency division ratio which could conventionally be generated by a pre-scaler but which is not supplied therefrom. To achieve this object, the inventive semiconductor integrated circuit comprises: a clock pulse generator (12); a clock control circuit (13) for generating a system clock signal based on the output from the clock pulse generator; and a plurality of function blocks activated upon receipt of the system clock signal from the clock control circuit. Each function block requiring a clock signal of a relatively low frequency ratio ($\phi S/2$ in FIG. 6) apart from the system clock signal ($\phi S$) has a frequency divider (720) that divides the system clock signal. A plurality of function blocks requiring clock signals of relatively high frequency ratios ($\phi/8$, $\phi/16$) share a pre-scaler (14) that generates such clock signals and supplies the blocks therewith. This arrangement is provided in view of the fact that if a plurality of function blocks are supplied directly with clock signals of lower frequency division ratios, the components for clock signal transmission consume more power because the frequency division ratios involved are lower.

The semiconductor integrated circuit of the above constitution makes variable the frequency division ratio of the system clock signal fed to the function blocks such as the bus masters (thus the signal is also called the bus master clock signal), independent of the system clock signal supplied to the function blocks such as the peripheral circuits or bus slaves (therefore the signal is also called the peripheral clock signal). The above constitution allows the frequency division ratio to be set high in keeping with the operating state of the CPU or the like, whereby power dissipation is reduced.

Because the peripheral clock signal can be fixed, the bit rate or baud rate for the SCI and the timer period are kept constant even if the bus master clock signal is changed. Thus there is no need to alter settings of the peripheral function blocks when the frequency of the system clock signal to the CPU or the like is modified.

Since the peripheral function blocks operate less often than the bus masters, the blocks may be allowed to act only if a specific signal is received or may be inhibited in operation as needed. This further reduces power dissipation of the semiconductor integrated circuit. When the internal status is retained by the peripheral function blocks being inhibited from operation, these blocks can resume operation immediately after the operation is allowed to proceed.

With the invention, a clock signal such as the peripheral clock signal is shared by a plurality of function blocks. The capacity of the clock wiring in that case is smaller than if each of the function blocks is fed with an independent clock signal. The sharing of the clock signal among the blocks further contributes to reducing power dissipation.

The bus master clock signal is kept equal to or lower than the peripheral clock signal in speed, whereas the interface signal between the bus masters and the peripheral function blocks is synchronized illustratively with the common points of change shared by the bus master clock signal and peripheral clock signal. This setup provides a simplified synchronous interface between the bus masters and the peripheral function blocks. The simplified interface in turn reduces the logical scale of the semiconductor integrated circuit, contributing to lessening the manufacturing costs thereof and lowering the power dissipation thereby.

BRIEF DESCRIPTION OF THE DRAWINGS

FIG. 2 is a block diagram of a variation of the single-chip microcomputer in FIG. 1;

FIGS. 11 (A) and 11(B) are views illustrating a typical constitution of a module stop control register for controlling module stop mode as well as a typical constitution of a clock controller for controlling medium-speed mode;

FIGS. 12(A) through 12(C) are explanatory views of MSTP7 through MSTP5 in the module stop control register;

FIGS. 13(A) and 13(B) are explanatory views of MSTP4 and MSTP3 in the module stop control register;

FIGS. 14(A) through 14(C) are explanatory views of the clock control register;

FIGS. 28 (A) and 28(B are explanatory views of a PHIS bit required he structure of FIG. 27;

FIG. 29 is a schematic block diagram showing how the internal bus structure of the single-chip microcomputer is divided alternatively;

DESCRIPTION OF THE PREFERRED EMBODIMENTS

Function Blocks of the Single-Chip Microcomputer

Figure 1:
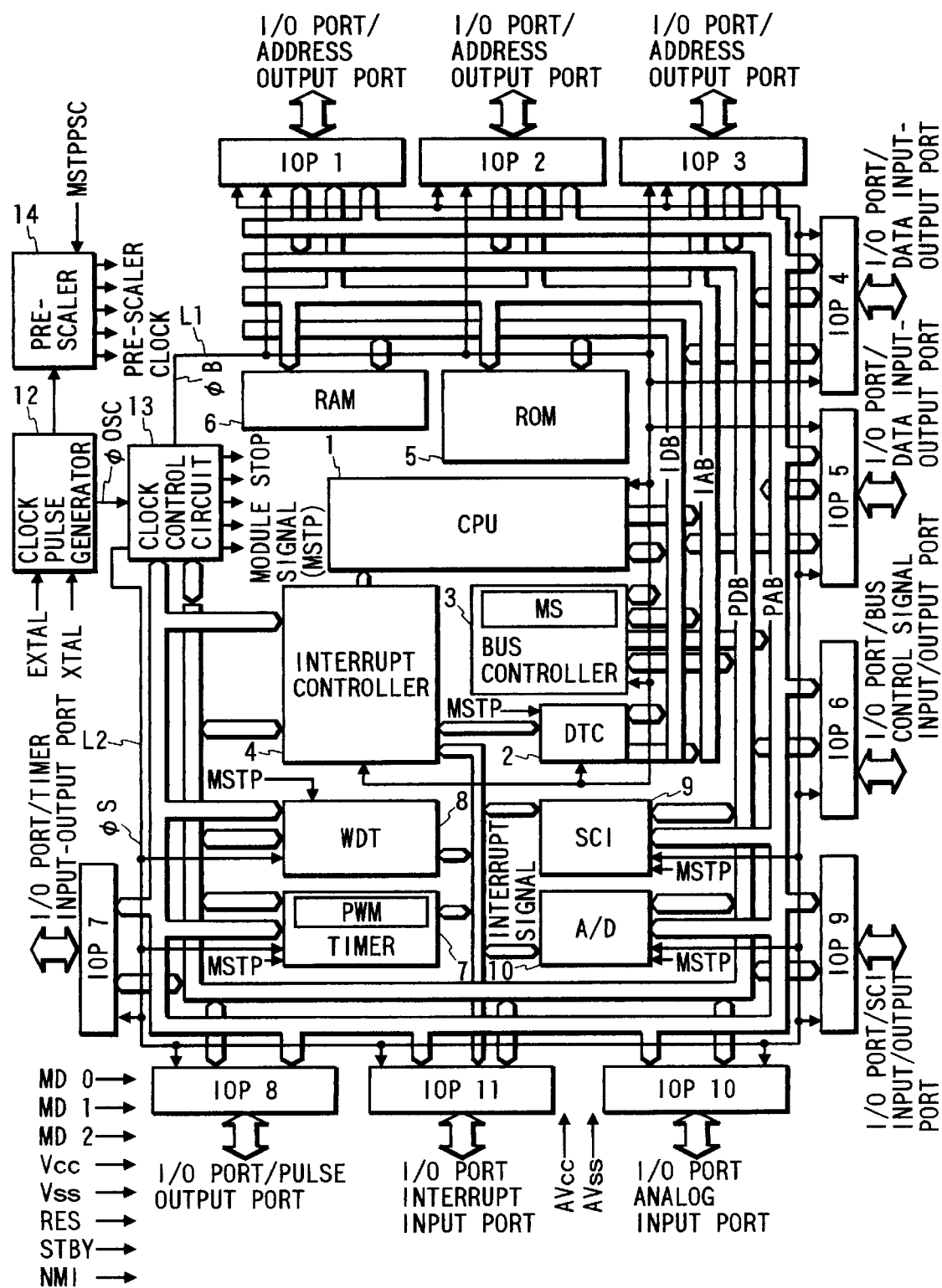
FIG. 1 is a block diagram of a single-chip microcomputer produced as a semiconductor integrated circuit embodying the invention.

FIG. 1 is a block diagram of a single-chip microcomputer produced as a semiconductor integrated circuit embodying the invention. The single-chip microcomputer is composed of function blocks (also called circuit modules) such as a central processing unit (CPU) 1, a data transfer controller (DTC) 2, a bus controller (BSC) 3, an interrupt controller 4, a read-only memory (ROM) 5, a random access memory (RAM) 6, a timer 7, a watch dog timer (WDT) 8, a serial communication interface (SCI) 9, an analog-digital (A/D) converter 10, a first through an eleventh I/O port IOP1 through IOP11, a clock pulse generator (CPG) 12, a clock control circuit 13 and a pre-scaler 14. These functions blocks are formed illustratively by known CMOS semiconductor integrated circuit fabrication techniques on a single semiconductor substrate typically made of single crystal sillicon. The timer 7 is typically made up of a PWM (pulse width modulation) timer. Where a PWM timer is specifically referred to in connection with the timer 7, the component may be called a PWM timer 7.

The above single-chip microcomputer is furnished with a plurality of external terminals including ground level (Vss), supply voltage level (Vcc), analog ground level (AVss) and analog supply voltage level (AVcc) power terminals. The other external terminals include dedicated control terminals such as reset (RES), standby (STBY), mode control (MD0–MD2), clock input (EXTAL, XTAL) and unmaskable interrupt (NMI) terminals.

Internal Bus Structure of the Single-Chip Microcomputer

The function blocks shown in FIG. 1 are interconnected by the internal bus structure. The internal bus structure is made up of an address bus, a data bus, and a control bus over which a read signal, a write signal and a bus size signal are transferred. The internal address bus comes in two types, IAB and PAB; the internal data bus is also of two types, IDB and PDB. The buses IAB, PAB, IDB and PDB are interfaced to one another by the bus controller 3.

Either of the CPU1 and data transfer controller (DTC) 2, both capable of acting as bus masters, is given selectively the right to use the internal data bus IDB and the internal address bus IAB. The bus controller 3 determines which of the two components is to be awarded the bus right. The bus controller 3 includes a function block selection circuit MS for verifying the selected function block by interpreting the information placed onto the internal address bus IAB. The function block selection circuit MS identifies the function block to be selected by an address signal, and activates a module selection signal (not shown) corresponding to the function block thus identified. In accordance with te information interpreted by the function block selection circuit MS, it is determined whether the IAB and PAB as well as the IDB and PDB are to be interconnected. Specifically, if the function block to be accessed is a circuit module connected to the internal buses IAB and IDB, the bus controller 3 will not connect the internal buses PAB and PDB to the buses IAB and IDB. On the other hand, if the function block to be accessed is a circuit module connected to the internal buses PAB and PDB, the bus controller 3 connects the internal buses PAB and PDB to the buses IAB and IDB.

In this specification, the bus master refers to a circuit module capable of either outputting or receiving an address to or from a bus and also capable of outputting and inputting data; the bus slave stands for a circuit module incapable of outputting an address to a bus but capable of receiving an address therefrom and of inputting and outputting data.

The internal buses IAB and IDB are connected to the CPU 1, data transfer controller (DTC) 2, ROM 5, RAM 6 and bus controller 3. Furthermore, the internal address bus IAB is connected to the I/O ports IOP1 through IOP3 for connection to an external address bus, not shown. The internal data bus IDB is connected to the I/O ports IOP4 and IOP5 for connection to an external data bus, not shown. The internal buses PAB and PDB are connected to the bus controller 3, timer 7, watch dog timer 8, serial communication interface (SCI) 9, analog-digital (A/D) converter 10, interrupt controller 4, and I/O ports IOP1 through IOP11. The bus controller 3 provides bus interface control over the internal buses PAB and PDB as they are used for external access via the I/O ports IOP1 through IOP11.

The above scheme of dividing the internal bus structure into two portions, IAB and IDB on the one hand and the PAB and PDB on the other, takes into account the fact that the circuit modules frequently operated for bus access are arranged to share buses of relatively low loads. During bus access by the CPU 1, the number of instruction fetches is increased compared with the data access count. To enhance the processing performance by the CPU 1 requires fetching instructions in accordance with what needs to be processed, with the result that the instruction fetch frequency per unit time becomes high. With such aspects taken into account, the embodiment separates from other circuit modules the CPU 1 and data transfer controller (DTC) 2 acting as bus master modules, the RAM 6 for providing a work area for use by the CPU 1, and the ROM 5 for accommodating programs. The components thus separated are connected to the internal buses IAB and IDB of relatively low loads.

During bus access by the CPU 1, as mentioned, the number of instruction fetches is increased compared with the data access count. To enhance the processing performance by the CPU 1 requires fetching instructions in accordance with what needs to be processed. This means that the instruction fetch frequency per unit time becomes high. In most cases, the instructions of the CPU 1 are placed in the built-in ROM 5 or in an external memory, not shown. Where the program memory is located outside, the internal buses IAB and IDB may still be used via the I/O ports IOP1 through IOP5. That is, there is no need to use the internal buses PAB and PDB which have relatively high loads because they are connected with many circuit modules unrelated to instruction fetches.

While the internal buses PAB and PDB are not in use, the preceding values in effect on the buses are preserved. Illustratively, each of the signal lines constituting the internal bus PDB is provided with a static latch circuit. When the internal bus PDB is not used, each circuit module whose output terminal is connected to the bus has its output terminal placed in the high output impedance state. This allows the static latch circuits to retain the preceding value of the bus PDB. In that case, the current consumed by the PDB is substantially zero because the signal state remains unchanged. As illustrated in FIG. 1, the buses PAD and PDB are connected to many components and thus have a large wiring capacity. Thus if the frequency of signal changes on these buses is reduced, i.e., if the buses are connected to circuit modules of relatively low operation frequencies, then power consumption by the components involved is reduced. For this reason, the buses IAB and IDB of relatively low loads are shared by the circuit modules frequently operated for bus access.

Clock Pulse Feeding Components of the Single-Chip Microcomputer

The single-chip microcomputer embodying the invention operates in synchronism with the system clock signal generated by the clock pulse generator 12 and clock control circuit 13. Each of the function blocks making up the microcomputer works in synchronism with non-overlapping two-phase clock signals formed on the basis of that system clock signal. With this embodiment, the system clock signal comes in two types, $\phi B$ and $\phi S$. For reasons of expediency, these two system clock signals $\phi S$ and $\phi B$ may be generically referred to as the system clock signal $\phi$. Likewise, non-overlapping two-phase clock signals $\phi 1S$ and $\phi 2S$ based on the system clock signal $\phi S$ as well as non-overlapping two-phase clock signals $\phi 1B$ and $\phi 2B$ based on the system clock signal $\phi B$ may be generically referred to as $\phi 1$ and $\phi 2$, respectively. The clock signal output by the clock pulse generator 12 is indicated as $\phi OSC$ in the drawings.

The system clock signal $\phi B$ is fed as the bus master clock signal illustratively to the CPU 1, data transfer controller 2, bus controller 3 and interrupt controller 4, as well as to the I/O ports IOP1 through IOP5 for interfacing with an external bus. In FIG. 1, L1 stands for the clock signal line for forwarding the system clock signal $\phi B$ to each relevant circuit module. The clock signal $\phi B$ is generated by the clock control circuit 13 dividing the clock signal $\phi OSC$. With this embodiment, the frequency division ratio is made selectable by the clock control circuit 13. The higher the frequency division ratio of the system clock signal $\phi B$, the lower the operation frequency for the circuit modules receiving that system clock signal, whereby the current consumption by the modules is reduced accordingly. In general, these circuit modules are always in operation. For example, the interrupt controller 4 must continuously look out for an interrupt request. Once an interrupt request occurs, the interrupt controller 4 must generate a predetermined transition state and request the CPU 1 and data transfer controller 2 to perform necessary processing. Thus when the operation frequency for these circuit blocks is controlled by use of the clock signal $\phi B$, the power dissipation in the entire single-chip microcomputer may be reduced as needed.

Another system clock signal $\phi S$ is supplied as the peripheral clock signal illustratively to the timer 7, watch dog timer 8, serial communication interface 9, A/D converter 10 and I/O ports IOP1 through IOP11. In FIG. 1, L2 denotes the clock signal line for feeding the system clock signal φS to each relevant circuit module.

As shown in FIG. 1, the clock signals are supplied to the function blocks with the exception of the ROM 5 and RAM 6. Thus the entire length of the clock signal wiring is considerable. As illustrated, the function blocks fed with the clock signal φB are located more or less close to one another, away from the function blocks supplied with the clock signal φS, the latter blocks being also located in like manner. This structure reduces the total wiring length for the clock signals involved. At least the total wiring length in the inventive structure is less than that of conventional cases in which all function blocks are each fed with an independent clock signal. Reducing the total length of the clock signal wiring contributes to lowering the parasitic capacity component of the wiring. Because the clock signal has a high signal-change frequency, power dissipation is lowered by reducing the capacity of the clock signal wiring (i.e., by shortening of the wiring).

The frequency of the system clock signal φB may be varied by a program suitably setting the frequency division ratio, as will be described later. The frequency of the system clock signal φS remains unchanged. The clock control circuit 13 supplies a clock control signal to the data transfer controller 2, timer 7, watch dog timer 8, serial communication interface 9 and A/D converter 10. The lock control signal is provided to enable and/or disable the clock signal operation (i.e., clock signal change) inside the function blocks referred to. This kind of clock control scheme is disclosed illustratively in Japanese Patent Laid-Open No. Sho 60-195631. However, the disclosed scheme fails to consider the operation of the function blocks in effect while the clock control signal is being stopped. Studies by the inventors of this invention showed that the function blocks should preferably maintain their internal status when their clock signal is stopped. In the embodiment, these function blocks operate in synchronism with the non-overlapping two-phase clock signals φ1 and φ2 based on the system clock signal φS. Details of the function block operation synchronized with the clock signals will be described later with reference to FIGS. 3(A) through 3(C). In effecting the function block operation, the sequence circuit synchronized with the clock signal φ1 is made of a dynamic circuit and the sequence circuit in synchronism with the clock signal φ2 is constituted by a static circuit.

Stopping the Modules in the Single-Chip Microcomputer

How to stop the modules in the single-chip microcomputer will be outlined below (more detailed description later). The clock control circuit 13 supplies the data transfer controller 2, timer 7, watch dog timer 8, serial communication interface 9 and A/D converter 10 with a clock stop signal, i.e., a module stop signal (in FIG. 1, the module stop signal fed to each module is indicated generically as MSTP). Each function block receives as its specific signal the module stop signal MSTP from the clock control circuit 13. In the case of the serial communication interface (SCI) composed of a plurality of channels, each channel may be assigned its own module stop signal MSTP. Techniques to stop the clock signal individually in each of the function blocks are discussed illustratively in "H8/3048 Series Hardware Manual" (ibid., pp. 607–632) and Japanese Patent Laid-Open NO. Sho 60-195631. The watch dog timer 8, while in operation, invalidates the module stop signal it receives. The feature of invalidating the module stop signal is provided so that the watch dog timer 8 will not be stopped inadvertently while executing its function of watching out for anything unusual in the system. Details of this feature will be described later in detail. The publication "H8/3048 Series Hardware Manual" (ibid., pp. 607–632) says that when the clock signal is stopped, the function blocks fed with it are reset and need to have their internal registers set again upon resumption of operation. For example, a start-stop transmission type SCI is required to output a one-frame preamble upon resumption of its operation and is incapable of executing its function immediately when reactivated. The PWM timer 7 requires establishing a clock selection setting and a duty setting. In contrast, the embodiment of the invention causes the function blocks to retain their internal status while the clock signal is being stopped.

Adopting Clock-Synchronized Internal Memories

FIG. 2 is a block diagram of a variation of the single-chip microcomputer in FIG. 1. As opposed to the single-chip microcomputer in FIG. 1, what is shown in FIG. 2 is a circuit constitution in which the ROM 5 and RAM 6 operate in synchronism with a clock signal. Illustratively, the ROM 5 and RAM 6 of the microcomputer in FIG. 2 are fed with the clock signal φB, the same clock signal as that supplied to the CPU 1. When in synchronism with the clock signal of the CPU 1 and data transfer controller 2, the internal memories ROM 5 and RAM 6 operate at high speed. The RAM 6 operating in synchronism with the clock signal may be a clocked static RAM. The ROM 5 working in synchronism with the clock signal may be a mask ROM, EEPROM or a flash memory.

Internal Circuits of the Function Blocks

Figure 3A:
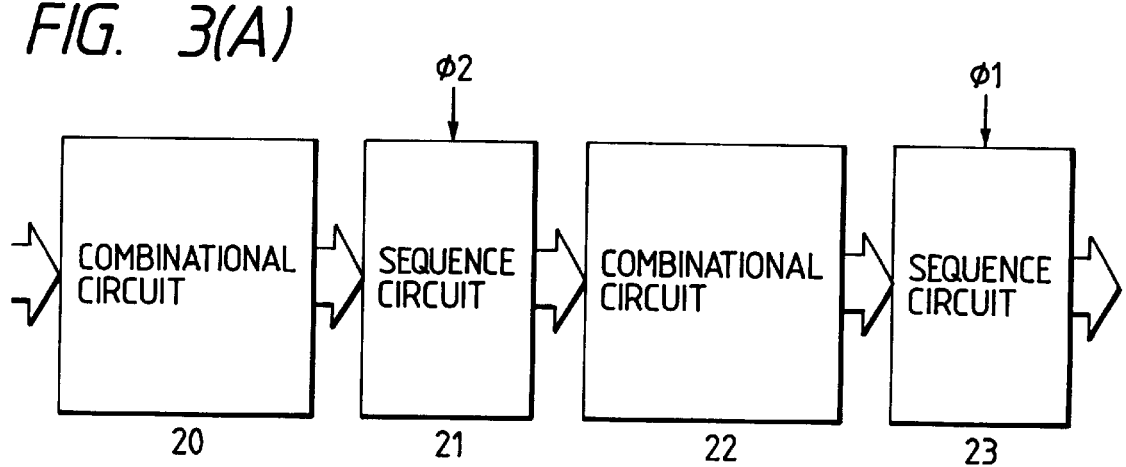
FIG. 3(A) is a view showing a typical logic circuit constitution each function block.

FIG. 3(A) is a view showing a typical logic circuit constitution of each function block. Basically, each logic circuit is composed of a combinational circuit 20, a sequence circuit 21 which receives as its input the output of the combinational circuit 20 and which operates in synchronism with the clock signal φ2, another combinational circuit 22 receiving as its input the output of the sequence circuit 21, and another sequence circuit 23 which receives as its input the output of the combinational circuit 22 and which operates in synchronism with the clock signal φ1. Alternatively, the signal from the sequence circuit 23 may be fed back to the combinational circuit 20 in a cyclic manner where necessary. Although not shown, the input signal from the outside is entered into one of the component circuits and the output signal is emitted from another component circuit.

Figure 3B:
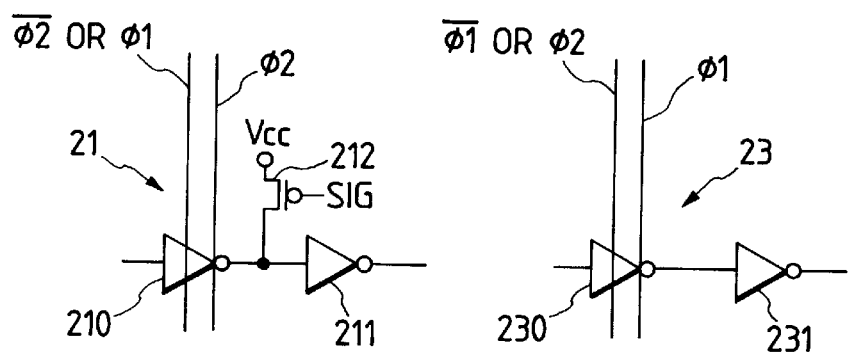
FIG. 3(B) is a schematic view depicting how sequence circuits are constituted by CMOS dynamic circuits.

FIG. 3(B) is a schematic view depicting how the sequence circuits 21 and 23 in FIG. 3(A) are constituted by CMOS dynamic circuits. Illustratively, the sequence circuit 21 is made up of a CMOS clocked inverter 210 and a CMOS inverter 211 connected in series; the sequence circuit 23 is constituted by a CMOS clocked inverter 230 and a CMOS inverter 231 also connected in series. In the sequence circuit 21, the clocked inverter 210 is enabled for output by the clock signal φ2 being brought High; in the sequence circuit 23, the clocked inverter 230 is enabled for output by the clock signal φ1 being driven High. A p-channel MOS transistor 212 in the sequence circuit 21 is turned on by a signal SIG being brought Low in a standby state. The activated transistor 212 forcibly inputs the supply voltage to the inverter 211, thereby retaining the preceding value. The signal SIG may be one similar to a generator stop signal 135 to be discussed later in connection with FIG. 9.

In the circuit constitution of FIG. 3(B), information is transmitted dynamically by charging and discharging the output load capacities of the clocked inverters 210 and 230. In this manner, using the two-phase non-overlapping clock signals φ1 and φ2 as well as the dynamic circuit constitution reduces the number of transistors incorporated and thereby decreases the physical scale of the semiconductor integrated circuit. This setup, however, retains data only for a finite time because it utilizes for data retention the charges accumulated in the load capacities that are prone to leaking currents. If the leak current is assumed to be constant for the setup retaining the High level, the retained data is expressed as V−it/C, where C stands for the capacity, V for the supply voltage, "i" for the leak current and "It" for the elapsed time. Over time, the voltage at the output terminal drops. If the threshold voltage for a CMOS circuit that receives such voltage is represented by Vth, the data can be retained only for the time given as C(V−Vth)/i or less. The data needs to be updated within that time period. In other words, the switching frequency of the switching elements such as the clocked inverters 210 and 230 must not be less than i/C(V−Vth). While the internal operation is inactive with the clock signal stopped, the switching frequency can not be made sufficiently high, and the data cannot be retained.

Where the data is desired to be retained with the clock signal stopped, it is conceivable that the sequence circuits 21 and 23 may be made up of static circuits instead of dynamic circuits. Static circuits contain more transistors than dynamic circuits and will increase the physical scale of the semiconductor integrated circuit. The greater the number of incorporated transistors, the greater the number of lines installed. Current consumption rises in proportion to the increased line count and transistor count.

Figure 3C:
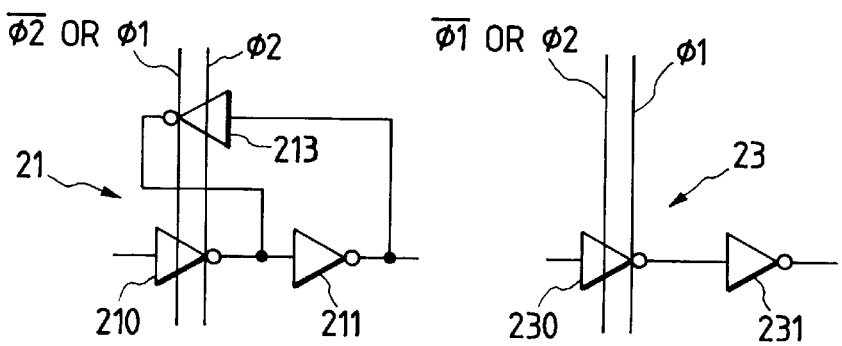
FIG. 3(C) is a schematic view indicating typical CMOS dynamic circuits for use in the single-chip microcomputer embodying the invention.

FIG. 3(C) is a schematic view indicating typical CMOS dynamic circuits for use in the single-chip microcomputer embodying the invention. In FIG. 3(C), the sequence circuit 23 synchronized with the clock signal $\phi 1$ is made up of a dynamic circuit, while the sequence circuit 21 synchronized with the clock signal $\phi 2$ is composed of a static circuit. In this static circuit, the inverter 211 is connected to a clocked inverter 213 in an inversely parallel manner, the clocked inverter 213 being enabled for output in its phase inverse to that of the clocked inverter 210. The inverter 231 in the output stage of the sequence circuit 23 is added there for logic polarity alignment and may be removed where appropriate. In the example of FIG. 3(C), the clock signal $\phi 1$ is driven High and the clock signal $\phi 2$ brought Low in a clock stopped state or in a standby state. In that state, the sequence circuit 21 latches the preceding input data and feeds it to the combinational circuit 22 located downstream, and the sequence circuit 23 is arranged to retain its preceding value. The standby state refers to a state in which, with the clock kept operating but with no specific event yet to take place, the preceding state is retained and operation is halted. Specific events, illustratively for the PWM timer 7, include a read and a write operation by the bus masters such as the CPU 1 and generation of a count-up clock signal, to be described later.

In FIG. 3(C), the dynamic circuit constituting the sequence circuit 23 includes six MOS transistors while the static circuit making up the sequence circuit 21 comprises 10 MOS transistors. In FIG. 3(B), the dynamic circuit constituting the sequence circuit 23 also includes six MOS transistors while the dynamic circuit making up the sequence circuit 21 comprises seven MOS transistors. If all sequence circuits are composed of static circuits, the sequence circuits 21 and 23 will be constituted by 10 MOS transistors each. The setup of FIG. 3(C), comprising 16 transistors at present, will be made up of 13 transistors if all sequence circuits are constituted by dynamic circuits, and will be composed of 20 transistors if all sequence circuits are constituted by static circuits. As it is, the setup of FIG. 3(C) incorporates transistors about 1.23 times as many as in a setup where the two sequence circuits are made of dynamic circuits, or contains transistors about 0.8 times as many as in a setup where both sequence circuits are comprised of static circuits.

In the setup of FIG. 3(C), the static and dynamic circuits are alternated, the duty ratios (=high-level period/cycle in this specification) of the non-overlapping two-phase clock signals $\phi 1$ and $\phi 2$ deviate from 50% each, and the clock signal having the greater duty ratio is used as the clock signal for the dynamic circuit. This setup widens the range in which the frequency of, say, the system clock $\phi B$ is lowered. For example, in FIG. 20, the clock signal $\phi 1B$ with a duty ratio of higher than 50% is adopted as the clock signal $\phi 1$ for the dynamic circuit, and the clock signal $\phi 2B$ with a duty ratio of less than 50% is adopted as the clock signal $\phi 2$ for the static circuit.

Pre-scaler Clock

In addition to the system clock signal, the so-called pre-scaler clock signals may be fed to specific function blocks. Where the system clock signal is divided in frequency as needed, a pre-scaler may be used instead of frequency dividers being assigned individually to the function blocks involved. The pre-scaler generates in a concentrated manner clock signals of various frequency division ratios so as to allocate a clock signal of an appropriate division ratio to each appropriate function block. This arrangement allows the function blocks to share a frequency divider and thereby reduces the logic scale of the chip as a whole.

However, studies by the inventors showed that the pre-scaler clock signal entails a long clock wiring length and hence a large wiring capacity because it is shared by the function blocks. Moreover, the pre-scaler clock of a low frequency division ratio is subject to signal changes of high frequency and hence to increased current consumption. With that characteristic taken into account, the embodiment has each of its function blocks utilize a frequency divider to generate individually a clock signal of relatively high frequency corresponding to a pre-scaler clock signal of a low frequency division ratio. This arrangement eliminates the presence of a pre-scaler shared by the function blocks for generating clock signals of relatively high frequencies.

Figure 4:
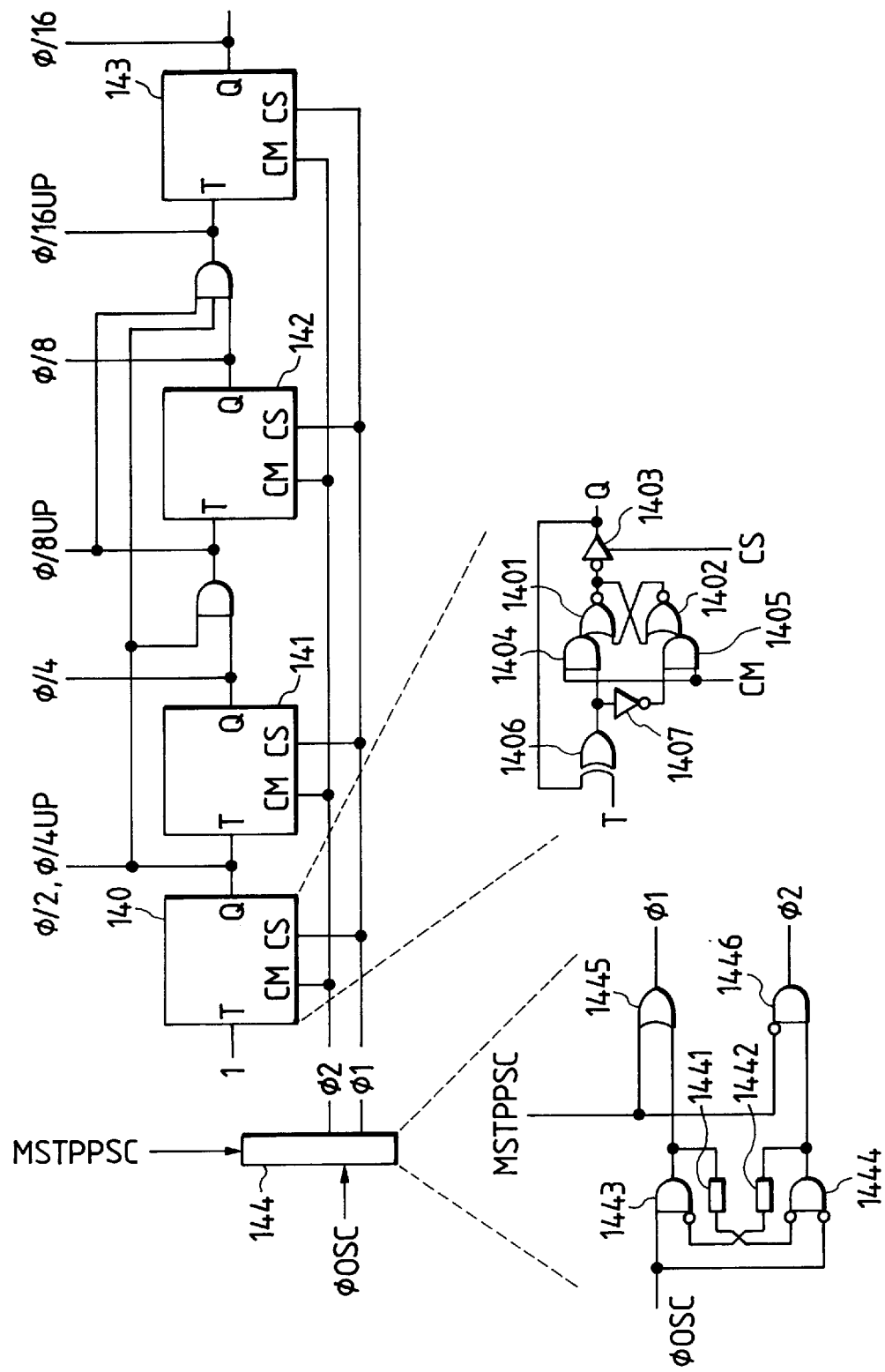
FIG. 4 is a block diagram of a typical pre-scaler.
Figure 5:
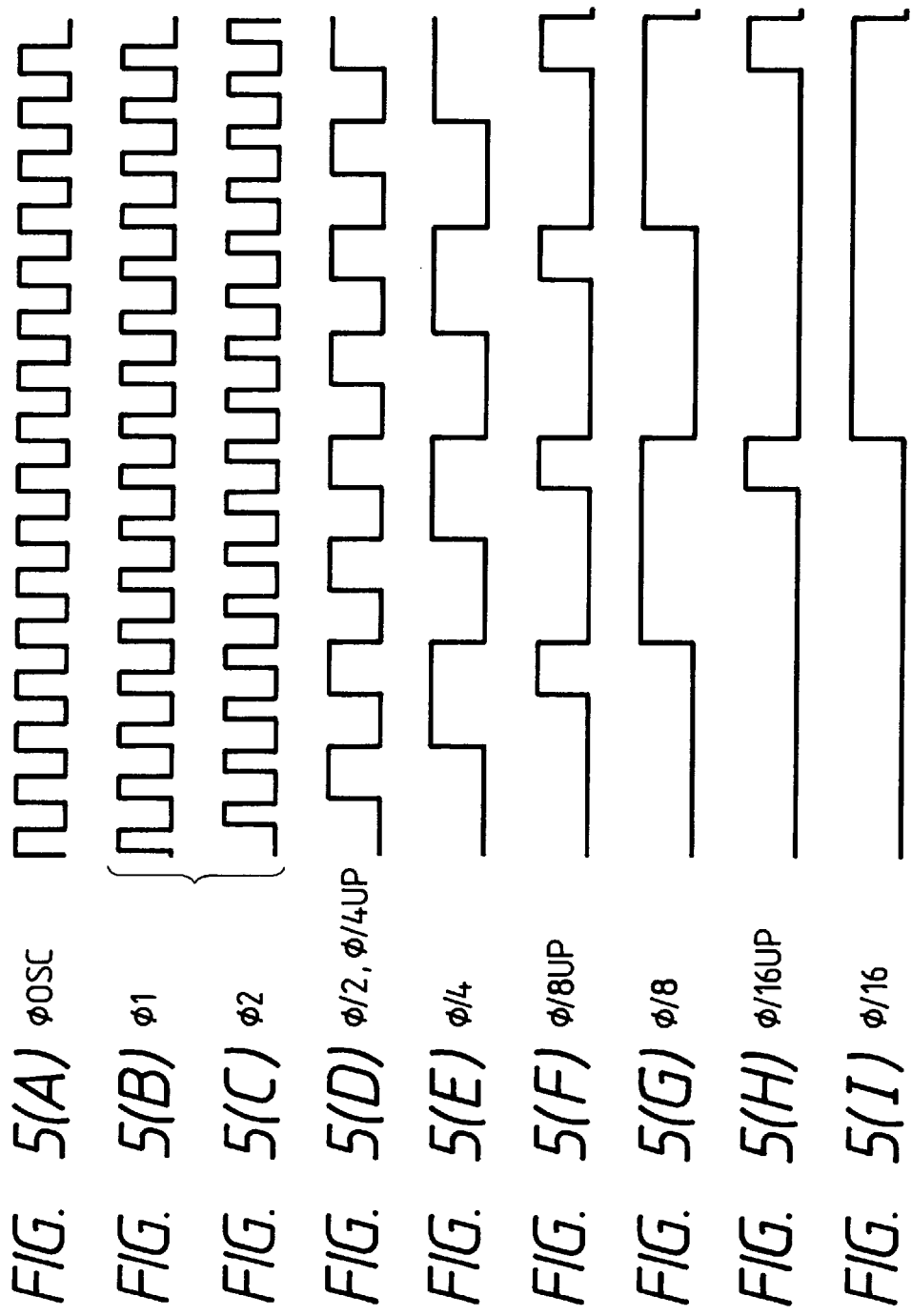
FIGS. 5 (A) through 5(I) are typical operation timing charts associated with the pre-scaler.

FIG. 4 is a block diagram of a typical pre-scaler 14. The figure indicates a typical low-order four-digit constitution, the digits being composed of latch circuits 140 through 143. The latch circuits 140 through 143 are identical in structure, exemplified by the circuit 140 whose structure is illustrated in FIG. 4. The latch circuit 140 primarily comprises a static latch made up of two-input NOR gates 1401 and 1402. The output stage of the static latch includes a clocked inverter 1403 whose output is controlled by a terminal CS. The input stage of the static latch has two-input AND gates 1404 and 1405 which are opened and closed under control of the logic value on a terminal CM. An input terminal T is connected to one of the two input terminals of an exclusive-OR gate 1406. The output of the clocked inverter 1403 is fed back to the other input terminal of the exclusive-OR gate 1406. The AND gate 1404 is supplied with the output of the exclusive-OR gate 1406, and the AND gate 1405 is fed with the inverted output of the exclusive-OR gate 1406 via an inverter 1407. The least significant digit latch circuit 140 has its input terminal T supplied with a logical "1." Low-order count-up clock signals $\phi/4UP$, $\phi/8UP$, $\phi/16UP$, etc., are fed to the high-order input terminals T in a serial connection.

The latch circuits 140, 141, 142, 143, etc., representing the digits have their retained data updated when the terminals CM are set to a logical "1" (illustratively at the High level with this embodiment). When the terminal T has a logical "0" (illustratively at the Low level with this embodiment), the data remains unchanged; when the terminal T has a logical "1," the data is inverted. That is, the terminals CM and SC are not simultaneously set to a logical "1." In other words, the signals φ1 and φ2 are arranged to be non-overlapping two-phase clock signals. Bringing the terminal CS High enables the clocked inverter 1403 for output; driving the terminal CS Low brings about the high output impedance state. With the terminal CM at a logical "1," the input to the AND gates 1404 and 1405 is reflected in their output, whereby the latched data is updated. At this point, if the terminal T is at the Low level, the latched data remains unchanged; if the terminal T is at the High level, the latched data is inverted. With the terminal CM at the Low level, the outputs of the AND gates 1404 and 1405 are set forcibly to the Low level. This causes the static latch made of the two NOR gates 1401 and 1402 to retain the current status in a static manner.

The non-overlapping two-phase clock signals φ1 and φ2 are generated on the basis of the clock signal φOSC. A clock signal generation circuit 144, as shown in FIG. 4, comprises primarily a pair of AND gates 1443 and 1444, the output of one AND gate being fed back to an input of the other AND gate via delay circuits 1441 and 1442. The circuit 144 further includes an OR gate 1445 for output control whereby the signal φ1 is forcibly brought High, and an AND gate 1446 for output control whereby the signal φ2 is forcibly driven Low, both actions being effected when the clock signals φ1 and φ2 are to be stopped. The AND gate 1444 ANDs the signal φOSC and the feedback signal coming from the other AND gate via the delay circuit 1441. The AND gate 1443 ANDs the signal φOSC and the feedback signal coming from the other AND gate via the delay circuit 1442. The AND gate 1446 ANDs an inverted pre-scaler module stop signal MSTPPSC and the output of the AND gate 1444. The pre-scaler module stop signal MSTPPSC, to be described later in more detail, enables the output of the clock signals φ1 and φ2 when set to a logical "0," and disables the output of the clock signals φ1 and φ2 when set to a logical "1." With the output of the clock signals φ1 and φ2 disabled, the clock signals φ1 and φ2 are fixed to the High and the Low level, respectively. At this point, the various pre-scaler clock signals are also inhibited from getting changed.

The pre-scaler 14 shown in FIG. 4 counts up the clock signal φOSC. Illustratively, the pre-scaler described in "H8/3003 Hardware Manual" issued by Hitachi, Ltd. in March 1994 (p. 555) consecutively generates frequency-divided clock signals φ/2, φ/4, φ/8, etc. The pre-scaler of this embodiment further generates the count-up clock signals φ/2UP, φ/4UP, φ/8UP, etc., of the digits involved. The count-up signal (i.e., carry signal) of a given digit is acquired by computing the AND of the latch circuit output of that digit with all carry signals from the less significant digits.

In this embodiment of the invention, the clock signals generated by the pre-scaler 14 (pre-scaler signal) are fed to relevant function blocks such as the timer 7, serial communication interface 9 and A/D converter 10. The pre-scaler clock signals sent to these function blocks are arranged to have frequency division ratios of φ/8 or higher. The clock signals of relatively small frequency division ratios (i.e., of higher frequencies) such as φ/2, φ/4, φ/2UP and φ/4UP are not output from the pre-scaler 14 to the external function blocks. If clock signals of low frequency division ratios were fed to the function blocks collectively from the pre-scaler 14, the clock signal wiring of a considerable length would be charged and discharged at high speed in synchronism with high frequencies. That means high power dissipation.

Moreover, the high level of power dissipation can become wasted if, as is often the case, the function blocks do not use the clock signals of such high frequencies aside from the system clock signal φS. Thus the clock signals of relatively high frequencies such as φ2 are employed by the relevant function blocks each dividing internally the system clock signal φS in frequency. This arrangement reduces power dissipation.

FIGS. 5(A) through 5(I) are typical operation timing charts associated with the pre-scaler 14. The pre-scaler clock signals are changed in synchronism with the clock signal φ1. The count-up clock signal of each digit is set to a logical "1" when the latch circuit outputs for the less significant digits are all set to a logical "1." The count-up clock signal of the digit in question is then changed in synchronism with the clock signal φ1. That is, a count-up clock signal to the next-higher digit is generated per period of the output Q of each digit. For example, the signals φ/8 and φ/16UP have the same period, and the high-level period of the signal φ/16UP coincides with that of the clock signal φ/2.

Module Stop

Figure 6:
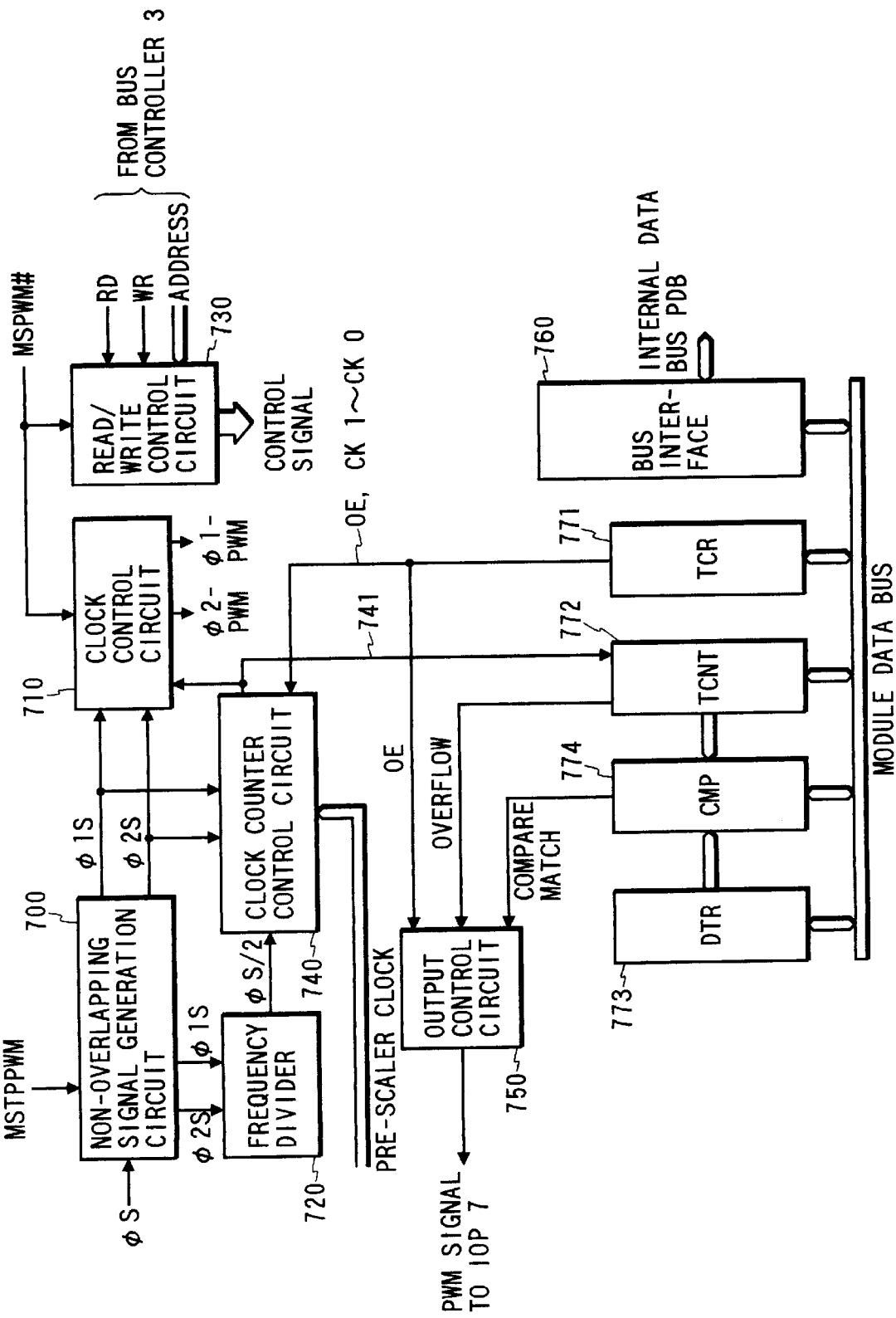
FIG. 6 is a block diagram of a typical PWM timer.

FIG. 6 is a block diagram of the PWM timer 7. The PWM timer 7 comprises a non-overlapping signal generation circuit 700, a clock control circuit 710, a frequency divider 720, a read/write control circuit 730, a counter clock control circuit 740, an output control circuit 750, a bus interface 760, a control register (TCR) 771, a counter (TCNT) 772, a duty register (DTR) 773 and a comparator (CMP) 774.

Figure 7A:
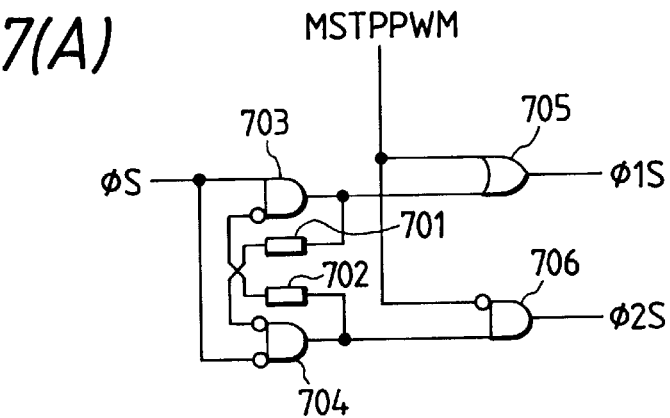
FIG. 7(A) is a logic circuit diagram of a typical non-overlapping signal generation circuit.

The non-overlapping signal generation circuit 700 receives the clock signal φS and generates clock signals φ1S and φ2S which are in non-overlapping relation to each other. The clock signal φ1S is in phase with the signal φS, and the clock signal φ2S is opposite in phase to the clock signal φ1S. As shown in FIG. 7(A), a typical non-overlapping signal generation circuit 700 is composed primarily of a pair of AND gates 703 and 704, the output of one AND gate being fed back to an input of the other AND gate via delay circuits 701 and 702. The circuit 700 further includes an OR gate 705 for output control whereby the clock signal φ1S is forcibly brought High, and an AND gate 706 for output control whereby the clock signal φ2S is forcibly driven Low, both actions being effected when the clock signals φ1S and φ2S are to be stopped. The AND gate 704 ANDs the clock signal φS and the feedback signal coming from the other AND gate via the delay circuit 701. The AND gate 703 ANDs the clock signal φS and the feedback signal coming from the other AND gate via the delay circuit 7φ2. The AND gate 706 ANDs an inverted timer module stop signal MSTPPWM admitted to one of its inputs, and the output of the AND gate 704. The timer module stop signal MSTPPWM, to be described later in more detail, enables the output of the clock signals φ1S and φ2S when set to a logical "0," and disables the output of the clock signals φ1S and φ2S when set to a logical "1." That is, when the timer module stop signal MSTPPWM is set to a logical "1," the clock signals φ1S and φ2S are fixed to the High and the Low level, respectively. The timer module stop signal MSTPPWM is thus used as the control signal for fixedly setting the clock signals φ1S and φ2S to the predetermined logical values when the PWM timer 7 need not be operated.

The clock signals φ1S and φ2S generated by the non-overlapping signal generation circuit 700 are fed only to the frequency divider 720, clock control circuit 710 and counter clock control circuit 740.

The frequency divider 720 receives the clock signals φ1S and φ2S and generates the clock signal φS/2 accordingly. The logic constitution of the frequency divider 7φ2 is implemented by adopting that of the least significant digit in the pre-scaler 14. The clock signal φS/2 having a smaller frequency division ratio than that of the clock signal φS is generated by a frequency divider inside each of the function blocks. This arrangement is designed to reduce power dissipation, as discussed above in connection with the pre-scaler.

The counter clock control circuit 740 receives pre-scaler clock signals φ/16UP, φ64UP and φ/256UP, as well as the clock signal φS/2 generated by the frequency divider 720. Of these input clock signals, the necessary input clock signal is selected and used for a count-up operation. Specifically, the CK1 and CK0 bits in the control register (TCR) 771 designate initially the input clock signal to be selected. These bits cause the counter clock control circuit 740 to select the input clock signal. A count-up clock signal 741 is then generated in synchronism with the cycle of the selected clock signal. Generation of the count-up clock signal 741 is enabled when the OE (output enable) bit in the control register (TCR) 771 is set to a logical "1," and is disabled when the OE bit is set to a logical "0." The counter (TCNT) 772 counts up in synchronism with the count-up clock signal 741.

The clock control circuit 710 receives four signals: the clock signals φ1S and φ2S, a PWM timer selection signal MSPWM# (symbol# indicates that the signal identified thereby is a Low-enabled signal, i.e., a negative logic signal) generated using the address signal output by the CPU 1, and the count-up clock signal 741 output by the counter clock control circuit 740. In response, the clock control circuit 710 supplies clock signals φ1-PWM and φ2-PWM to the TCR 771, TCNT 772, CMP 774, DTR 773, bus interface 760, and output control circuit 750. The clock signal φ1-PWM and φ2-PWM are enabled when the CPU 1 writes or reads data to or from the PWM timer 7, or when the count-up clock signal is generated. Otherwise the clock signals φ1-PWM and φ2-PWM are fixed to the High and the Low level, respectively.

The read/write control circuit 730 receives the internal address, read signal RD, and write signal WR output by the CPU 1 and coming from the bus controller 3. Also received by the control circuit 730 is the PWM timer selection signal MSPWM#. In turn, the read/write control circuit 730 causes each register and the bus interface 760 to control the input and output of data between each register on the one hand, and illustratively the CPU 1 on the other.

The output control circuit 750 receives a compare match signal 780 from the CMP 774, an overflow signal 781 from the TCNT 772, and the OE bit from the TCR 771. In turn, the output control circuit 750 outputs a PWM signal. When the OE bit is set to a logical "1," the PWM signal is output to the outside through a dedicated terminal that doubles as an I/O port. The output PWM signal is a logical "1" at the time of a compare match (compare match signal 780 at logical "1") and is a logical "0" in the event of an overflow (overflow signal 781 at logical "1").

Under control of the read/write control circuit 730, the bus interface 760 exchanges information between the internal data bus PDB and the module data bus inside the PWM timer 7.

The control register (TCR) 771 has the OE bit, as well as the CK1 and CK0 bits. Data is written to and read from the TCR 771 under control of the read/write control circuit 730. When the OE bit is set to a logical "1," the PWM timer 7 is activated. The CK1 and CK0 bits are used to select the count clock cycle, as mentioned earlier. The counter (TCNT) 772 receives and outputs data also under control of the read/write control circuit 730. The counter 772 counts up in response to the count clock signal 741 from the counter clock control circuit 740. If an overflow occurs during the count-up action, the counter 772 turns on the overflow signal 781. The duty register (DTR) 773 receives and outputs data under control of the read/write control circuit 730. The comparator (CMP) 774 receives the outputs of the TCNT 773 and DTR 773, compares them, and turns on the compare match signal 780 if the comparison results in a match.

Figure 7B:
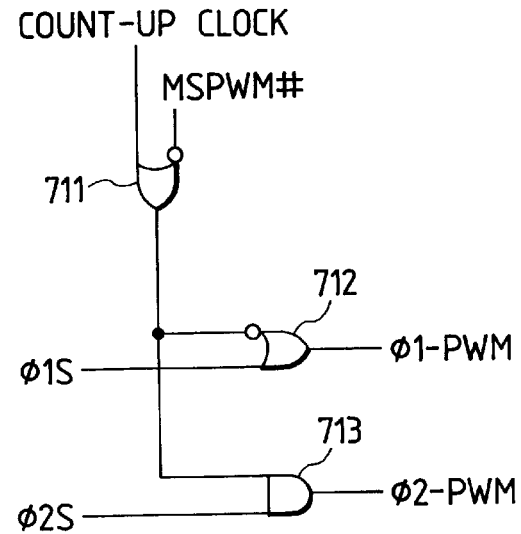
FIG. 7(B) is a logic circuit diagram of a typical clock control circuit.

FIG. 7(B) is a logic circuit diagram of the clock control circuit 710. The clock control circuit 710 comprises two OR circuits 711 and 712 and one AND circuit 713. The inverted timer selection signal MSPWM# and count-up clock signal 741 are input to the OR circuit 711. The output of the OR circuit 711 and the clock signal φ1S are input to the OR circuit 712 whose output is the clock signal φ1-PWM. The output of the OR circuit 711 and clock signal φ2S are input to the AND circuit 713 whose output is the clock signal φ2-PWM. The clock signals φ1-PWM and φ2-PWM are enabled when the CPU 1 turns on the timer selection signal MSPWM# to write or read data to or from the PWM timer 7, or when the count-up clock signal 741 is generated. Otherwise the clock signals φ1-PWM and φ2-PWM are fixed to the High and the Low level, respectively. That is, the clock signals φ1-PWM and φ2-PWM to be fed to various components are changed in level only when any specific event (write/read operation by the CPU 1 or generation of the count-up clock signal) takes place. This means that the function blocks except for those receiving the clock signals φ1-PWM and φ2-PWM and acting in synchronism therewith (i.e., the non-overlapping signal generation circuit 700, clock control circuit 710, frequency divider 720 and counter clock control circuit 740) operate only if any of the specific events mentioned above occurs. Otherwise the signal changes are inhibited and current consumption is reduced accordingly.

As described, the non-overlapping signal generation circuit 700 is structured as shown in FIG. 7(A). Bringing the module stop signal MSTPPWM High sets fixedly the clock signals φ1S and φ2S to the High and the Low level, respectively. As evident in FIG. 7(B), the module stopped state of the non-overlapping signal generation circuit 700 also causes the clock signals φ1-PWM and φ2-PWM to be fixed to their predetermined levels. In this manner, where the PWM timer 7 is not utilized, the module stop signal MSTPPWM is used to inhibit any changes in the internal clock signals φ1S, φ2S, φ1-PWM and φ2-PWM; where the PWM timer 7 is utilized, the changes in the internal clock signals φ1-PWM and φ2-PWM are suppressed until one of the above-described events takes place. The arrangement ensures reduced power dissipation.

The structure above comprising the non-overlapping signal generation circuit 700 and clock control circuit 710 to inhibit selectively the changes in the internal clock signals is also adopted in other circuit modules, such as the watch dog timer (WDT) 8, serial communication interface (SCI) 9 and A/D converter 10. The same structure also applies to the supply of pre-scaler clock signals of high division ratios and the generation of clock signals of low division ratios by internal frequency dividers.

Figure 7C:
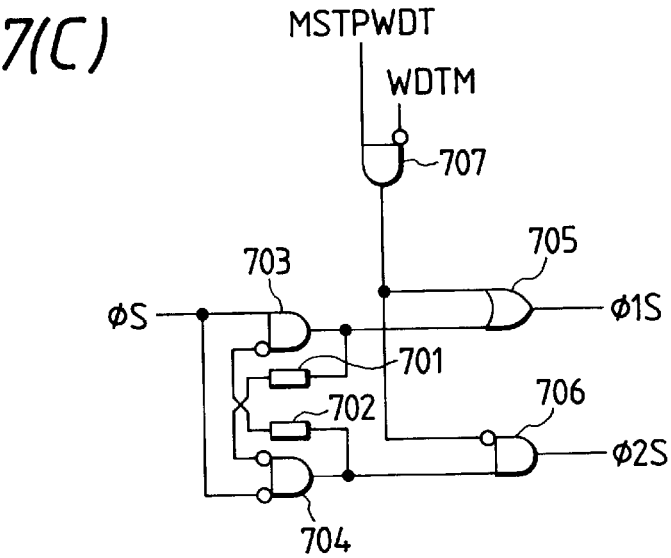
FIG. 7(C) is a logic circuit diagram of a typical non-overlapping signal generation circuit adopted in a WDT.

FIG. 7(C) is a logic circuit diagram of a typical non-overlapping signal generation circuit adopted in the watch dog timer (WDT) 8. This circuit is a variation of the non-overlapping signal generation circuit 700 in FIG. 7(A) supplemented by an AND circuit 707. One input of the AND circuit 707 receives the module stop signal MSTPWDT assigned to the watch dog timer 8; the other input is fed with the inverted WDTM bit signal for designating watch dog timer mode. The watch dog timer 8 doubles as an interval timer. To use the watch dog timer 8 for what it is (WDT) requires setting the WDTM bit to a logical "1." Specifically, the WDTM bit is provided in an appropriate register and set illustratively by the CPU 1 to a logical "1" to designate watch dog timer mode. Once watch dog timer mode is designated, the module stop order by the module stop signal MSTPWDT is ignored. This arrangement prevents the system monitoring function based on the WDT 8 from getting inadvertently deactivated, whereby the reliability of the system is improved.

Figure 8:
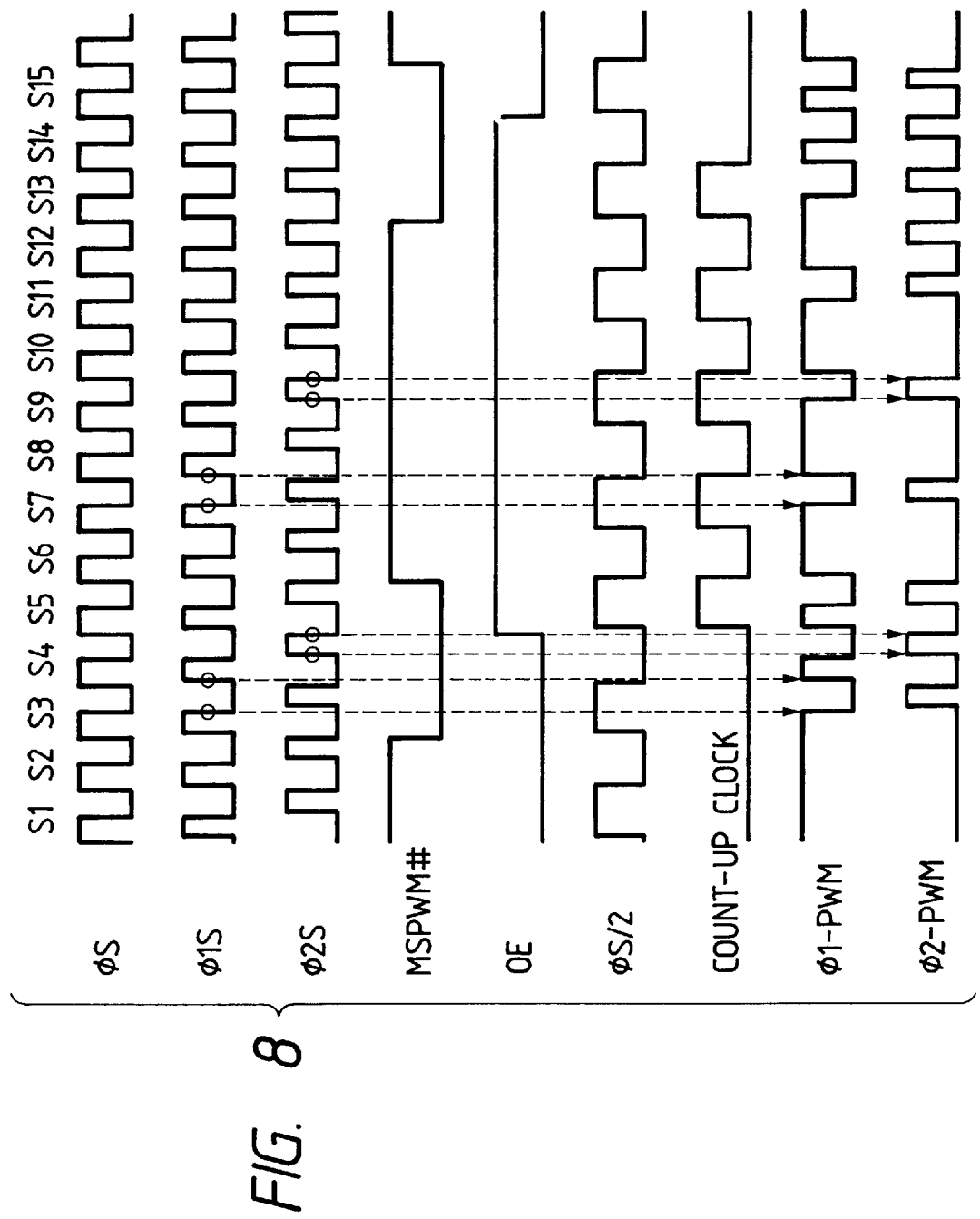
FIG. 8 is an operation timing chart associated with the PWM timer of FIG. 6.

FIG. 8 is an operation timing chart associated with the PWM timer of FIG. 6. Starting in state S3, the CPU 1 writes data to the control register (TCR) 771 in the PWM timer 7. Performing this write operation requires three states. First in state S3, the module selection signal MSPWM# is driven Low. With the module selection signal MSPWM# at the Low level, the output of the OR circuit 711 in FIG. 7(B) is brought High. Then the clock signals φ1-PWM and φ2-PWM start changing in level in synchronism with the signals φ1S and φ2S. The signal MSPWM# is synchronized with the signal φ1S. In the third state for the write operation (i.e., at the beginning of state S5), the OE bit is set to a logical "1." The CK1 and CK0 bits are also set, whereby the clock signal φS/2 is illustratively selected.

With the OE bit set to "1," the clock signal φS/2 generated by the frequency divider 720 is used as the count-up clock signal 741. While the count-up clock signal 741 is being High, the clock signals φ1-PWM and φ2-PWM are varied in accordance with the clock signals φ1S and φ2S, and the PWM timer 7 counts up. Between state S6 and state S12, the cycle of the signals φ1-PWM and φ2-PWM is reduced to half of that in effect if the clock signals φ1S and φ2S were used unmodified. Accordingly, the circuit blocks except for the non-overlapping signal generation circuit 700, clock control circuit 710, frequency divider 720 and counter clock control circuit 740 operate half as often as before and thereby slash current consumption by half. Suppose that the ratio of the logic scale of these circuit blocks whose operation frequency is halved, to the logical scale of the non-overlapping signal generation circuit 700, clock control circuit 710, frequency divider 720 and counter clock control circuit 740, is 8 to 2. In that case, the entire current consumption of the PWM timer 7 is reduced to 6/10 of the previous level. If the count-up clock signal is selected to be the signal φ/16UP which has the same frequency as the signal φS/8, then the current consumption of the circuit blocks conducive to power savings is reduced to 1/8 of the previous level. This allows the PWM timer 7 as a whole to slash its current consumption to 3/10 of the preceding level.

Between state S13 and state S15, the CPU 1 performs a write operation to clear the OE bit to "0." This brings the output of the OR circuit 711 Low. As a result, the signals φ1-PWM and φ2-PWM are fixed to the High and the Low level, respectively. While the PWM timer 7 is in operation (states S3 through S5, S7, S9, S11, S13 through S15), the signals φ1-PWM and φ2-PWM are the same in pulse width. When the PWM timer 7 is halted, the signals φ1-PWM and φ2-PWM are fixedly set to the High and the Low level, respectively. With the timer operation halted, the internal status is retained. Specifically, the sequence circuits used in the circuit blocks except for the non-overlapping signal generation circuit 700, clock control circuit 710, frequency divider 720 and counter clock control circuit 740 are of the types shown in FIG. 3(C). In this setup, the clock signal φ2 is regarded as the signal φ2-PWM and the clock signal φ1 as φ1-PWM.

Likewise, in module stop mode, the module stop signal MSTPPWM is turned on so that the signals φ1S and φ2S are stopped at the High and the Low level respectively and that the signals φ1-PWM and φ2-PWM are also stopped at the High and the Low level respectively. In this state, the status of the PWM timer 7 is retained in the same manner as discussed above. Illustratively, the contents of the control register (TCR) 771, duty register (DTR) 773 and counter (TCNT) 772 are preserved. After module stop mode is canceled, there is no need to set anew the control register 771 and like registers. In module stop mode, the CPU 1 is incapable of carrying out read or write operations. Because the signals φ1S and φ2S are being stopped, the signal changes in the entire PWM timer 7 are inhibited and the current consumption during that time is effectively zero. Alternatively, the line fed with the timer module stop signal MSTPPWM in FIG. 7(A) may be connected to the output of an AND circuit receiving both the timer module stop signal MSTPPWM and the timer module selection signal MSPWM#. In this alternative setup, the CPU 1 may write and read data to and from the PWM timer 7 while module stop mode is in effect.

Clock Control Circuit

Figure 9:
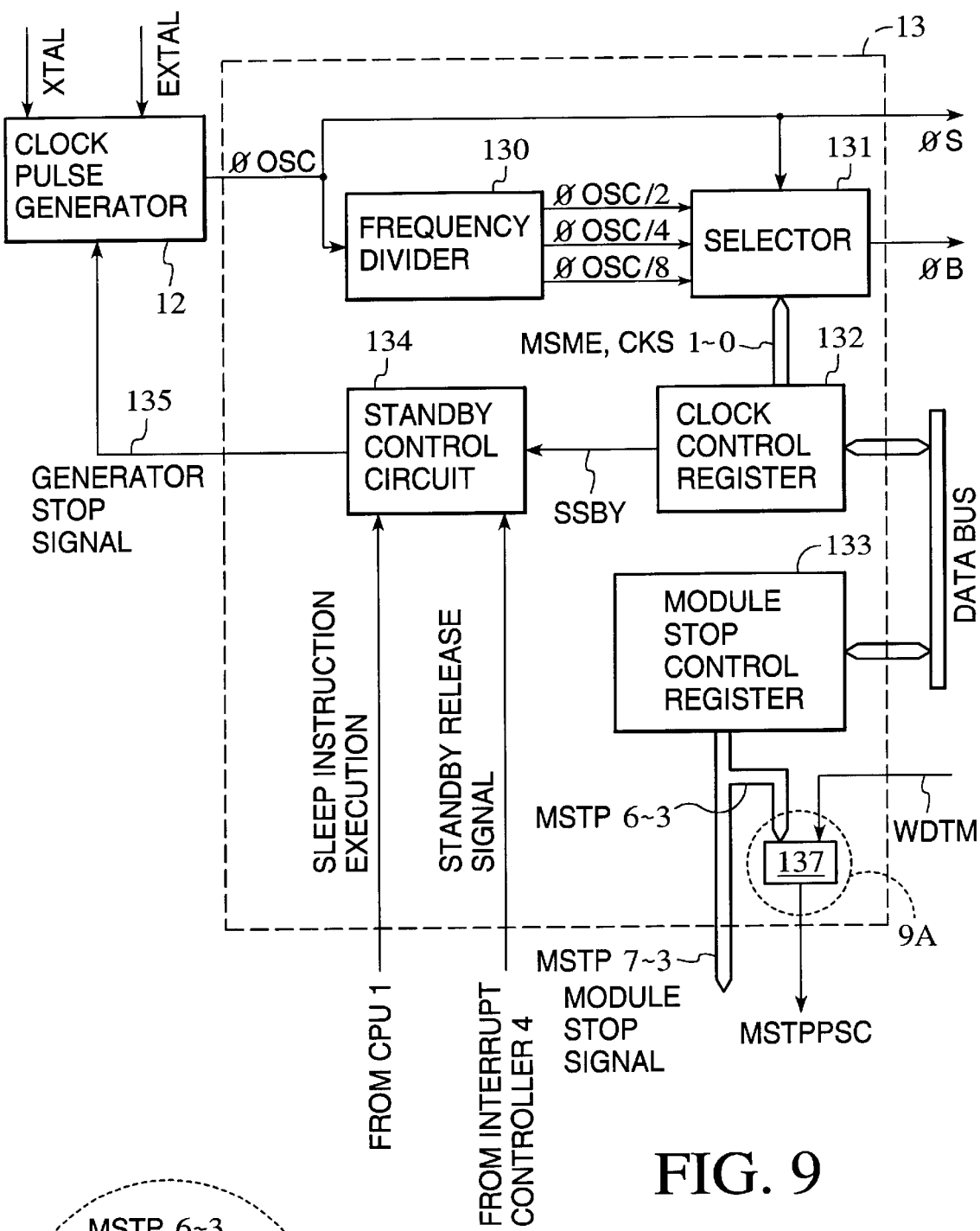
FIG. 9 a block diagram of a clock pulse generator and a clock control circuit typically used in the single-chip microcomputer of FIG. 1.
Figure 9A:
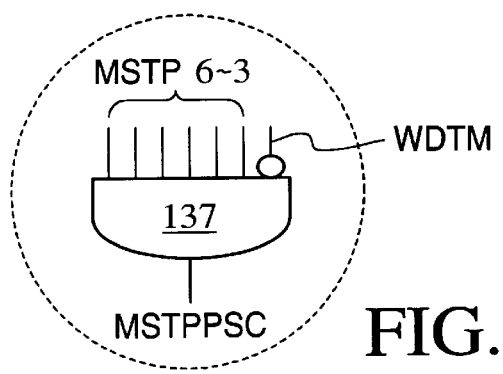

FIG. 9 is a block diagram of the clock pulse generator 12 and clock control circuit 13 typically used in the single-chip microcomputer of FIG. 1. The clock control circuit 13 comprises a frequency divider 130, a selector 131, a clock control register 132, a module stop control register 133, and a standby control circuit 134. The module stop control register 133 contains as many bits as the number of selectable function blocks. That is, each of the selectable function blocks corresponds to each of the bits in the module stop control register 133. The clock pulse generator 12 is connected to a crystal oscillator via terminals EXTAL and XTAL. Alternatively, an external clock signal is supplied via the EXTAL terminal. The clock pulse generator 12 generates illustratively a clock signal φOSC whose frequency is identical to the characteristic frequency of the crystal oscillator or to the frequency of an external clock. The clock pulse generator 12 is supplied with a generator stop signal 135 from the standby control circuit 134. Turning on the generator stop signal 135 in the standby state stops the clock pulse generator 12. In that case, the clock signal φOSC is fixed illustratively to the High level and no further signal change is made. The clock pulse generator 12 may alternatively contain a duty compensation circuit. The clock pulse generator 12 may also incorporate a frequency divider to divide in two the characteristic frequency of the crystal oscillator or the frequency of an external clock, the frequency-divided clock signal being output as the signal φOSC. These alternatives are discussed illustratively in "H8/3003 Hardware Manual" (ibid., pp. 553–560).

Figures 10A, 10B:
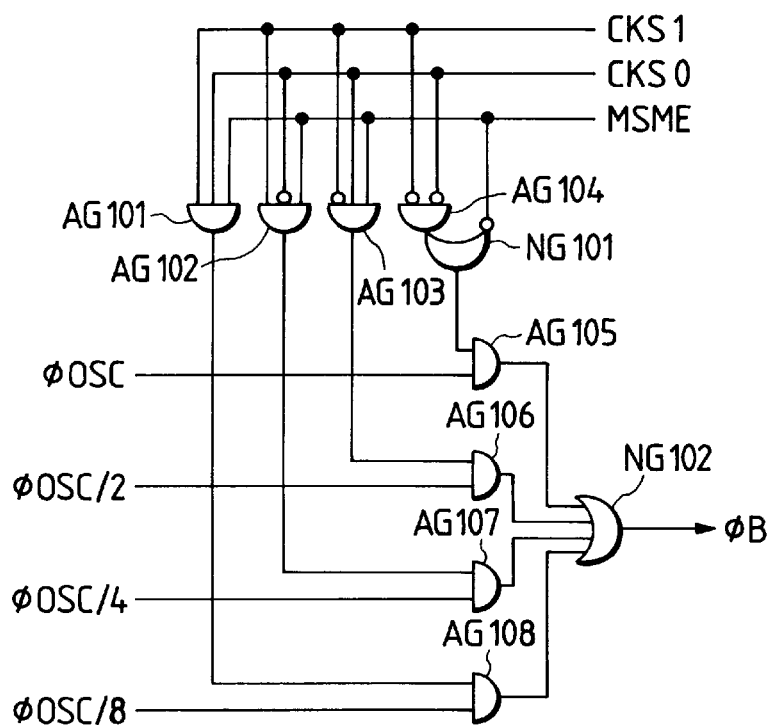
FIG. 10(A) table showing how clock signals are selected depending on the logic values of MSME, CKS1 and CKS0 bits.
FIG. 10(B) is a logic circuit diagram of a typical selector.

The frequency divider 130 receives the clock signal φOSC and illustratively halves it in frequency consecutively to generate clock signals φOSC/2, φOSC/4 and φOSC/8. The selector 131 receives the clock signals φSC, φOSC/2, φOSC/4 and φOSC/8, and outputs as a system clock φB the clock signal selected by the MSME, CKS1 and CKS0 bits in the clock control register 132. The system clock φB is fed to the CPU 1 and other components in the single-chip microcomputer. Alternatively, the clock signals φOSC/2, φOSC/4 and φOSC/8 may be replaced by count-up clock signals φOSC/4UP, φOSC/8UP and φOSC/16UP which may be input instead. If the signal selected by the selector 131 is changed, the clock signal phases after the change will not be aligned with those before the change. For example, if the change is made in synchronism with a leading edge of the clock signal φS (φ1S where signal generation is available inside the selector 131), the smallest pulse width in transition is made equal to or greater than the pulse width of the clock signal φS (φOSC). Where the clock signals are to be stopped to reduce power dissipation, the signal φOSC is brought High, and so are the clock signals φB and φS. FIG. 10(A) is a table showing how clock signals are selected depending on the logic values of the MSME, CKS1 and CKS0 bits. The CKS1 and CKS0 bits become significant when the MSME bit is set to "1." If the MSME bit is "0," then S=φOSC regardless of the settings of the CKS1 and CKS0 bits.

FIG. 10(B) is a logic circuit diagram of a typical selector controlled by the MSME, CKS1 and CKS0 bits. In FIG. 10(B), AG101 represents an AND gate which receives the CKS1, CKS0 and MSME bits and which outputs a logical "1" when the received bits are all "1." AG102 denotes an AND gate which receives an inverted CKS0 bit signal, the CKS1 bit and the MSME bit and which outputs "1" when CKS0="0," CKS1="1" and MSME="1.1." AG103 stands for an AND gate which receives an inverted CKS1 bit signal, the CKS0 bit and the MSME bit and which outputs "1" when CKS1="0," CKS0="1" ad MSME ="1." AG104 is an AND gate which receives an inverted CKS0 and an inverted CKS1 bit signal and which outputs "1" when CKS0="0" and CKS1="0." NG101 represents a NOR gate which receives the output of the AND gate AG104 and an inverted MSME bit signal and which outputs "1" when the output of the AND gate AG104 is "1" or MSME="0." Therefore the NOR gate NG101 outputs "1" when the MSME bit is "0" or when the CKS0 and CKS1 bits are both "0."

AG105 is an AND gate receiving the output of the NOR gate NG101 and the clock signal φOSC. AG106 is an AND gate that receives the output of the AND gate AG103 and the frequency-divided clock signal φOSC/2. AG107 denotes an AND gate receiving the output of the AND gate 102 and the frequency-divided clock signal φOSC/4. AG108 represents an AND gate which receives the output of the AND gate AG101 and the frequency-divided clock signal φOSC/8. The outputs of the AND gates AG105 through AG108 are fed to a NOR gate NG102 which in turn outputs the system clock signal φB. The selector of the above constitution causes the NOR gate NG102 to output the system clock signal φB having a frequency pursuant to each of the bit combinations shown in FIG. 10(A).

The clock control register 132 and module stop control register 133 are connected to the internal data bus PDB. The CPU 1 may write and read data to and from these control registers. The clock control register 132 outputs the MSME, CKS1 and CKS0 bit signals to the selector 131, and outputs an SSBY bit signal to the standby control circuit 134. The module stop control register 133 sends the module stop signal MSTP to the relevant function blocks. The standby control circuit 134 is constituted illustratively by a flip-flop circuit. When the CPU 1 executes a sleep instruction (i.e., sleep instruction execution signal getting activated) while the SSBY bit is being set to a logical "1" in the control register 132, the flip-flop circuit is set. Having the flip-flop circuit set turns on the generator stop signal 135, stops with that signal the pulse generating operation of the clock pulse generator 12, and places the single-chip microcomputer in the standby state. If an external interrupt request or a reset occurs in the standby state, a standby release signal 136 is activated and the flip-flop circuit is reset. Having the flip-flop circuit reset turns off the generator stop signal 135, resumes the pulse generating operation of the clock pulse generator 12, and releases the standby state. Although the release of the standby state should preferably be accompanied by provision of an oscillation stabilizing time, detailed procedures and structures for implementing such release are not directly relevant to the scope of this invention and will not be discussed further. When the CPU 1 executes the sleep instruction, the internal clock of the CPU 1 is halted. If the CPU 1 executes the sleep instruction while the SSBY bit is being set to a logical "0," the pulse generating operation of the clock pulse generator 12 is not stopped. The state set for the CPU 1 after it executed the sleep instruction (i.e., sleep state of the CPU 1) is released by an interruption or by reset.

FIGS. 11(A) and 11(B) are views illustrating a typical constitution of the module stop control register 133 for controlling module stop mode as well as a typical constitution of the clock control register 132 for controlling medium-speed mode. Detailed bit structures of these registers are given illustratively in FIGS. 12(A) through 12(C), 13(A) and 13(B), and 14(A) through 14(C).

The module stop control register 133 is an eight-bit register having bits MSTP7 through MSTP3 which the CPU 1 may write and read data thereto and therefrom. The bit MSTP7 corresponds to the data transfer controller (DTC) 2, MSTP6 to the timer 7, MSTP5 to the watch dog timer (WDT) 8, MSTP4 to the serial communication interface (SCI) 9, and MSTP3 to the A/D converter 10, as shown in FIGS. 12(A) through 12(C), 13(A) and 13(B). These bits allow each of the function blocks to be designated individually for a module stopped state. The module stop signal MSTPPWM for the PWM timer 7 is turned on when the bit MSTP6 is set to a logical "1." The logical "1" set in the bit MSTP5 becomes effective when watch dog timer mode is substantially not in effect, as described earlier with reference to FIG. 7(C). Upon power-up or after reset, the bits in the module stop control register 133 are initialized to, but not limited by, a logical "1" each. The module stopped state is entered after reset, whereby current consumption is reduced immediately after the operation is started. Current consumption is reduced illustratively in proportion to the ratio of the logical scale of the function blocks in the module stopped state, to the logical scale of the operating function blocks. For example, if the above ratio is 4 to 6, the current consumption involved is reduced to 6/10 of the previous level.

The pre-scaler 14 is stopped by the pre-scaler module stop signal MSTPPSC getting turned on when the timer 7, watch dog timer 8, serial communication interface 9 and A/D converter 10 (all fed with the pre-scaler clock signal) are all in the module stopped state, i.e., when the MSTP6 through MSTP3 bits are all set to "1," with the watch dog timer 7 not in watch dog timer mode. As depicted in FIG. 9, the module stop signal MSTPPSC for the pre-scaler 14 is formed by a AND circuit 137 AND'ing an inverted signal of the watch dog timer mode signal WDTM with the module stop signal corresponding to the bits MSTP6 through MSTP3. Bits 2 through 0 in the module stop control register 133 are reserved bits; any attempt to read any of these bits only yields "0" and any attempt to write data thereto is regarded as invalid.

The clock control register 132 has four bits, SSBY, MSME, CKS1 and CKS0, as shown in FIG. 11(A). The SSBY bit is used to control the transition to the standby state, as depicted in FIG. 14(A). If the CPU 1 executes a sleep instruction while the SSBY bit is being set to a logical "1," the pulse generating operation of the clock pulse generator 12 is halted and the single-chip microcomputer enters the standby state. If the CPU 1 executes the sleep instruction while the SSBY bit is cleared to 0, the clock signal inside the CPU 1 is stopped and the CPU 1 enters the so-called sleep state. In the standby state, the single-chip microcomputer as a whole is stopped whereas in the sleep state, only the CPU 1 is halted.

As shown in FIGS. 14(B) and 14(C), the bit MSME is used to enable medium-speed mode. The designation of the clock signal by the bits CKS1 and CKS0 becomes effectively only when the bit MSME is set to a logical "1." When the bits MSME, CKS1 and CKS0 are fed to the selector, the selector selects the system clock signal φB of the microcomputer system from among the signals φOSC, φOSC/2, φOSC/4 and φOSC/8. The time period equivalent to one cycle of the system clock signal φB is called a state. Medium-speed mode is a state in which a clock signal other than the signal φOSC is selected as the clock signal φB. Bits 6 through 3 are reserved bits; any attempt to read any of these bits only yields "0" and any attempt to write data thereto is regarded as invalid.

Figure 15:
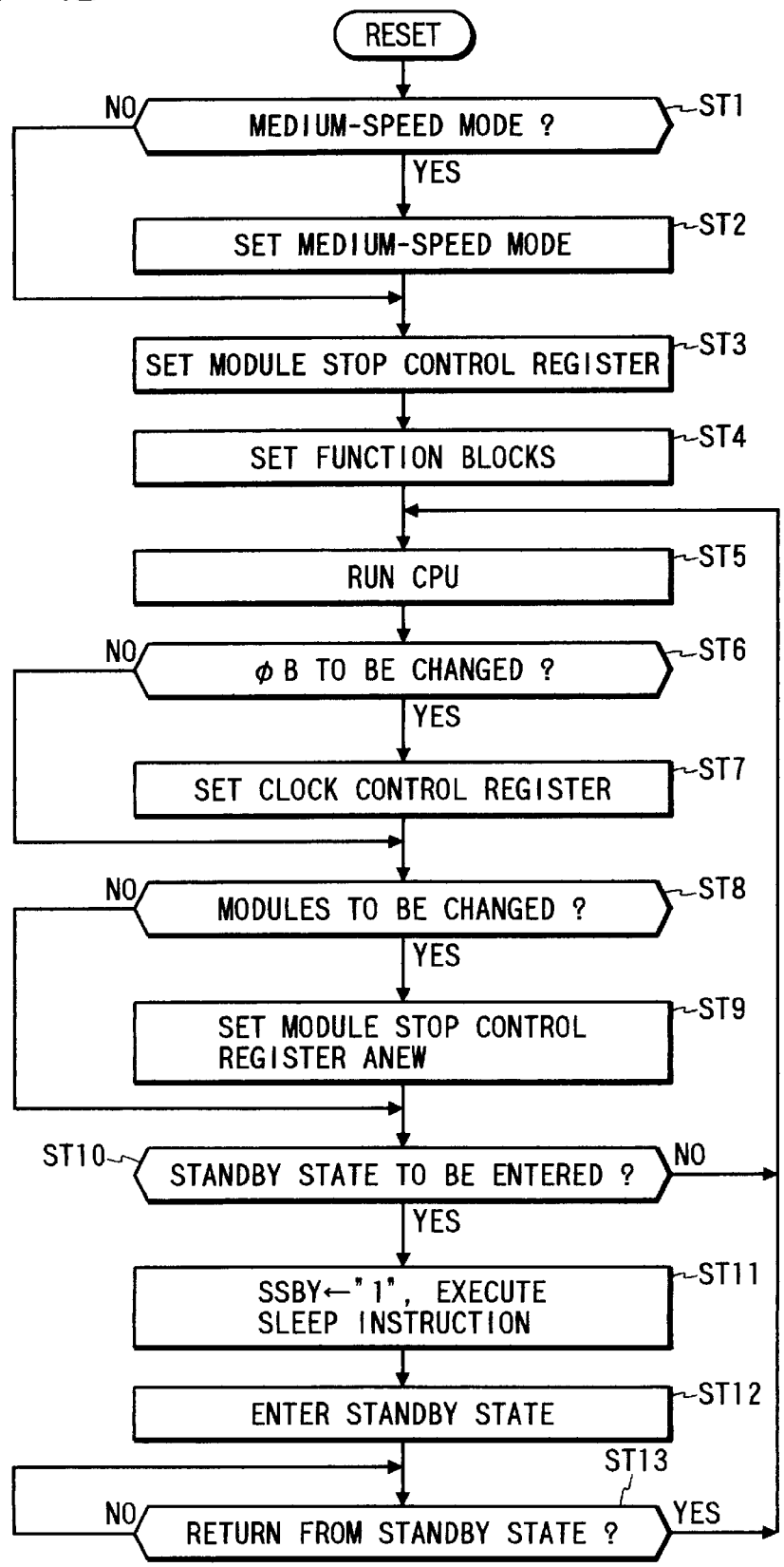
FIG. 15 is an overall operation flowchart comprising steps in which the single-chip microcomputer of the invention operates, with emphasis placed on a system clock signal.

FIG. 15 is an overall operation flowchart comprising steps in which the single-chip microcomputer of the invention operates, with emphasis placed on the system clock signal. Immediately after reset, the single-chip microcomputer enters the module stopped state. The bus masters such as the CPU 1 start operating in high-speed mode (φB=φOSC). In step 1, a check is made to see if medium-speed mode is in effect. If the high-speed operation is not necessary, medium-speed mode is selected in step 2 by writing appropriate data to the clock control register. For the function blocks that require high-speed operations, the module stopped state of these blocks is released in step 3 by writing appropriate data to the module stop control register. In step 4, each of the function blocks is set illustratively by initializing the control register of each function block using suitable data. In step 5, the CPU 1 performs its processing. If high-speed processing is not needed, a check is made in step 6 to see if the clock signal φB needs to be changed to select medium-speed mode. In the event of the clock signal change in step 6, the clock control register is set accordingly in step 7. In step 8, a check is made to see if the circuit modules (function blocks) need to be changed because any particular function block no longer needs to be operated or because any specific function block needs to be started anew. If the module change is found to be necessary, the module stopped state is altered in step 9 by writing appropriate data to the module stop control register. In step 10, a check is made to see if it is necessary to select a standby state. If the entire microcomputer needs to be stopped, a sleep instruction is executed in step 11 by setting the SSBY bit to a logical "1," whereby the standby state is entered in step 12. If an external interruption is generated, the standby state is released and the microcomputer resumes its operation in step 13. The internal status of the modules is retained in the standby state. Thus after the standby state is released, there is no need to set anew the function blocks, i.e., to write appropriate data to the control register of each of the function blocks. In the steps above, the registers are set by program. Illustratively, any register is designated, and the CPU 1 is programmed to execute an instruction to write data to that register, whereby the register settings are provided.

φB Changeover Following Interrupt Request, etc.

Studies by the inventors revealed one disadvantage of the prior art regarding clock signal changeover for power-saving purposes. Suppose that where clock signals are switched by program for reduced power dissipation, a specific event (e.g., an interruption to the CPU 1) has occurred requiring the CPU 1 to operate at high speed. In that case, the event is recognized as an interruption subject to interrupt exception handling by an interrupt handling routine. While the interrupt handling routine is being active, the frequency division ratio of the system clock needs to be changed before the requested processing may be carried out. This means that there is no way to enhance the operation speed from the time the event takes place until the requested processing is performed. The result is that the response time regarding the interruption is prolonged. With the embodiment of the invention, in contrast, any of the specific events (interrupt request, transfer request, etc.) when taking place causes the control bit MSME to be cleared automatically to a logical "0." This allows the CPU 1 and data transfer controller (DTC) 2 to enter high-speed mode wherein they operate in synchronism with the signal φOSC, which is the clock signal φB of the highest frequency. Upon return from interrupt exception handling, the bit MSME is set to a logical "1." Having the bit MSME set to a logical "1" by program causes the operation mode to be selected in accordance with the previously set control bits CKS0 and CKS1. Where a DTC start request (DTC transfer request) is generated, the MSME bit is also cleared automatically to a logical "0," and the CPU 1 and data transfer controller (DTC) 2 enter high-speed mode. Upon completion of the DTC data transfer, the MSME bit is set automatically to a logical "1." This causes the operation mode to be selected in accordance with the control bits CKS0 and CKS1 already set. If the data transfer controller 2 has a terminal for receiving an external transfer request, the DTC acts in the same manner as described above upon receipt of a data transfer request from the outside.

Figure 16:
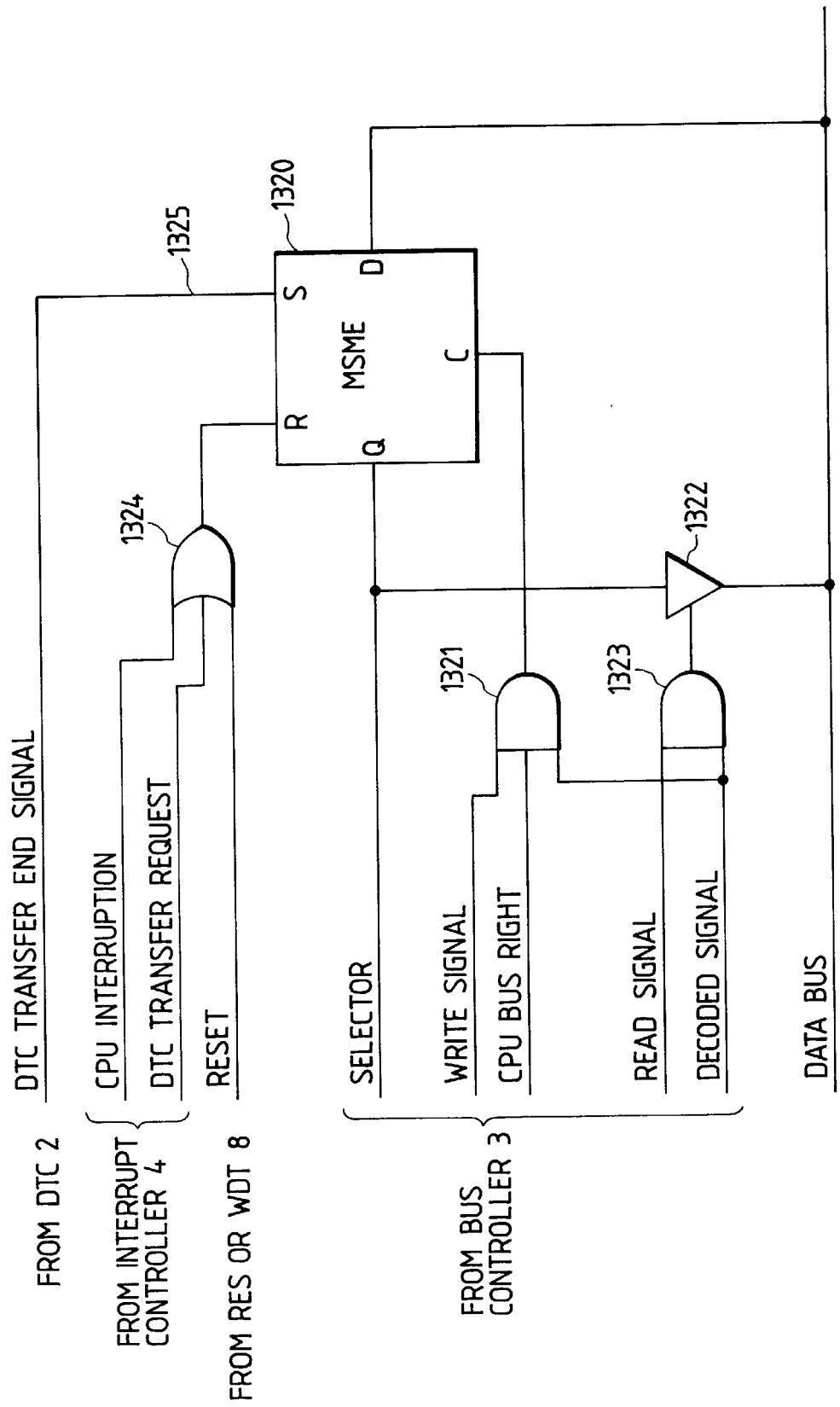
FIG. 16 is a schematic block diagram of the MSME bit.

FIG. 16 is a schematic block diagram of the MSME bit. The MSME bit is constituted primarily by a set-reset type flip-flop circuit 1320. A data input terminal D of the flip-flop circuit 1320 is connected to a predetermined signal line of the internal data bus PDB. A clock input terminal C of the circuit 1320 is supplied with the output of an AND circuit 1321, i.e., with the AND of a CPU bus right signal, a write signal and an address decode signal. The address decode signal is obtained by decoding the contents of the address bus IAB, the signal indicating the supplied address of the clock control register 132. An output terminal Q of the flip-flop circuit 1320 is connected both to the selector 131 of the clock control circuit 13 and to the data bus via a clocked buffer 1322. The clocked buffer 1322 is enabled for output by the output of a two-input AND circuit 1323 being brought High, the AND circuit 1323 receiving the address decode signal and a read signal. Otherwise the clocked buffer 1322 is placed in the high output impedance state. A reset input terminal R of the flip-flop circuit 1320 is fed with the output of an OR circuit 1324 OR'ing a reset signal, a DTC transfer request signal and a CPU interrupt signal. A set input terminal S of the flip-flop circuit 1320 is supplied with a DTC transfer end signal 1325. The DTC transfer end signal 1325 is output by the data transfer controller (DTC) 2. The controller 2 activates the DTC transfer end signal 1325 illustratively upon completion of a data transfer operation. The reset signal is either an externally supplied reset signal RES or the output signal of the watch dog timer (WDT) 8. The DTC transfer request signal and the CPU interrupt signal are both furnished by the interrupt controller 4.

The CPU interrupt signal and the DTC transfer request signal are an event-triggered signal each. In addition to receiving a DTC transfer request signal from the interrupt controller 4, the data transfer controller (DTC) 2 may have an input terminal for admitting an externally supplied transfer request. In that case, the external transfer request signal and the transfer request signal from the interrupt controller 4 are OR'ed, and the result is sent to the OR circuit 1324 as the DTC transfer request signal. When an interrupt request occurs, mask information of the CPU 1 is referenced to see if the request is lower than the mask level set for the CPU 1. If the interrupt request is found to be lower than the mask level for the CPU 1, the request will not be recognized as representative of an event. Interrupt masks are described illustratively in "H8/3003 Hardware Manual" (ibid., pp. 89–115).

Figure 17:
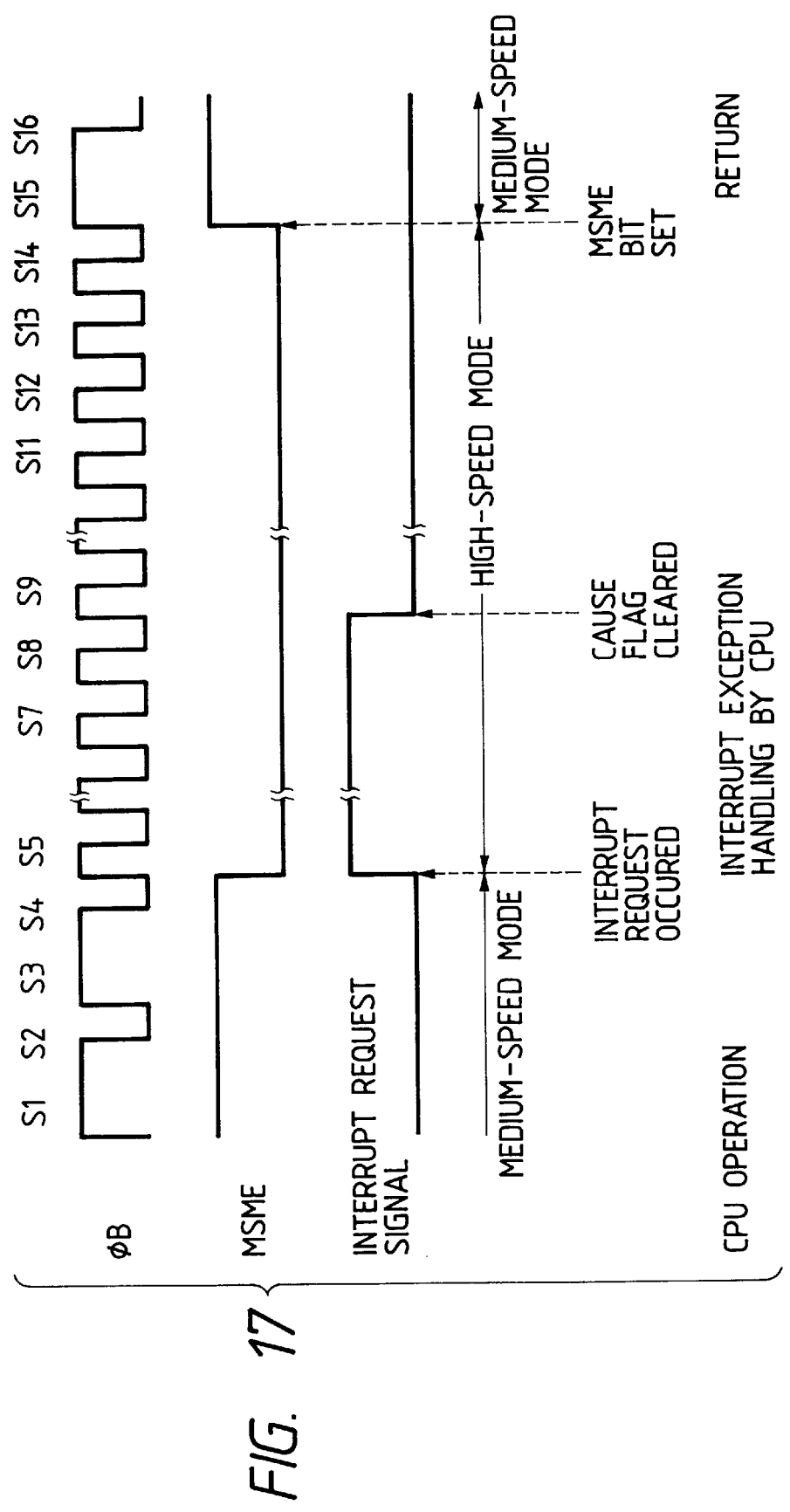
FIG. 17 typical operation timing chart in effect when an interrupt request occurs.

FIG. 17 is a typical operation timing chart in effect when an interrupt request occurs. Referring to FIG. 17, suppose that an interrupt request signal is generated in state S5 in which, after the bit CKS1 is cleared to "0" and the bits CKS0 and MSME are each set to "1," the CPU 1 is in operation with the signal $\phi B$ set for $\phi OSC/2$ (medium-speed mode). In that case, the MSME bit is cleared to "0" and the signal $\phi B$ is set for $\phi OSC$. This places the CPU 1 and data transfer controller (DTC) 2 in high-speed mode. After performing interrupt exception handling and completing the necessary processing in high-speed mode, the CPU 1 sets the MSME bit to a logical "1" in accordance with the ongoing program. For example, in state S15, the MSME bit is set to "1" and the signal $\phi B$ is set for $\phi OSC/2$. Thereafter, the CPU 1 executes a return instruction to get back to the original process.

Figure 18:
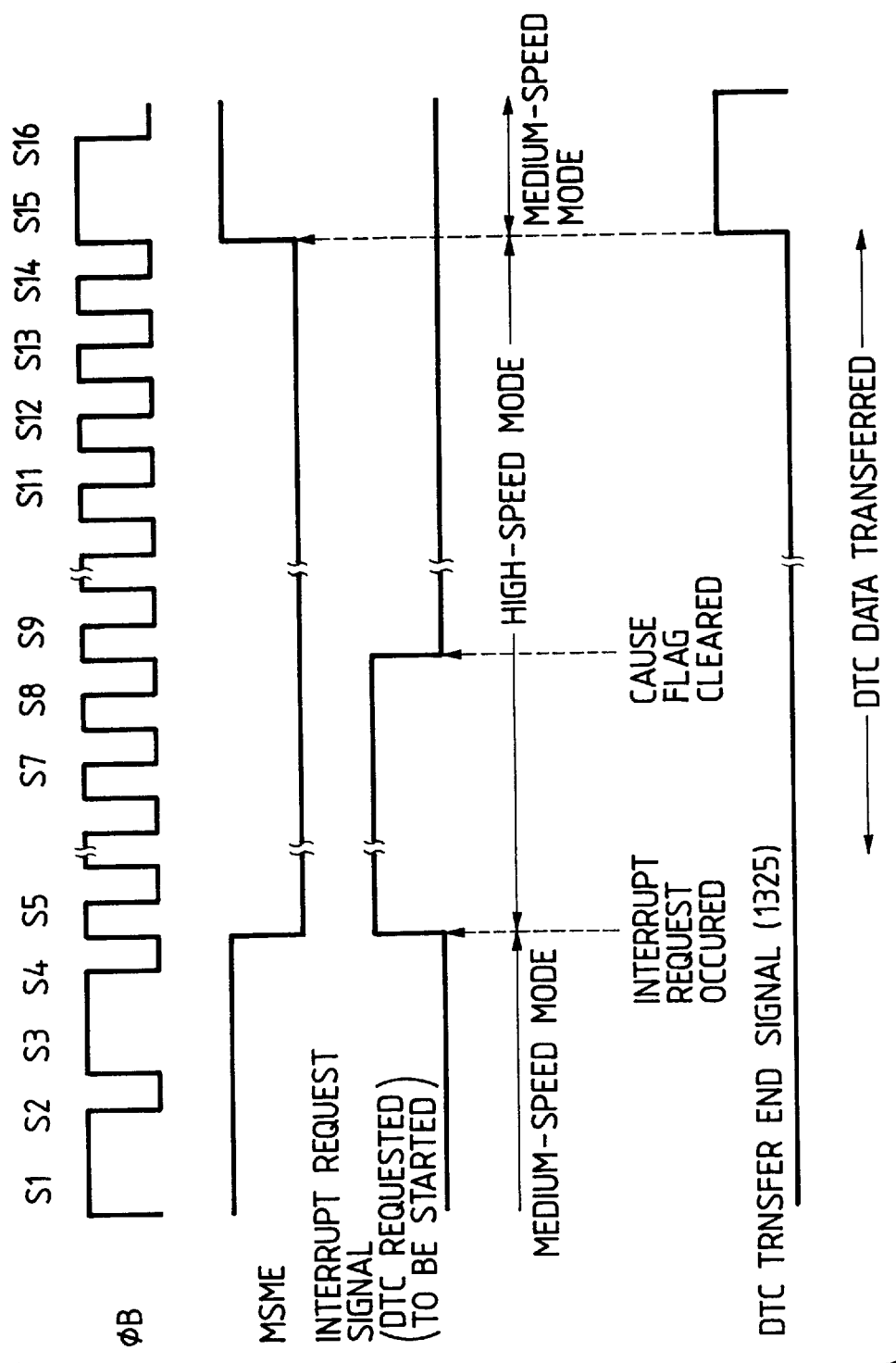
FIG. 18 is a typical operation timing chart in effect when a DTC start request occurs.

FIG. 18 is a typical operation timing chart in effect when a DTC start request is generated. As in the case of FIG. 17, suppose that after the medium-speed mode bit CKS1 is cleared to "0" and the bits CKS0 and MSME are each set to "1," the CPU 1 is in operation with the signal $\phi B$ set for $\phi OSC/2$. In that case, generation of a DTC transfer request to start the DTC causes the bit MSME to be cleared to "0" and sets the clock signal $\phi B$ for $\phi OSC$, and the CPU 1 and data transfer controller (DTC) 2 are operated accordingly. Activating the DTC 2 clears what caused the DTC to be started by interruption and allows relevant data to be transferred. After transfer of the necessary data, the DTC transfer end signal 1325 is activated from the data transfer controller (DTC) 2. This sets the MSME bit to a logical "1," whereby the operation speed of the function blocks including the CPU 1 is restored to the preceding level.

Interface Signals

Figure 19:
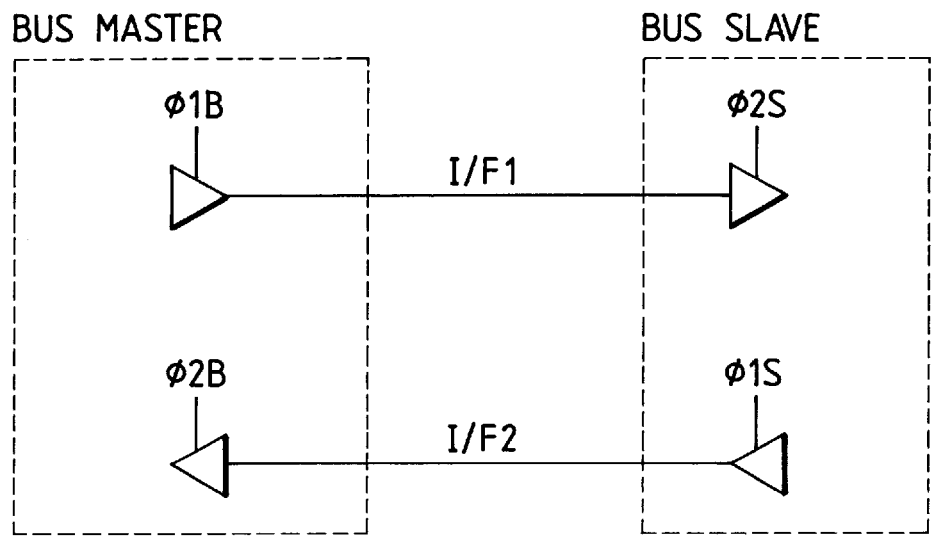
FIG. 19 is a schematic explanatory view of the specifications for a first interface between a bus master and a bus slave.
Figure 20:
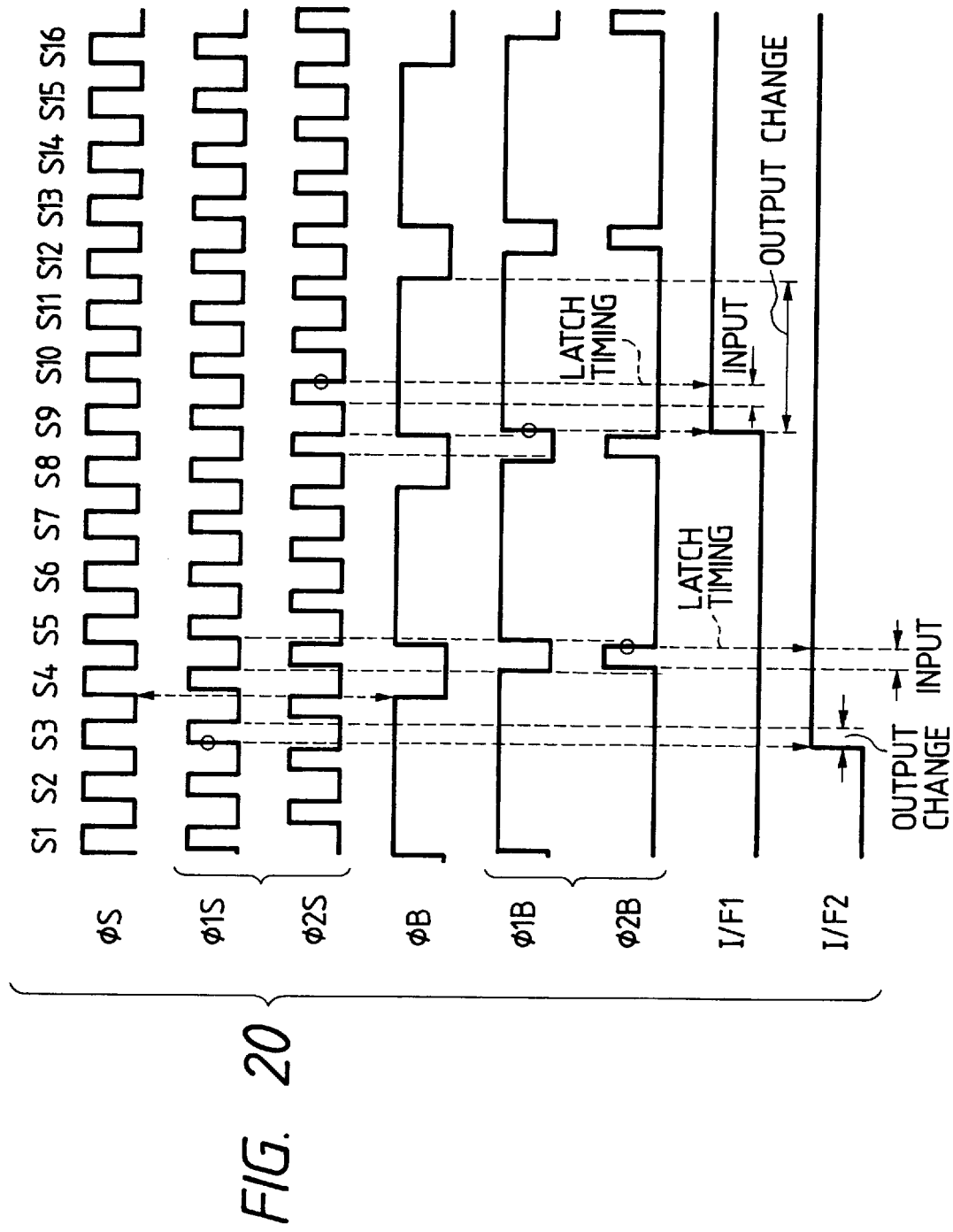
FIG. 20 is a typical timing chart showing bus master and bus slave clock signals pursuant to the specifications of FIG. 19.

FIG. 19 is a schematic explanatory view of the specifications for one typical interface between a bus master and a bus slave. In FIG. 19, interface signals I/F1 and I/F2 are shown illustratively. FIG. 20 is a typical timing chart showing bus master and bus slave clock signals pursuant to the specifications of FIG. 19. In this embodiment, the bus masters illustratively comprise the CPU 1 and DTC 2 operating in synchronism with the clock signal $\phi B$; the bus slaves are the function blocks such as the watch dog timer (WDT) 8 and serial communication interface (SCI) 9 operating in synchronism with the clock signal $\phi S$.

The clock signal $\phi B$ has a cycle that is consistently equal to or longer than that of the clock signal $\phi S$ depending on what is selected by the selector 131. The trailing edges of the clock signal $\phi B$ are synchronized with the leading edges of the signal $\phi S$. The signals $\phi 1S$ and $\phi 2S$ are non-overlapping two-phase clock signals generated from the signal $\phi S$, whereas the signals $\phi 1B$ and $\phi 2B$ are non-overlapping two-phase signals generated from the signal $\phi B$. In FIG. 20, the duty factor of the clock signal $\phi B$ is set for 50% or higher. The clock signal $\phi B$ is generated illustratively by OR'ing two signals: one obtained by dividing in two the clock signal $\phi OSC$ corresponding to the clock signal $\phi S$ using a duty factor of 50%, the other signal acquired by dividing in four the clock signal $\phi OSC$. Alternatively, the clock signal $\phi B$ may be generated by inverting the count-up signal $\phi OSC/8UP$. In the example of FIG. 20, the low-level period of the clock signal $\phi 1B$ coincides with that of the clock signal $\phi 1S$, and the high-level period of the clock signal $\phi 2B$ coincides with that of the clock signal $\phi 2S$. In other words, the low-level pulse width of the clock signal $\phi 1B$ is equal to that of the clock signal $\phi 1S$, and the high-level pulse width of the clock signal $\phi 2B$ is the same as that of the clock signal $\phi 2S$.

In the example of FIG. 19, the output of the bus master is effected in synchronism with the clock signal $\phi 1B$ being brought High; the input signal to the bus master is latched in synchronism with the clock signal 2B being driven Low. The input signal to the bus slave is latched in synchronism with the clock signal $\phi 2S$ being driven Low, and the output of the bus slave is effected in synchronism with the clock signal $\phi 1S$ being brought High. Referring to FIG. 20, the output of the bus master is effected in synchronism with the clock signals $\phi B$ and $\phi 1B$ being High; the bus slave receives its output in synchronism with the signals $\phi S$ and $\phi 1S$ also being High. The bus master receives its input when the clock signal $\phi B$ is Low and the clock signal $\phi 2B$ is High (the input is latched in synchronism with the clock signal $\phi 2B$ being driven Low). The bus slave admits its input when the signal $\phi S$ is Low and the signal $\phi 2S$ is High (the input is latched in synchronism with the clock signal $\phi 2S$ being driven Low). In the example of FIG. 20, the interface signal I/F1 is directed from the bus master to the bus slave. The interface signal I/F1 is output by the bus master in synchronism with the clock signal $\phi 1B$ being brought High in state S9; the signal I/F1 is latched by the bus slave in synchronism with the clock signal $\phi 2S$ being driven Low in state S9. The interface signal I/F2 is directed from the bus slave to the bus master. The interface signal I/F2 is output by the bus slave in synchronism with the clock signal $\phi 1S$ being brought High in state S3; the signal I/F2 is latched by the bus master in synchronism with the clock signal $\phi 2B$ being driven Low in state S4. Thus at least one state period of the clock signal $\phi S$ is secured from the time the interface signal is output until it is latched. This means that timing design is allowed to proceed in the same manner as when medium-speed mode is not considered, i.e., when $\phi B = \phi OSC$.

Figure 21:
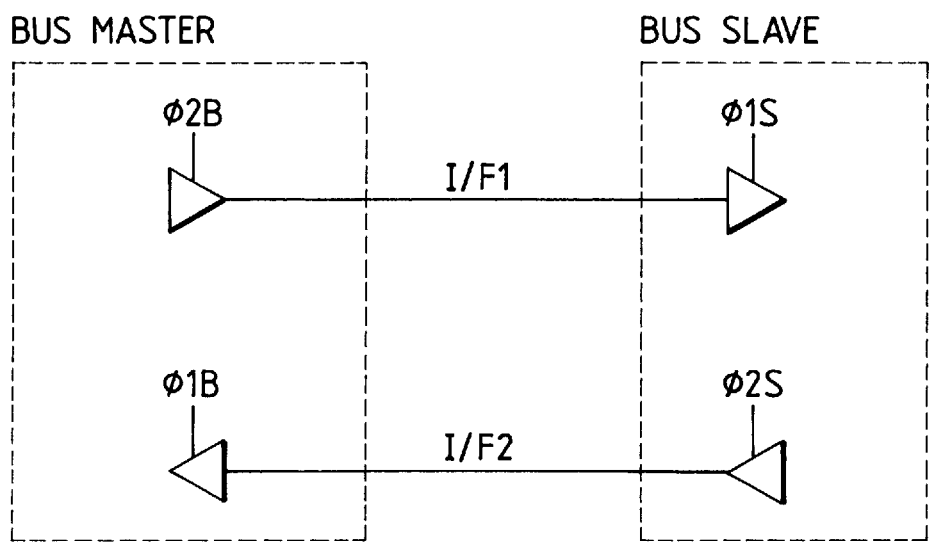
FIG. 21 is a schematic explanatory view of the specifications for a second interface between a bus master and a bus slave.
Figure 22:
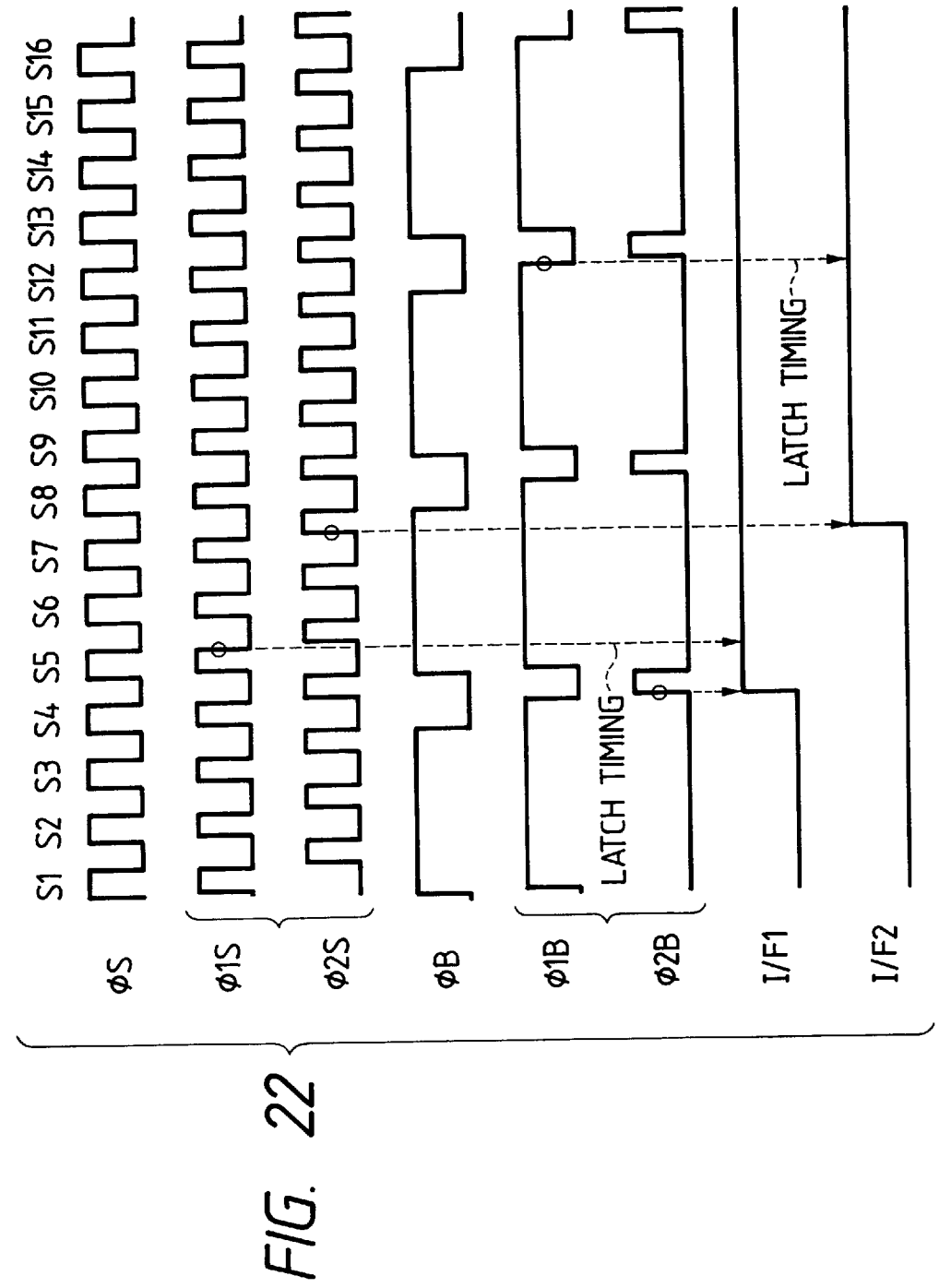
FIG. 22 is a typical timing chart showing bus master and bus slave clock signals pursuant to the specifications of FIG. 21.

FIGS. 21 and 22 present examples in which the synchronizing clock signals for input/output control are the reverse of those described with reference to FIGS. 19 and 20. In the example of FIG. 21, the output of the bus master is synchronized with the clock signal $\phi 2B$ being driven High, and the input to the bus master is latched in synchronism with the clock signal $\phi 1B$ being driven Low. The input to the bus slave is latched in synchronism with the clock signal $\phi 1S$ being driven Low, and the output of the bus slave is effected in synchronism with the clock signal $\phi 2S$ being brought High. Referring to FIG. 22, the output of the bus master occurs when the clock signal $\phi B$ is Low and the clock signal $\phi 2B$ is High; the output of the bus slave takes place when the clock signal $\phi S$ is Low and the clock signal $\phi 2S$ is High. The input to the bus master is effected when the two clock signals $\phi B$ and $\phi 1B$ are High (the input is latched in synchronism with the clock signal $\phi 1B$ being driven Low). The input to the bus slave is carried out when the clock signals $\phi S$ and $\phi 1S$ are High (the input is latched in synchronism with the clock signal $\phi 1S$ being brought Low). In the example of FIG. 22, the interface signal I/F1 is directed from the bus master to the bus slave. The interface I/F1 is output by the bus master in synchronism with the clock signal $\phi 2S$ being driven High in state S4; the signal I/F1 is latched by the bus slave in synchronism with the clock signal $\phi 1S$ being brought Low in state S5. The interface signal I/F2 is directed from the bus slave to the bus master. The interface signal I/F2 is output by the bus slave in synchronism with the clock signal φ2S being driven High in state S7; the signal I/F2 is latched by the bus master in synchronism with the clock signal φ1B being brought Low in state S12. Thus at least one state period of the clock signal φS is secured from the time the interface signal is output until it is latched. This also means that timing design is allowed to proceed in the same manner as when medium-speed mode is not considered, i.e., when φB=φOSC.

As shown in FIGS. 20 and 22, the clock signals for the bus masters (φ1B, φ2B) are lower in frequency than those for the bus slaves (φ1S, φ2S). This allows a bus master outputting an interface signal toward a bus slave always to recognize the bus slave in the same state in which the interface signal is output by the bus master. For this reason, the interface signal is allowed to have any pulse width determined in units of bus master states. Such an interface signal may be assigned a bus access signal (read signal, write signal, etc.) or an interrupt cause clear signal.

As depicted in FIGS. 20 and 22, the clock signals for the bus slaves are higher in frequency than those for the bus masters. This makes it impossible, following the output of an interface signal by a bus slave, to keep constant the timing at which the interface signal is recognized by a bus master (i.e., the timing represents the state of the bus slave in question). In that case, the so-called hand-shaking signal should be used as the interface signal. This kind of interface signal may be assigned an interrupt request signal or a DTC start request signal. Illustratively, setting the cause flag to "1" turns on the interrupt request signal which is then retained. When the CPU 1 recognizes the interrupt request signal and clears the interrupt cause flag to "0," the interrupt request signal is turned off. The interface signal is not arranged to be recognized in a single state. To use the interface signal only in a single state requires that the signal edge be detected on the input side. If the output period is arranged to be at least equal to the longest cycle of the selectable system clock signal φB, i.e., clock signal φOSC/8, then no hand-shaking procedures are required. The interrupt request signal between bus masters or between bus slaves may be exchanged at desired timings.

Figure 23:
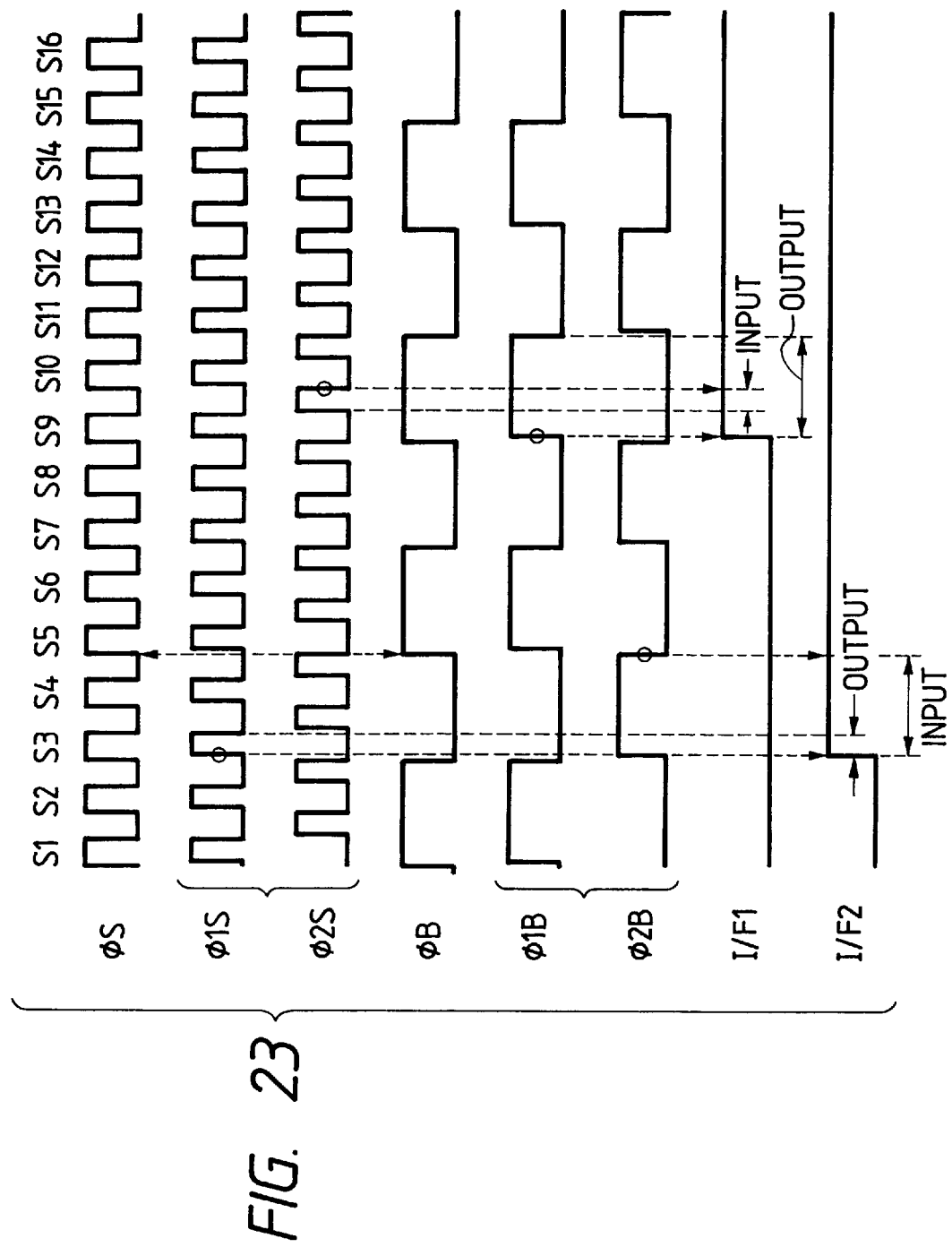
FIG. 23 is another operation timing chart illustrating bus master and bus slave clock signals.

FIG. 23 is another operation timing chart showing bus master and bus slave clock signals. Unlike its counterpart in FIGS. 20 and 22, the clock signal φB shown in FIG. 23 is arranged to have a duty factor of 50% even in medium-speed mode. The cycle of the clock signal φB is always equal to or longer than that of the signal φS, and the leading edges of the clock signal φB are synchronized with those of the signal φS. The input/output timings of the interface signal between the function blocks are the same as those in FIG. 19. More specifically, the bus master (and bus slave) is allowed to effect its output (i.e., output signal change is enabled) in synchronism with the clock signals φB and φ1B being High (when φS and φ1S are both High). The bus master (and bus slave) is allowed to receive its input when the signal φB is Low and the signal φ2B is High (when φS is Low and φ2S is High). The bus master latches the input signal in synchronism with the clock signal φ2B being driven Low; the bus slave latches the input signal in synchronism with the clock signal φ2S being brought Low. In the example of FIG. 23, the interface signal I/F1 is directed from the bus master to the bus slave. The interface signal I/F1 is output by the bus master in synchronism with the clock signal φ1B in state S9; the signal I/F1 is latched by the bus slave in synchronism with the clock signal φ2S being driven Low in state S9. The interface signal I/F2 is directed from the bus slave to the bus master. The interface signal I/F2 is output by the bus slave in synchronism with the clock signal φ1S in state S3; the signal I/F2 is latched by the bus master in synchronism with the clock signal φ2B being driven Low in state S4. Thus at least one state period of the clock signal φS is secured from the time the interface signal is output until it is latched. This means that timing design is allowed to proceed in the same manner as when medium-speed mode is not considered, i.e., when φB=φOSC.

What is noticeable about the timings in FIG. 23 is that the leading edges of the clock signal φ2B coincide with those of the clock signal φ1S. In this respect, the clock signals φ2B and φ1S match partially in phase. When the phases of these clock signals coincide, a signal output is effected from the bus slave to the bus master.

If the interface control timings based on the clock signals in FIG. 23 are inverted as shown in FIG. 21, it may not be possible, depending on the phase relation between the signals φB and φS, to secure a sufficient time period from the time the interface signal is output until it is latched. In that case, correct signal transmission is not available. Illustratively, if the bus slave outputs its signal in synchronism with the clock signal φ2S being driven High in state S6, the bus master is allowed to latch the input data in synchronism with the clock signal φ1B being brought Low in state S7. This means that only a period half as long as that of the clock signal φS is provided from the time the interface signal is output until it is latched. Although this arrangement is sufficient where only one signal line exists, problems occur with a bus comprising a plurality of signal lines over which new and old signals are transmitted simultaneously in a mixed fashion. The combination of these signals may constitute meaningless data or may result in a malfunction.

Where the clock signal waveforms of FIG. 23 are utilized in conjunction with the interface specifications of FIG. 19, the interface signal sent from the bus master to the bus slave is always recognized by the latter in the same state in which the interface signal is output by the bus master. This is because the clock signals for the bus masters are lower in frequency than those for the bus slaves, as illustrated in FIG. 23. Therefore the interface signal is allowed to have any pulse width determined in units of states. This kind of interface signal may be assigned a bus access signal (read signal, write signal, etc.) or an interrupt cause clear signal.

As described, the clock signals for the bus slaves are higher in frequency than those for the bus masters. This makes it impossible, following the output of the interface signal by the bus slave in FIG. 23, to keep constant the timing at which the interface signal is recognized by the bus master (i.e., the timing represents the state of the bus slave in question). In that case, the so-called hand-shaking signal should be used as the interface signal. This kind of interface signal may be assigned an interrupt request signal or a DTC start request signal. If the output period is arranged to be at least equal to the longest cycle of the selectable system clock signal φB, i.e., clock signal φOSC/8, then no hand-shaking procedures are required.

What follows is a more detailed description of the clock signal waveforms in FIGS. 20 and 22. As evident in FIGS. 20 and 22, the high-level period of the clock signal φ2B is included in the low-level period of the clock signal φ1S. This means that a time allowance effectively equivalent to at least one state of the signal φS is secured from the time the bus slave effects its output in synchronism with the clock signal φ1S being driven High, until the bus master latches the input signal in synchronism with the clock signal φ2B being brought Low. Meanwhile, the high-level period of the clock signal φ2S is included in the low-level period of the signal φ1B. This means that a time allowance effectively equivalent to at least one state of the signal φS is secured from the time the bus master effects its output in synchronism with the clock signal φ1B being driven High, until the bus master latches the input signal in synchronism with the clock signal φ2S being brought Low. The characteristics above apply to the interface specifications of both FIG. 19 and FIG. 21. On the other hand, consider utilizing the clock signals φ1S, φ2S, φ1B and φ2B of which the leading and trailing edges match in phase (e.g., leading edges of the clock signal φ2B coincide with trailing edges of the signal φ1S, as shown in FIG. 23). In that case, a time allowance equivalent to one state of the signal φS is secured between the output of a signal and the latching of that signal upon input, solely in conjunction with the bus interface specifications (e.g., of FIG. 19) that allow the bus slave to output its signal to the bus master in synchronism with the above-described phase coincidences.

Practical Examples of Bus Interface Timings

Figure 24:
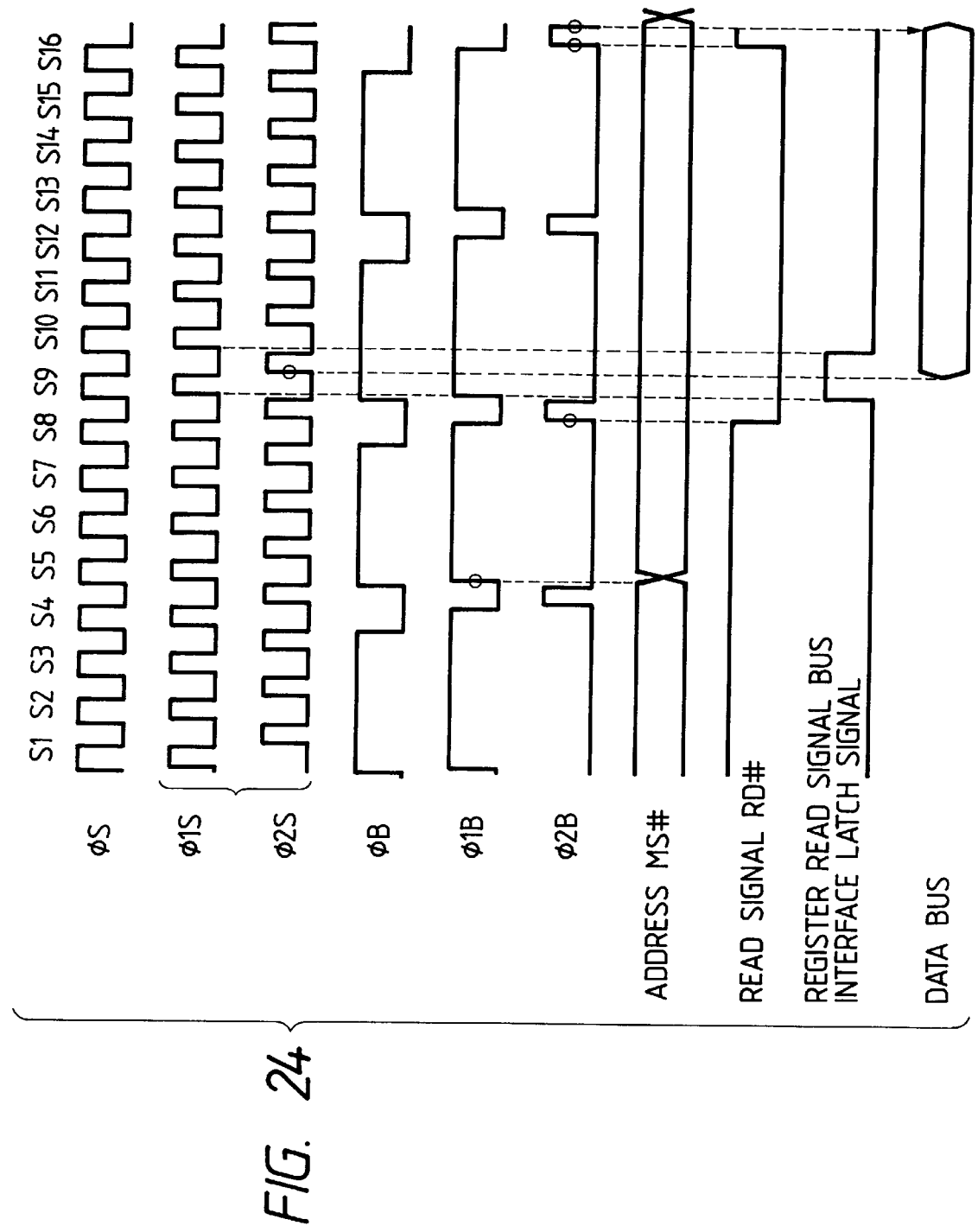
FIG. 24 typical timing chart of a bus interface in effect when data is read from a bus slave.
Figure 25:
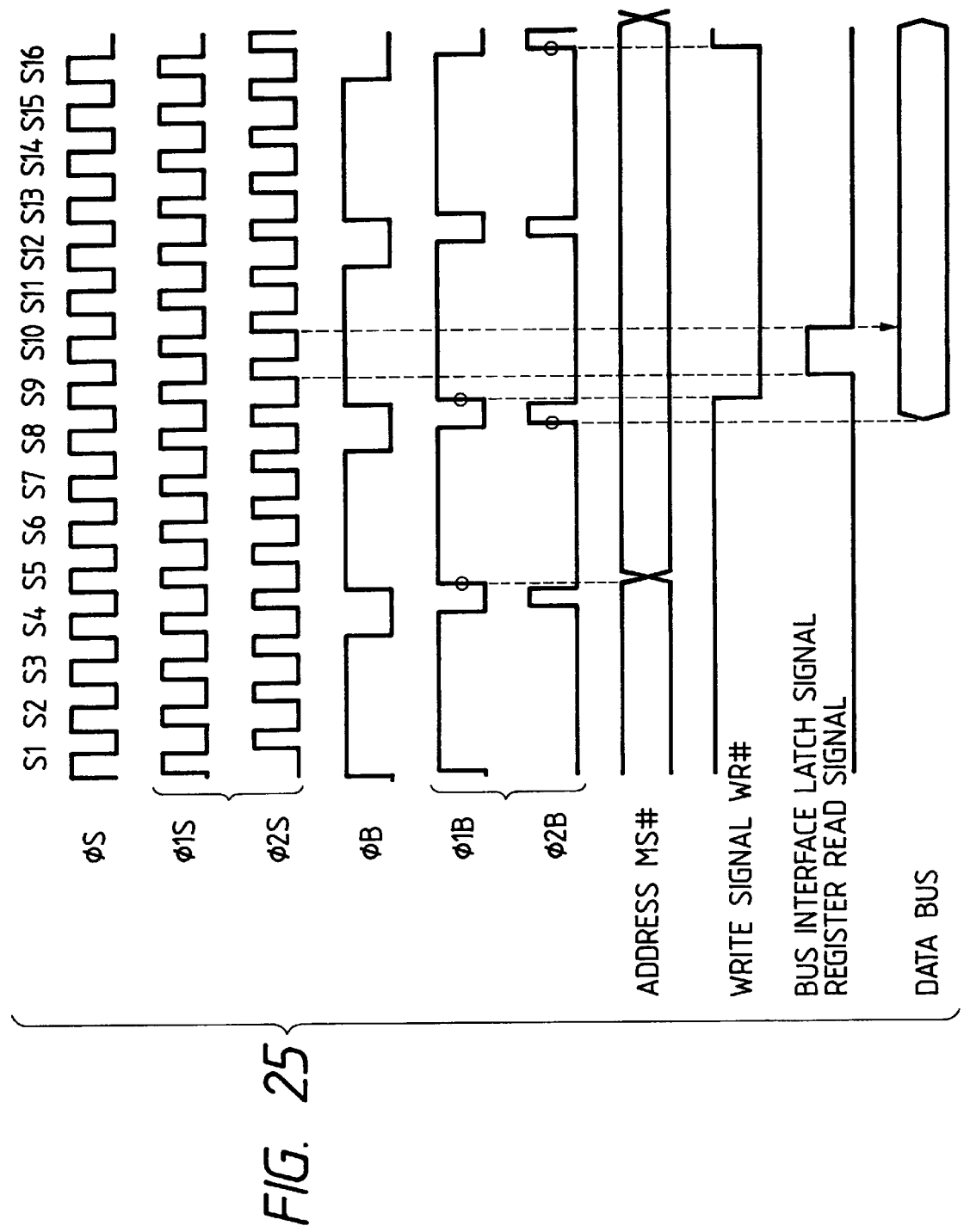
FIG. 25 is a typical timing chart of the bus interface in effect when data is written to a bus slave.

FIGS. 24 and 25 illustrate typical bus interface timings. The timings in each figure apply when the clock signals of FIGS. 20 and 22 are utilized. Since the interface specifications of FIGS. 19 and 21 can be used in the completely identical manner as described, an optimum set of interface specifications is adopted for the examples of FIGS. 24 and 25 depending on the signal type. In FIGS. 24 and 25, the bus master outputs an address (via PAB), a function block signal (MS#), a read signal RD# and a write signal WR#. In FIG. 24, the bus master performs a read operation starting in state S5. Specifically, the address bus and the function block selection signal (MS#) become effective from state S5 to state S16. The read signal RD# is turned on (i.e., brought Low) in synchronism with the clock signal φ2B in the first state (states S5 through S8) of the bus master. The bus slave detects the transition of the read signal RD# to the activate status, and turns on accordingly a register read signal and a bus interface latch signal inside. For example, as shown in FIG. 6, the register 771 or timer counter 772 is first designated by the register read signal. Data is transferred from the designated register or counter to the bus interface 760 via the module data bus, and the transferred data is latched. The control signals inside the bus slave such as the register read signal are included illustratively in the output control signal of the read/write control circuit 730 in FIG. 6. The latched data is output onto the data bus in synchronism with the next clock signal φ2S in state S9. With the read signal RD# turned off, the data bus is placed in the high impedance state in synchronism with the clock signal φ1S being changed in level in the state next to state S16. The read signal RD# is turned off in synchronism with the clock signal φ2B being driven High in the third state (from state S13 to state S16) of the bus master. The bus master latches the contents of the data bus in synchronism with the clock signal φ2B being brought Low.

In FIG. 25, the bus master performs a write operation starting in state S5. The address bus and the function block selection signal (MS#) become effective from state S5 to state S16. Write data is output onto the data bus in synchronism with the clock signal φ2B being driven High in the first state (from state S5 to state S8) of the bus master. The write signal WR# is turned on (i.e., brought Low) in synchronism with the clock signal φ1B being driven High in the second state (from state S9 to state S12) of the bus master. The bus slave detects the transition of the write signal WR# to the activate status, and turns on accordingly the bus interface latch signal and register write signal. The write data is latched by the bus interface before it is transferred via the module data bus to the designated register or timer counter for writing therein. The control signals above are included illustratively in the control signal output by the read/write control circuit 730 in FIG. 6. The write signal is turned off in synchronism with the clock signal φ2B being driven High in the third state (from state S13 to state S16) of the bus master.

External Output of Clock Signals φ

Figure 26:
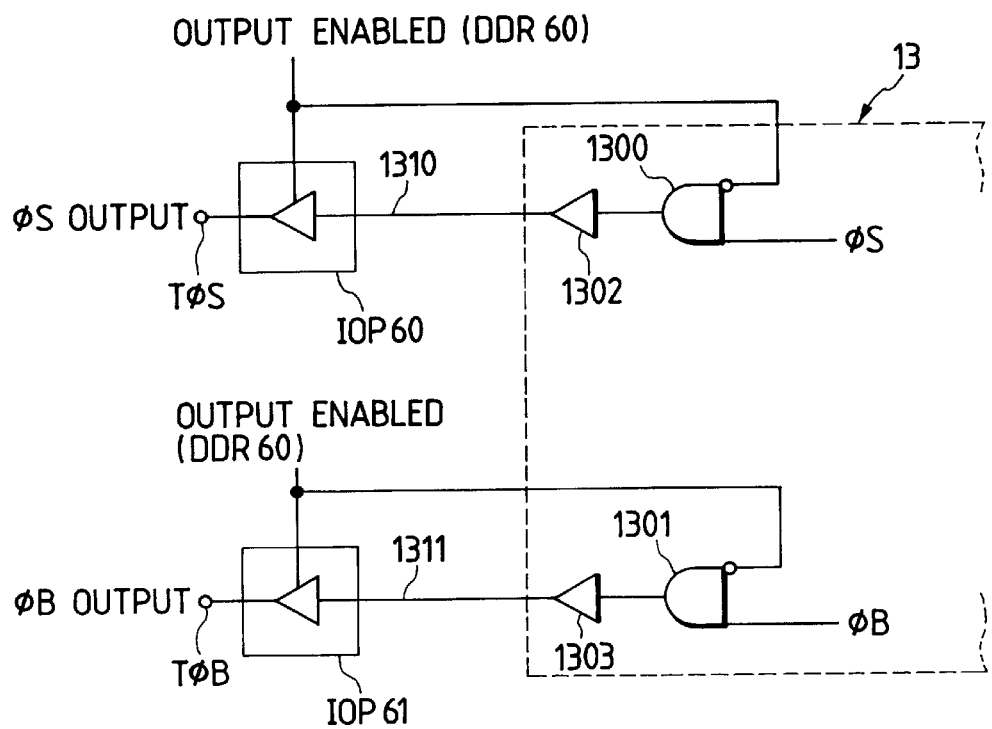
FIG. 26 is a explanatory view of a structure for allowing both clock signals φS and φB to be selectively output to the outside.

As depicted in FIG. 26, the single-chip microcomputer of this invention is capable of outputting the system clock signals φS and φB to the outside. The system clock signal φS may be furnished as a reference clock signal for use by another semiconductor integrated circuit or the like, and the system clock signal φB may be used as the basis for generating control signals in synchronism with an external bus. These objects are attained by the inventive single-chip microcomputer outputting the two system clock signals. Output terminals TφS and TφB dealing with the two system clock signals are furnished separately to predetermined I/O ports IOP. Illustratively, the output of the clock signal φS is assigned to the I/O port IOP60, and the output of the clock signal φB is assigned to the I/O port IOP61. The I/O ports IOP60 and IOP61 double as ports for other I/O capabilities and are included in the I/O port IOP6 shown in FIG. 1.

In the setup above, the clock signals φS and φB are generated by the clock control circuit 13 and are sent to the outside via the I/O ports IOP60 and IOP61. Inside the semiconductor integrated circuit, the clock signals φS and φB are effectively among the highest-speed signals. Lines 1310 and 1311 between the clock control circuit 13 on the one hand and the I/O ports IOP60 and IOP61 on the other extend between the function blocks and have relatively high capacity components. When output to the outside, these clock signals thus entail high levels of current consumption because of their relatively large capacity components and their high clock frequencies.

The external output of any of these clock signals is a necessary operation and the concomitant current consumption is unavoidable. However, there are many cases in which the single-chip microcomputer need not output clock signals to the outside. In such cases, stopping the clock signal output contributes not only to reducing power dissipation but also to lowering coupling noise and slashing unnecessary radiation, as discussed illustratively in Japanese Patent Application No. Sho 60-184207. This power-saving feature is implemented by the embodiment of the invention as follows: where the clock signal φS or φB need not be sent to the outside, the signals between the clock control circuit 13 on the one hand and the I/O ports IOP60 and IOP61 on the other are fixed illustratively to a logical "1" each so that no signal change will occur over the clock lines 1310 and 1311. This ensures reduced power dissipation. For example, as shown schematically in FIG. 26, a circuit arrangement to connect an AND circuit 1300 serially to a clock driver 1302 is provided for the external output of the clock signal φS generated by the clock control circuit 13. This connects the output of the clock driver 1302 via the clock line to the I/O port IOP60. Likewise, a circuit arrangement to connect an AND circuit 1301 serially to a clock driver 1303 is furnished for the external output of the clock signal φB generated by the clock control circuit 13. This connects the output of the clock driver 1303 via the clock line to the I/O port IOP61. The output to the I/O port IOP60 or IOP61 may be enabled by use of the corresponding bit DDR60 or DDR61 in a data direction register, not shown, in the relevant I/O port IOP6. Setting the bit DDR60 or DDR61 to a logical "1" enables the I/O port IOP60 or IOP61 for signal output. The two clock signals φS and φB may be enabled independently of each other for output. In the operation above, the other of the two inputs of the AND circuit 1301 is fed with an inverted signal of the output enable bit DDR61. Thus when the outputs of the clock signals φS and φB are not enabled for the I/O ports IOP60 and IOP61, the outputs of the AND circuits 1300 and 1301 are set fixedly to the Low level. This makes it possible to reduce power dissipation over the clock lines downstream of the clock drivers 1302 and 1303 when the clock signals φS and φB are not output to the outside. In addition, coupling noise and unnecessary radiation are also reduced.

Figure 27:
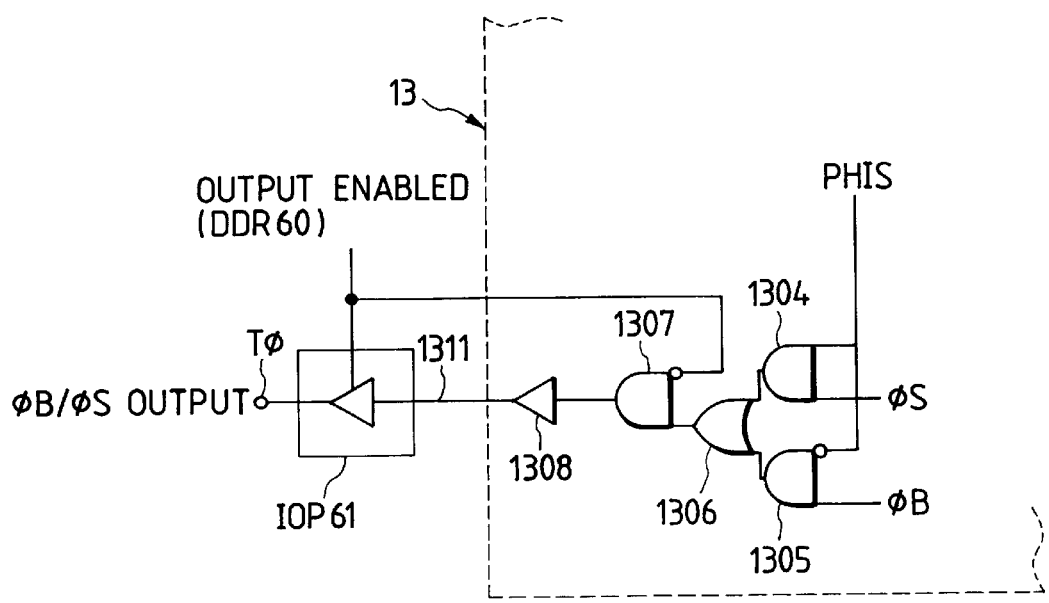
FIG. 27 is an explanatory view of a structure for allowing one of the clock signals φS and φB to be selectively output to the outside.

FIG. 27 shows an alternative structure for allowing one of the clock signals φS and φB to be selectively output to the outside. For this setup, the clock control register 132 has a PHIS bit illustrated in FIGS. 28(A) and 28(B). As shown in FIG. 28(B), setting the PHIS bit to a logical "1" designates the output of the clock signal φS to the outside; setting the PHIS bit to a logical "0" specifies the output of the clock signal φB to the outside. The clock signal to be output is selected by a selector comprising AND circuits 1304 and 1305 as well as an OR circuit 1306. The clock signal selected by this selector is enabled for external output by the output enable bit DDR60 corresponding to the I/O port IOP60. As in the example of FIG. 26, an inverted signal of the output enable bit is fed to an AND circuit 1307. Only when the output enable bit DDR60 enables the clock signal for output, is the output clock signal of the selector sent via a clock line to the I/O port IOP61 from the AND circuit 1307 and a clock driver 1308. When the clock signal output to the external terminal Tφ is disabled, the output of the AND circuit 1307 is set fixedly to a logical "0" as described above. This arrangement reduces power dissipation over the clock lines downstream of the clock driver 1308.

Multiple Division of the Internal Bus Structure

FIG. 29 indicates how the internal bus structure of the inventive single-chip microcomputer is divided alternatively. This is a block diagram highlighting the layout of the internal bus structure in the single-chip microcomputer. In FIG. 29, the buffer BUF is included in the I/O ports IOP1 through IOP5 and constitutes a buffer circuit interfaced to the external address bus and external data bus.

The internal address bus PAB shown in FIG. 1 is divided into an internal address bus PAB1 and an internal data bus PDB1 in FIG. 29. Likewise the internal data bus PDB in FIG. 1 is divided into an internal address bus PAB2 and an internal data bus PDB2 in FIG. 29. The internal buses PAB1 and PDB1 are connected to the I/O ports IOP1 through IOP6, watch dog timer (WDT) 8 and static latch circuit HD1. The internal buses PAB2 and PDB2 are connected to the I/O ports IOP7 through IOP11, timer 7, serial communication interface (SCI) 9, A/D converter 10 and static latch circuit HD2.

In practice, the divided internal buses and the circuit modules are laid out in such a manner that the internal buses PAB1 and PAB2 have the same line length and the same line capacity; that the internal buses PDB1 and PDB2 also have the same line length and the same line capacity; and that the total line capacity of the divided internal buses will not exceed the line capacity of the internal buses PAB and PDB in FIG. 1. In logic terms, none of the I/O port IOP, timer 7, watch dog timer (WDT) 9 and A/D converter 10 is constrained to connect with any specific bus among the divided internal buses.

A module selection judgment made by the bus controller 3 activates one of the buses PAB1 and PDB1 and one of the buses PAB2 and PDB2. If the ROM 5 or RAM 6 is accessed, all of the buses PAD1, PDB1, PAD2 and PDB2 are deactivated. In the bus inactive state, the internal address buses PAB1 and PAB2 retain their preceding values. When the output of the function blocks such as the bus controller 3 and WDT 8 is placed in the high impedance state, the static latch circuits HD1 and HD2 cause the internal data buses PDB1 an PDB2 to retain their preceding values. The static latch circuits HD1 and HD2 are each constituted illustratively by two inverter circuits connected in inverse parallel fashion to each signal line. These latch circuits are designed to retain the status of the buses PDB1 and PDB2. If another function block outputs data, the static latch circuits HD1 and HD2 let their relatively small bus driving capabilities be overridden by the output data for bus use. Specifically, the output currents of the inverter circuits constituting the static latch circuits HD1 and HD2 are larger than the leakage currents of the buses PDB1 and PDB2 and are sufficiently smaller than the output current of each function block. The internal bus PDB or PAB in FIG. 1 may be divided alternatively into three or more buses. Where the lines making up the internal address bus PAB are small in number, the internal address bus PAB may be left integral and the internal data bus PDB alone may be divided into a plurality of buses.

Vectoring the Low Power Dissipation Information

The frequency of the clock signal φB may be forcibly increased so as to speed up the processing dealing with interrupt requests and other events. One way to accomplish this object is to utilize the MSME bit in the clock control register 132 as described earlier with reference to FIGS. 9 and 10(A). Another way is for the CPU to get low power dissipation information as vectors at the start of interrupt handling (including exception handling such as reset). Part of the address space of the CPU 1 has a plurality of vectors written therein, the vectors corresponding to various kinds of interruption. When an interrupt request occurs, the CPU 1 gets the vector corresponding to the requested interruption, and performs processing in accordance with the interrupt-related information retained in the retrieved vector. More specifically, when the interrupt request is generated, the CPU 1 outputs the address for designating the vector corresponding to the requested interruption. From the vector region indicated by the address, the interrupt-related information is retrieved by the CPU 1. With this embodiment, the interrupt-related information includes the start address of the program (i.e., handler program) to be executed to deal with the interruption, and low power dissipation information. In response to the interrupt request, the start address is set to a program counter, not shown, in the CPU 1 so as to execute the handler program. The low power dissipation information is set to the module stop control register 133 and clock control register 132, as will be described later. In preparation for return to the original program after the interrupt request is dealt with, the contents of the status register and the return address are written to a particular address region (i.e., stack region) in the address space of the CPU 1, as will also be discussed later. The stack region is designated by a stack pointer, not shown, in the CPU 1 in response to the interrupt request. As will be understood from the description that follows, not only the status register contents and the return address but also the contents of the module stop control register 133 and clock control register 132 are written (i.e., stacked) to the stack region designated by the stack pointer. Illustratively, an interrupt vector has control information for setting medium-speed mode and a module stopped state as low power dissipation information, in addition to the start address of the handler to be executed upon interruption. In such a case, the initial value of the clock control register 132 may be determined by the low power dissipation information in a reset vector. If the initial value of the register 132 is set for medium-speed mode, the low power dissipation state will be set immediately after reset. This arrangement reduces burdens on software and lowers current consumption illustratively by allowing the processing to be started in medium-speed mode.

Figure 30A:
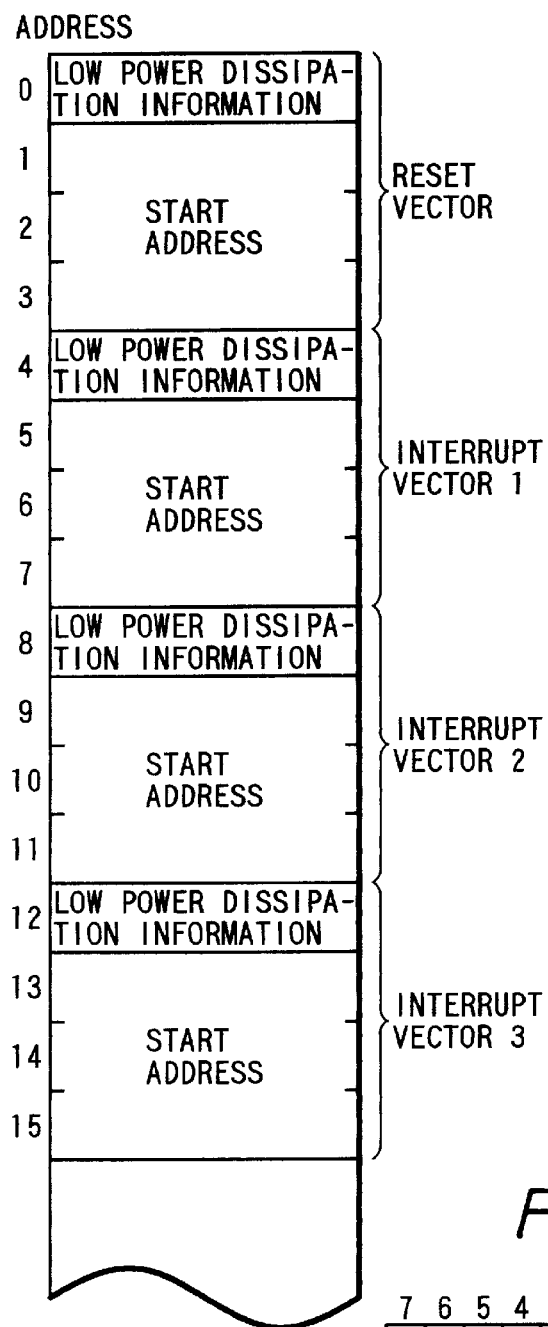
FIGS. 30 (A) through 30(C) are explanatory views depicting how vector arrays designate a low power dissipation state and how these arrays are stacked.
Figure 30C:
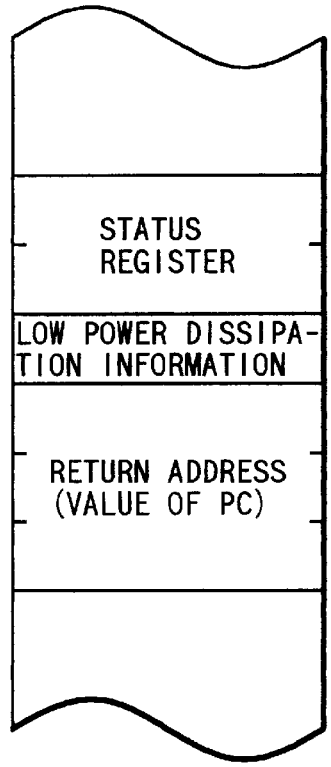
Figure 30B:
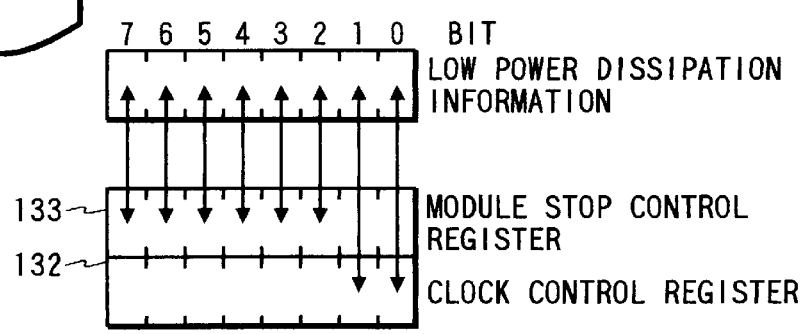

FIGS. 30(A) through 30(C) depict how vector arrays designate a low power dissipation state and how these arrays are stacked. In this example, as shown in FIG. 30(B), low power dissipation information comprises eight bits. Specifically, the eight-bit low power dissipation information includes six bits (bits 7–2) corresponding to bits 7 through 2 of the module stop control register 133 (MSTP7–MSTP2), and two bits (bits 1 and 0) corresponding to bits 0 and 1 of the clock control register 132 (CKS0, CKS1). In the vector array of FIG. 30(A), the start address is 24 bits long if the address space is 16 MB. As shown in FIG. 30(C), the stack includes not only the return address and the low power dissipation information for use at the destination of the return, but also a 16-bit storage region constituting a status register for retaining the internal status of the CPU 1. This status register comprises a condition code indicating the result of processing and an interrupt mask bit. In the description that follows, bits 7 through 2 of the module stop control register 133 (MSTP7–MSTP2) and bits 0 and 1 of the clock control register 132 (CKS0, CKS1) will be regarded as constituting a low power dissipation control register and referred to as such.

Figure 31:
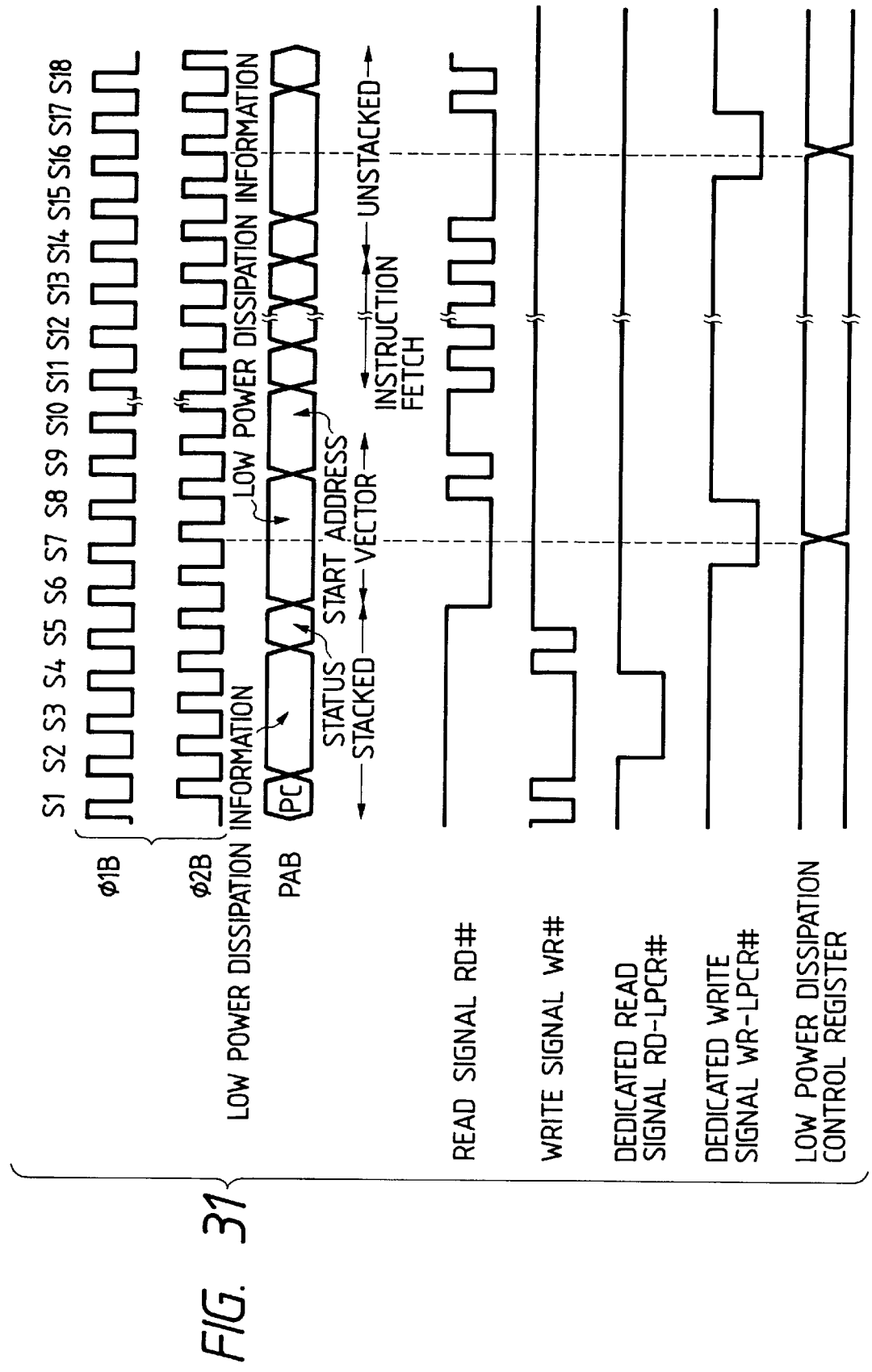
FIG. 31 is a typical operation timing chart in effect when the embodiment of the invention having low-power dissipation information arranged in vectors carries out exception handling followed by a return.

FIG. 31 shows typical operation timings in effect when exception handling is performed followed by a return. It is assumed illustratively that data is written to or read from the ROM 5 and RAM 6 in one state and that the instructions and vectors are located in the ROM 5 while the stack is provided in the RAM 6. At the time of exception handling, the current value of the program counter (PC), the information in the low power dissipation control register (CKS0 and CKS1 in the clock control register 132, MSTP2–MSTP7 in the module stop control register 133), and the contents of the status register (not shown) are saved into the stack (in states S1 through S5). In other words, a dedicated read signal RD-LPCR# is turned on to read the contents of the low power dissipation control register (in states S2 through S4), and the write signal WR# is activated so as to write the register contents to the stack. After the stack operation, the relevant vector comprising the contents of the low power dissipation control register and program counter (PC) is read from the ROM 5 (in states S6 through S9). The contents of the low power dissipation control register retrieved from the ROM 5 are not sent to the CPU 1 but written to the low power dissipation control register (in states S6 through S8). The writing of the data to the low power dissipation control register is accomplished by a dedicated write signal WR-LPCR# being turned on. This changes the contents of the low power dissipation control register starting in state S7, causing the medium-speed and module stop settings to be updated. The start address as part of the vector is placed into the program counter, not shown, in the CPU 1 so that the CPU 1 starts instruction execution from that start address (in states S11 through S13).

Upon return, the contents of the status register, low power dissipation control register and program counter (PC) are read from the stack in the RAM 6 (states S14 through S18). The contents of the low power dissipation control register retrieved from the stack are not sent to the CPU 1 but written to the low power dissipation control register. The return address is placed into the CPU 1 so that the CPU 1 starts instruction execution from that return address. The contents of the status register are placed into the CPU 1. The contents of the low power dissipation control register are restored starting in state S16. That is, the medium-speed and module stop settings are restored to those in effect before state S6. If medium-speed mode is set for the states before state S6 and after state S16 and if high-speed mode is set for the states ranging from S7 to S15, the same operation as shown in FIG. 17 may be implemented without extra burdens on software. Because the low power dissipation status may be set for each interruption, interrupt requests not requiring high-speed processing are left to be handled at an appropriate operation speed. Thus power will not be consumed unnecessarily. The module stop feature, in stopping any one of the function blocks while retaining its internal status, allows the interrupt handling routine to be executed uninterrupted at high speed. For example, the DTC 2 may be stopped from using the buses so as to let the CPU 1 operate continuously at high speed.

Figure 32:
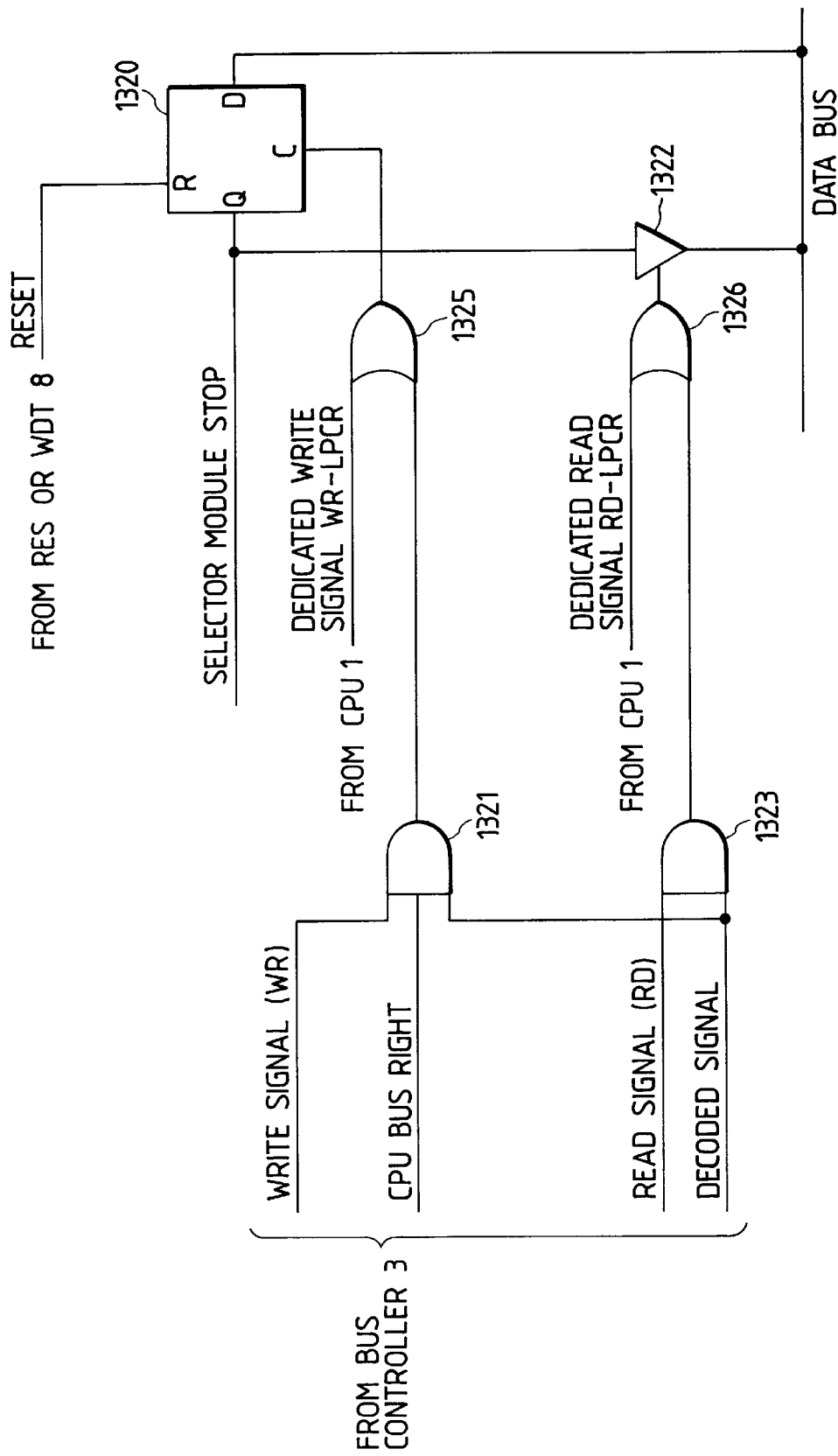
FIG. 32 is a typical block diagram of a one-bit structure in a low power dissipation control register.

FIG. 32 shows a typical one-bit structure in the low power dissipation control register. As described above, the low power dissipation control register is composed of bits 1 and 0 of the clock control register 132 and of bits 7 through 2 of the module stop control register 133. The structure in FIG. 32 is a variation of what is shown in FIG. 16 supplemented by two OR circuits 1325 and 1326. The clock input terminal C in FIG. 32 is fed with the dedicated write signal WR-LPCR via the OR circuit 1325. This causes the data bus contents to be input regardless of address designation. The read signal of the clocked buffer 1322 is given in the form of the dedicated read signal RD-LPCR via the OR circuit 1326. This causes the register contents to be output onto the data bus regardless of address designation. The dedicated write signal WR-LPCR and dedicated read signal RD-LPCR are generated illustratively by the CPU 1 and used as signals common to bits 1 and 0 of the clock control register 132 and to bits 7 through 2 of the module stop control register 133. In FIG. 32, the signals RD, WR, RD-LPCR and WR-LPCR are indicated as positive logic signals for the ease of understanding.

Typical Sub-clock Pulse Generators

Figure 33:
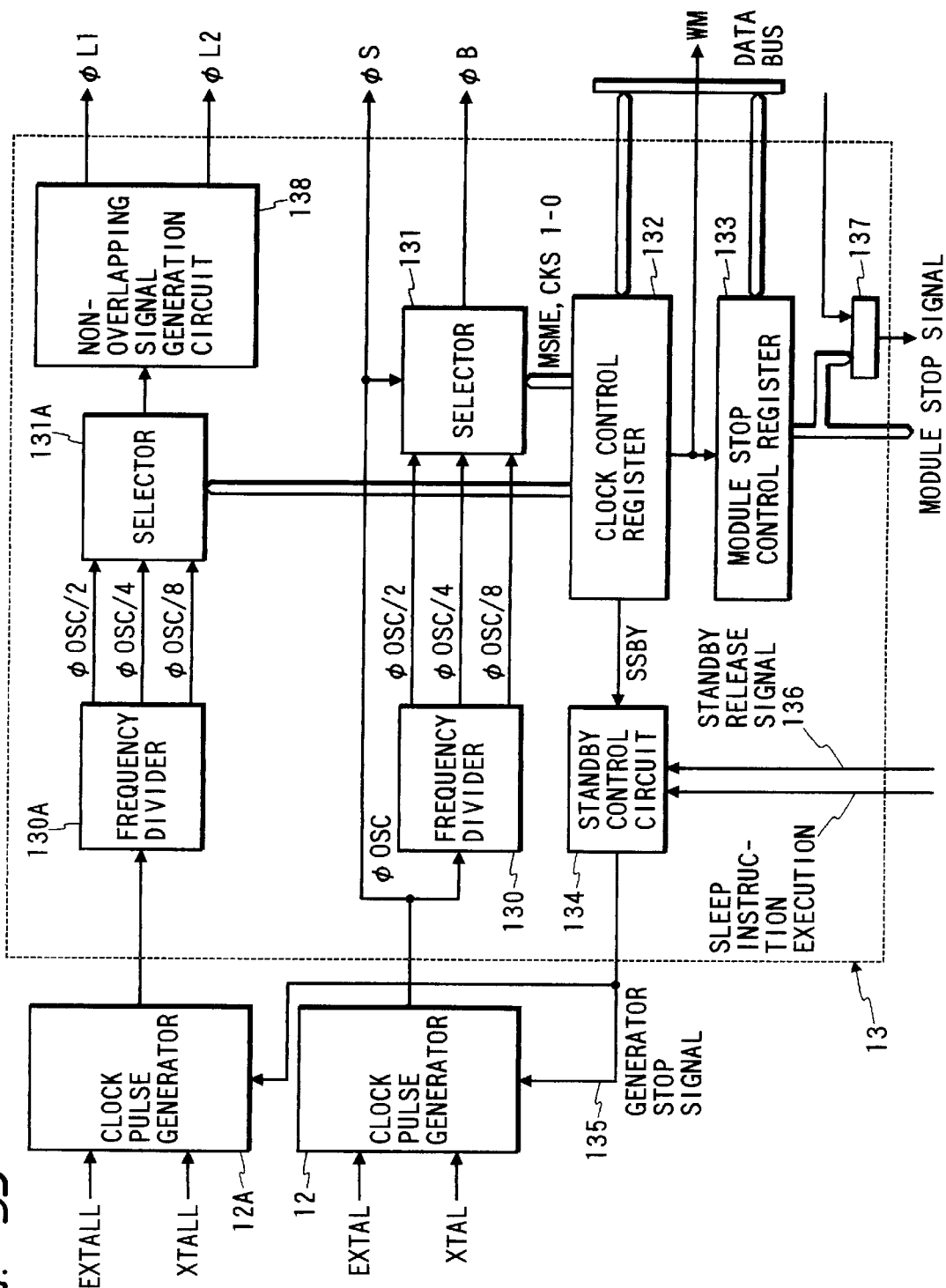
FIG. 33 is a block diagram of a clock pulse generator and a clock control circuit used alternatively by the invention.

FIG. 33 is a block diagram of a clock pulse generator and a clock control circuit used alternatively by the invention. The setup in FIG. 33 is a variation of what is shown in FIG. 9 supplemented by a second clock pulse generator 12A, a frequency divider 130A, a selector 131A and a non-overlapping signal generation circuit 138. Terminals EXTALL and XTALL of the second clock pulse generator 12A are connected illustratively to a crystal oscillator having an oscillation frequency of 32.768 kHz. A single-chip microcomputer with two clock pulse generators is discussed illustratively in "H8/3834 HD6473834 hD6433834 Hardware Manual" issued by Hitachi, Ltd. in September 1992. The second frequency divider 130A divides the clock signal by up to 8 in the same manner as the other frequency divider discussed earlier. Any one of the divided clock signals φOSC/2, φOSC/4 and φOSC/8 is selected by the selector 131A in accordance with the control bit setting in the clock control register 132. On the basis of the clock signal thus selected, the non-overlapping signal generation circuit 138 generates non-overlapping two-phase clock signals φ1L and φ2L. These clock signals are supplied to the relevant function blocks such as the CPU 1 and timer 7. Unlike its counterpart incorporated in each of the function blocks, the non-overlapping signal generation circuit 138 operates at a low frequency and on a low voltage. Working at a low frequency, the non-overlapping signal generation circuit 138 supplies the CPU 1, timer 7, etc. with the two-phase clock signals φL1 and φL2 and still poses no disadvantage in terms of power dissipation.

The non-overlapping two-phase clock signals φ1L and φ2L are used illustratively by the single-chip microcomputer for what is known as clock processing. The clock control register 132 contains a watch mode bit WM. Setting the watch mode bit WM to a logical "1" causes the single-chip microcomputer to operate at a minimum frequency necessary for clock processing. The so-called clock frequency refers to a process whereby the display of a clock, one of the objects to be controlled by the single-chip microcomputer, is updated at constant intervals (e.g., in increments of one second). The CPU 1 executes clock processing upon timer interruptions generated at constant intervals by a timer operating in accordance with the non-overlapping two-phase clock signals φ1L and φ2L.

Figure 34:
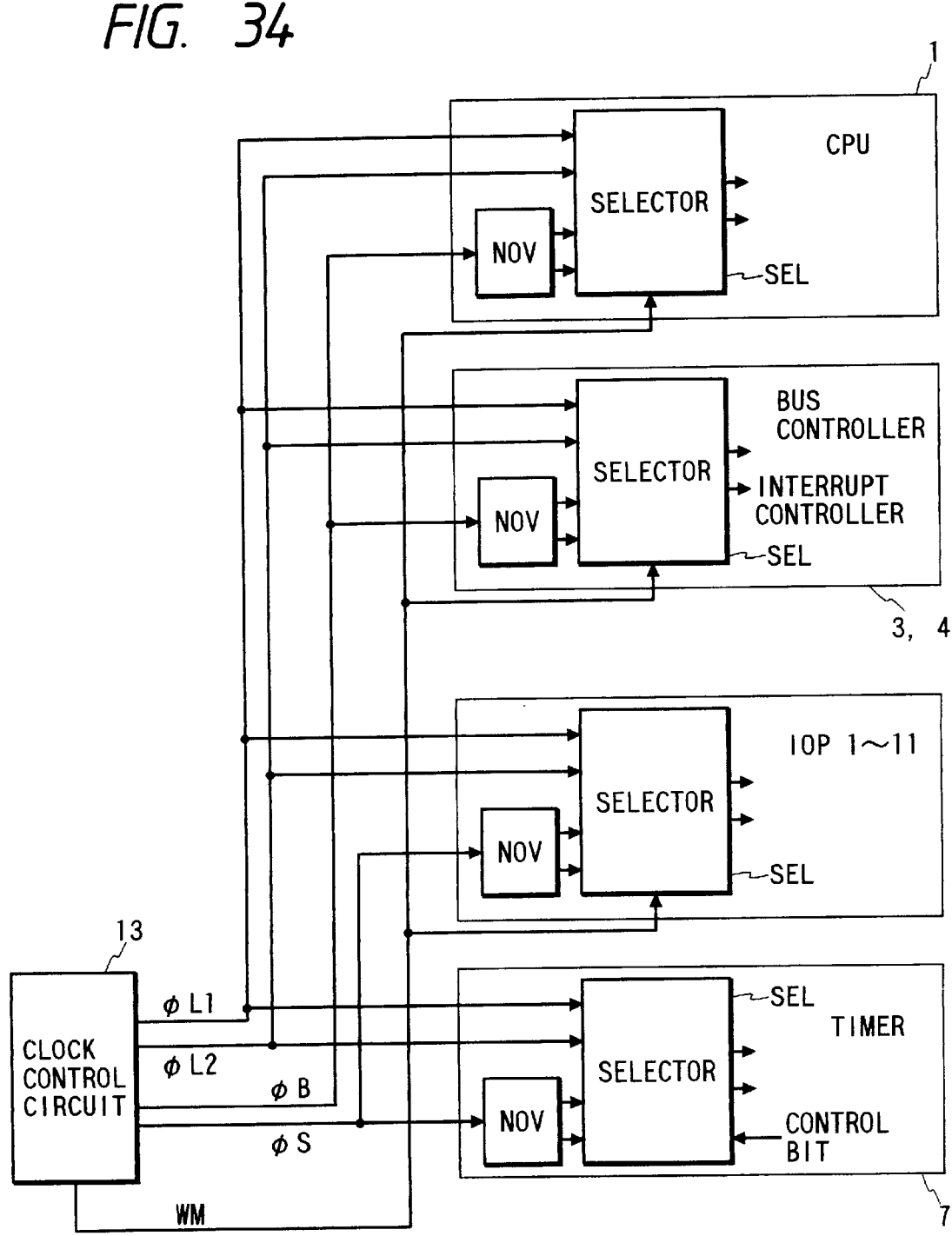
FIG. 34 is a schematic block diagram of a single-chip microcomputer, highlighting how the clock control circuit of FIG. 33 supplies clock signals φ1L and φ2L to other function blocks within the microcomputer.

FIG. 34 is a schematic block diagram of a single-chip microcomputer, highlighting how the clock control circuit 13 of FIG. 33 supplies the clock signals φ1L and φ2L to other function blocks within the microcomputer. This block diagram shows a microcomputer setup that illustratively takes the above-described clock processing into account. The single-chip microcomputer of FIG. 34 indicates in a representative manner the CPU 1, bus controller 3, interrupt controller 4, I/O ports IOP1 through IOP11 and timer 7, in addition to the clock control circuit 13 of FIG. 33. Reference characters NOV in each circuit block represent a non-overlapping signal generation circuit that generates non-overlapping two-phase clock signals on the basis of the input clock signal. The clock signal φB is fed to the non-overlapping signal generation circuits NOV for the CPU 1, bus controller 3 and interrupt controller 4 connected to the internal buses IAB and IDB shown in FIG. 1. The clock signal φS is supplied to the non-overlapping signal generation circuits NOV for the timer 7 and I/O ports IOP1 through IOP11 connected to the internal buses PAB and PDB depicted in FIG. 1. In addition, the non-overlapping two-phase clock signals φL1 and φL2 are given to the function blocks 1, 3, 4, 7 and IOP1 through IOP11. Each of the function blocks incorporates a selector SEL that selects as internal synchronizing clock signals either the two-phase clock signals φL1 and φL2, or the two-phase clock signals generated by the non-overlapping signal generation circuit NOV for the function block in question. The selector in the timer 7 performs its selection in accordance with the control bit setting illustratively established by the CPU 1 in the internal control register. Where the timer 7 comprises a plurality of channels, each channel may be assigned a control register and a selector SEL. The selectors SEL for the CPU 1, bus controller 3, interrupt controller 4 and I/O ports IOP1 through IOP11 have their selection status determined by the watch mode bit WM output by the clock control circuit 13.

When the watch mode bit WM is set to a logical "1" for the timer 7, all channels except for the designated one in the timer are placed in the module stopped state. Given the control bit setting, the designated channel of the timer 7 have its selector SEL select the clock signals φL1 and φL2. The clock signals are used illustratively to carry out timing operations for intermittent clock processing, whereby a timer interrupt signal is output at constant intervals. When the watch mode bit WM is set to a logical "1" for the CPU 1, bus controller 3, interrupt controller 4 and I/O ports IOP1 through IOP11, their selectors SEL select the clock signals φL1 and φL2. This causes these function blocks to operate in synchronism with the low-frequency clock signals φL1 and φL2 for clock purposes. The timer 7 generates an interrupt signal at constant intervals for clock processing, and the CPU 1 in response performs the clock processing intermittently. Turning on the watch mode bit WM stops the oscillating operation of the first clock pulse generator 12. Watch mode is released when the CPU 1 sets the watch mode bit WM to a logical "0."

The above-described embodiment of the invention and the examples associated therewith offer the following major benefits:

(1) Where the system clocks φS and φB are in use, the frequency division ratio of the system clock signal φB is made variable without letting the clock signal line capacity become excessive. With absolute reference clock signals ensured for the function blocks, the system clock signal φB is varied in frequency to lower the power dissipation of not only the bus masters but also the semiconductor integrated circuit as a whole. Reducing power dissipation diminishes unnecessary radiation (i.e., needless radio wave generation) as well.

(2) The system clock signal φS of a constant frequency is fed to the peripheral circuits such as the serial communication interface (SCI) and timer. Thus even where the frequency of the system clock signal φB to the CPU and the like is altered, the bit rate or baud rate of the SCI and the timing cycle of the timer are kept constant. Changing the operating frequency for the CPU and the like does not necessitate modifying the settings for the peripheral function blocks.

(3) The clock control circuit 13 has the register means 132 to which the bus masters may set information for selecting the frequency division ratio of the system clock signal φB. This arrangement allows the bus masters such as the CPU to select a desired frequency division ratio.

(4) The data bus structure is divided into two internal data buses: the internal data bus IDB to which the system clock signal φB is supplied and which connects with the function blocks such as the CPU; and the internal data bus PDB to which the system clock φS is fed and which connects with the function blocks acting as the bus slaves. That is, the function blocks such as the CPU and other bus masters frequently activating bus cycles are connected to a data bus separate from the one connected to the bus slaves. The arrangement lowers the burdens on the frequently accessed data bus and contributes to lowering power dissipation. Also, it is possible to speed up. When the data bus of relatively low access frequency has its preceding value held by the holding circuits HD1 and HD2, the number of times the data bus is charged and discharged is reduced, whereby power dissipation is diminished.

(5) The system clock signals φS and φB as one-phase clock signals are fed to the function blocks. In turn, the function blocks generate two-phase clock signals internally. This arrangement reduces the total clock signal line capacity and lowers power dissipation accordingly.

(6) Where pre-scaler clock signals are used, each function block generates internally a pre-scaler clock signal of a low frequency division ratio. A pre-scaler clock signal of a high frequency division ratio is generated for common use by function blocks. This arrangement diminishes power dissipation by minimizing the increase in logic scale and by preventing signals of large frequency changes from interfacing the function blocks.

(7) The interface signal directed from the bus slave to the bus master may illustratively be synchronized with the clock signal φ1S described with reference to FIGS. 20 and 23. This facilitates the interfacing arrangements.

(8) The internal status of the function blocks is retained, and the blocks that constantly receive clock pulses are restricted. Because signal changes are localized during operation, power dissipation is reduced. Where the clock signals are stopped, the fact that the internal status of the function blocks is retained diminishes the burdens on software when it comes to establishing necessary settings anew.

(9) The bus structure including the data bus is divided into a plurality of bus portions. Because signal changes are suppressed over the inactive internal buses thus divided, the capacity for the signal changed upon each operation is reduced, whereby power dissipation is lowered.

(10) An event detection circuit such as the interrupt controller is provided to detect information reflecting interruptions and signal changes at external terminals. When an event occurs, the frequency division ratio of the clock signal $\phi B$ is changed and/or the module stopped state is altered automatically in order to shorten the time interval from the time the event takes place until the necessary processing is carried out, whereby processing performance is improved. In establishing the settings for a desired change, the information in effect immediately before the change is saved illustratively into a stack and new information is loaded illustratively along with a vector.

(11) The clock signals corresponding to the signals $\phi S$ and $\phi B$ are arranged to be output to the outside. The output of these clock signals may be disabled by software. This arrangement makes it possible to use the clock signal $\phi S$ as a reference clock signal for an external semiconductor integrated circuit and the clock signal $\phi B$ as a control signal for the bus control circuit. If deemed unnecessary, the output of the clock signals is disabled so as to reduce power dissipation, lower coupling noise and diminish needless radiation.

Although the description above contains many specificities, these should not be construed as limiting the scope of the invention but as merely providing illustrations of the presently preferred embodiment of this invention. Many alternatives, modifications and variations will become apparent to those skilled in the art in light of the foregoing description.

For example, where the clock signals are made asymmetrical, the above-described embodiment is not limitative of the invention. That is, at any point in time where operation is not necessary, one clock signal may be brought High and the other Low to bring about the stopped state. This applies illustratively where the CPU enters a wait state. If all timing circuits are static circuits, the clock signals need not be asymmetrical. In that case, the clock signal $\phi B$ for medium-speed mode may be a clock signal having a duty factor of 50%.

In the embodiment above, the CPU writes and reads data to and from the clock control register. Alternatively, the content of the clock control register may be altered through external terminal settings. For example, an input through a predetermined terminal is used to change the initial settings of the clock control register. In that case, the following operations may be available: when a reset is effected with a specific terminal at the Low level, the system starts on a high-speed clock signal and later operates at low speed as per the CPU setting; or when a reset is effected with a particular terminal at the High level, the system starts on a low-speed clock signal and later operates at high speed in accordance with the CPU setting.

The bus timings may be altered in a detailed manner. In the above embodiment, the timings of the buses IAB and IDB are in phase with those of the buses PAB and PDB. Alternatively, the timings may be out of phase. The events may illustratively include an external bus release, among others. When the bus is released to the outside, it is possible automatically to place the bus masters in medium-speed mode or to bring the data transfer controller (DTC) into the module stopped state. The low power dissipation information given in the form of a vector is not limited to the eight-bit format; the information may be composed of a desired number of bits. There may be provided a plurality of dedicated read and/or write signals.

The constitution of the low power dissipation control register may be varied. Furthermore, the dynamic and static circuit structures may be modified as needed. For example, a static circuit may be constituted by a flip-flop circuit. The clock signals are not limited to non-overlapping two-phase signals; the clock signals may be signals of three or more phases or may come in an overlapping clock signal format. In such cases, the clock signals of a given phase are prolonged and those of other phases are shortened.

The above embodiment incorporates the data transfer controller (DTC) as its data transfer unit. Alternatively, the data transfer unit may be a DMA (direct memory access) controller (DMAC). That is, the DTC notations in the foregoing description may all be replaced by DMACs. These controllers need not be function blocks independent of the CPU; they may be implemented as an integral part of the CPU. In that case, each of the controllers may be called a micro DMA, a macro service or an intelligent I/O service. Any other function blocks making up the single-chip microcomputer described above are also not limitative of the invention. The number of function blocks and the method for designating the module stopped state for each block may be altered as desired.

Although the description above has dealt primarily with the field of single-chip microcomputers constituting the technical background of the inventors, this kind of microcomputer is not limitative of the invention. The invention may also be applied to other semiconductor integrated circuits each making up at least a system operating in synchronism with a clock signal.

To sum up, the major advantages provided by the invention disclosed herein are as follows:

(1) The second system clock signal ($\phi S$) of a constant frequency is supplied commonly to a plurality of function blocks, whereas the first system clock ($\phi B$) whose frequency division ratio is selectable and whose frequency is lower than that of the second system block is fed to other predetermined function blocks. This setup allows each of the function blocks fed with the first system clock ($\phi B$) to change its operation frequency depending on the status of the function block in question, whereby power dissipation is reduced. In this case, the operation speed of the multiple function blocks operating in synchronism with the second system clock signal ($\phi S$) remains unchanged even as the frequency of the first system clock signal is varied. It follows that when power dissipation is controlled by altering the frequency of the first system clock signal, there is no need to set anew the operating conditions of the function blocks running in synchronism with the second system clock signal ($\phi S$).

(2) The function blocks to which the first system clock signal is fed via the first clock signal line are regarded as bus masters. Such bus masters are thus supplied with a system clock signal whose frequency division ratio is variable. In a data processor such as a microcomputer, the CPU acting as a bus master frequently activates bus cycles in which instructions and data are fetched mostly. Because the CPU turns on bus cycles frequently, a decrease in the frequency division ratio of the clock signal contributes to lowering power dissipation.

(3) The function blocks to which the second system clock signal is fed via the second clock signal line are regarded as bus slaves. Where the frequency of the system clock signal for the bus masters is changed, this arrangement keeps constant the bit rate or baud rate for the serial communication interface, the timing cycle of the timer and other related settings. Thus there is no need for design changes to be made on these peripheral function blocks.

(4) The single-chip microcomputer adopts the register means (132) to which the bus masters are allowed to set information for selecting the frequency division ratio of the first clock signal ($\phi$B). This allows the bus masters such as the CPU to select a desired division ratio.

(5) When the function blocks such as the CPU that frequently starts bus cycles are connected to a data bus different from the one to which the bus slaves are connected, the burdens on the frequently accessed data bus are reduced. That reduces power dissipation. For the data bus whose access frequency is relatively low, the data over that data bus is retained by the holding circuits. That in turn reduces the number of times the data bus is charged and discharged, whereby power dissipation is further lowered correspondingly.

(6) The non-overlapping two-phase clock signals generated on the basis of the first and the second system clock signal are arranged partially to coincide in phase. In synchronism with the timings of the coinciding phases, any of the function blocks fed with the second system clock signal may change the signal to be sent to any of the function blocks to which the first system clock signal is supplied (i.e., function blocks whose operation speed is made relatively low). This arrangement facilitates the interface between the function blocks utilizing system clock signals of different frequencies. In other words, the design for interface timing is made easier.

(7) In another arrangement, the non-overlapping two-phase clock signals are also generated on the basis of the first and the second system clock signal. Of these non-overlapping two-phase clock signals, the first-phase clock signals share phases in which Low-level periods coincide and the second-phase clock signals share phases in which High-level periods coincide. Whether the input and output of each function block are synchronized with the first or the second-phase clock signal, this arrangement makes it possible to secure a time period equivalent to at least one cycle of the second system clock signal ($\phi$S), from the time data is output across function blocks whose system clock signals are different, until the output data is admitted and latched. The arrangement thus facilitates the interface between the function blocks utilizing system clock signals of different frequencies. In other words, the design for interface timing is also made easier.

(8) There are also provided output circuits for selectively outputting the first system clock signal ($\phi$B) and second system clock signal ($\phi$S) to the outside. When the outputs from such output circuits are not selected, the clock input lines of these circuits are forcibly set to a predetermined level. With this arrangement in use, the clock input lines are prevented from getting charged or discharged when the system clock signals need not be output to the outside, whereby power dissipation is reduced.

(9) In each of the function blocks, the generation of internal clock signals may be suppressed individually. The arrangement makes it possible to stop the change of internal clock signals in the inactive function blocks inside. This reduces power dissipation stemming from the currents being charged and discharged when the clock signals are changed unnecessarily. The fact that the internal status is retained while the internal clock signals are being stopped eliminates the need for setting anew the internal circuits when the signals are reactivated.

(10) In another arrangement, when the operation of any function block is not selected, power dissipation is reduced by suppressing the generation of internal timing signals for the internal circuits of the function block in question. Because the internal status of the block is retained when the function block operation is unselected with any change of the internal timing signals being stopped, the internal circuits of the function block need not be set anew when their operation is resumed.

(11) The circuits activated upon receipt of the non-overlapping two-phase internal timing signals are composed of two circuits: a dynamic circuit operating dynamically on receiving the first-phase timing signal, and a static circuit which is connected serially to the dynamic circuit and which operates upon receipt of the second-phase timing signal. Of the non-overlapping two-phase timing signals, the timing signal having the phase with the greater duty factor is supplied to the dynamic circuit; the timing signal having the phase with the smaller duty factor is fed to the static circuit. This arrangement relatively shortens the latch time and widens the range of frequency reductions even where the time for the dynamic circuit to hold its output load capacity is finite. Compared with the case where both circuits are static latch circuits, the arrangement reduces the physical scale of the circuits involved.

(12) The frequency of the first system clock signal is set forcibly upon event detection. When a specific event occurs, the selected state of the system clock signal frequency is forcibly set to a predetermined state (e.g., the highest frequency selected state) regardless of the currently established frequency of the system clock signal being low. This feature shortens the time that elapses upon occurrence of an event before the appropriate processing of that event is carried out.

(13) In another arrangement, a predetermined storage area (MSME) is updated to a specific value when a particular event occurs, whereby the system clock signal frequency is forcibly set. This arrangement simplifies the process of forcibly setting the system clock signal to a specific frequency.

(14) Upon returning from the exception handling that the CPU was requested to perform at the time of an event, the CPU restores the predetermined storage area (MSME) to a predetermined value. This arrangement eliminates the need for saving and restoring the values of the storage areas (CKS1, CKS2) containing information for designating signal frequencies selectively.

(15) Where the function block receiving the system clock signal with its frequency forcibly set is a data transfer controller other than the one for the CPU, the data transfer controller requested to perform exception handling at the time of an event outputs a signal designating the end of the ongoing exception handling. When this arrangement restores the specific storage area (MSME) to a predetermined value, the original system clock signal is restored without subjecting the CPU or software to extra burdens.

(16) Each function block has the register means (133) for retaining in an updatable manner the information for inhibiting the generation of internal clock signals within the block. When a specific event (e.g., reset) takes place, the register means is initialized to the state that inhibits the generation of the internal clock signals. This arrangement reduces power dissipation in the initial state brought about upon occurrence of specific events such as reset.

(17) Control information paired with vectors such as interrupt vectors is utilized forcibly to change the frequency of the system clock signal. This arrangement makes it possible to establish finely classified low power dissipation-oriented settings depending on the event type.

(18) Where control information is paired with vectors such as interrupt vectors, the detection of an event requires utilizing specific control information paired with the vector relevant to that event. In that case, the current low power dissipation control information is saved before it would be erased by the information-vector pair. In this manner, the power control state is restored to what it was immediately before the event once the requested exception handling is completed.

(19) Pre-scaler clock signals of low frequency division ratios which could conventionally be generated by a pre-scaler are not supplied thereby but generated individually by a frequency divider in each function block. This arrangement requires less power dissipation than the conventional setup wherein a pre-scaler directly feeds a plurality of function blocks with clock signals of low frequency division ratios.

What is claimed is:

1. A semiconductor integrated circuit comprising:

A first function block opening in accordance with a first supplied system clock signal;

a plurality of second function blocks operating in accordance with a second supplied system clock signal;

a clock control circuit receiving a predetermined clock signal and including a clock signal generation circuit operating with a variable frequency division ratio and generating a first system clock signal by dividing the predetermined clock signal;

a first clock signal line for supplying the first system clock signal as the first supplied system clock signal to the first function block; and a second clock signal line for commonly supplying the second function blocks with a second system clock signal having a second frequency as the second supplied system clock signal, the second system clock signal being generated on the basis of the predetermined clock signal.

2. A semiconductor integrated circuit according to claim 1, further comprising a bus connected to the first function block and to the second function blocks, wherein the first function block operates as a bus master.

3. A semiconductor integrated circuit according to claim 2, wherein the second function blocks operate as bus slaves.

4. A semiconductor integrated circuit according to claim 3, wherein the clock control circuit includes a register for retaining information for determining the frequency division ratio, and wherein the first function block loads the information into the register.

5. A semiconductor integrated circuit according to claim 3, wherein the bus includes a first internal data bus to which the first function block is connected and a second internal data bus to which the second function blocks are connected, and wherein the semiconductor integrated circuit further comprises a bus controller for connecting the first internal data bus to the second internal data bus when the bus master accesses one of the bus slaves.

6. A semiconductor integrated circuit according to claim 5, further comprising holding circuits connected to the second internal data bus, the holding circuits retaining status of the second internal data bus when an output of one of the second function blocks is in a high impedance state, the holding circuits further allowing the status to be changed in accordance with data to be either written to or read from the second internal data bus by one of the second function blocks.

7. A semiconductor integrated circuit according to claim 3, wherein the first function block includes a non-overlapping signal generation circuit for generating non-overlapping first two-phase clock signals on the basis of the first system clock signal;

wherein the second function blocks include a non-overlapping signal generation circuit for generating non-overlapping second two-phase clock signals on the basis of the second system clock signal; and wherein the first two-phase clock signals and the second two-phase clock signals have phases with a defined phase relationship therebetween, wherein, data to be fed to the first function block is changed in synchronism with the defined phase relationship.

8. A semiconductor integrated circuit according to claim 3, wherein the first function block includes a non-overlapping signal generation circuit for generating non-overlapping first two-phase clock signals on the basis of the first system clock signal;

wherein the second function blocks include a non-overlapping signal generation circuit for generating non-overlapping second two-phase clock signals on the basis of the second system clock signal; and wherein the low-level periods of a first one of the first two-phase clock signals coincide with those of a first one of the second two-phase clock signals, and the high-level periods of a second one of the first two-phase clock signals coincide with those of a second one of the second two-phase clock signals.

9. A semiconductor integrated circuit according to claim 3, further comprising:

external terminals;

an output circuit connected interposingly between the external terminals and the clock signal lines, the output circuit outputting clock signals of the clock signal lines selectively to the external terminals; and a logic circuit for receiving the first system clock signal and the second system clock signal and for supplying either the first system clock signal or the second system clock signal to the clock signal lines when either the first system clock signal or the second system clock signal is to be output from the external terminals, the logic circuit setting fixedly the clock signal lines to a predetermined potential when the output circuit disables the output of clock signals to the external terminals.

10. A semiconductor integrated circuit comprising:

a plurality of function blocks having a clock signal generation circuit coupled to receive predetermined clocks and for generating internal clock signals of a plurality of phases and operating in accordance with the internal clock signals; and register means provided in common to the function blocks, the register means retaining control information corresponding to each of the function blocks for controlling selection of the corresponding function block;

wherein the clock signal generation circuit includes a control circuit for selectively disabling the generation of the internal clock signals and outputting a signal of a predetermined state in accordance with the corresponding control information.

11. A semiconductor integrated circuit according to claim 10, wherein each function block includes an internal timing signal generation circuit for generating internal timing signals on the basis of the internal clock signals of a plurality of phases when the function block is selected, the internal timing signal generation circuit including a control circuit for limiting the internal timing signals to a predetermined state when the function block is unselected.

12. A semiconductor integrated circuit according to claim 11, wherein the internal timing signals are non-overlapping two-phase timing signals; and wherein the function blocks each include a dynamic circuit and static circuit, the dynamic circuit operating dynamically in accordance with a first one of the two-phase timing signals, the static circuit being connected serially to the dynamic circuit and operating statically in accordance with a second one of the two-phase timing signals.

13. A semiconductor integrated circuit comprising:

a first function block for performing first processing and exception handling in accordance with a first system clock signal;

an event detection circuit for outputting, upon detection of an event, a request signal requesting the first function block to execute exception handling;

second function blocks for generating events; and a control circuit for changing the frequency of the first system clock signal and setting the first system clock signal to a predetermined frequency in response to the request signal.

14. A semiconductor integrated circuit according to claim 13, wherein the control circuit includes;

register means having a first and a second storage area; and a selector for receiving a plurality of clock signals of different frequencies including the predetermined frequency, the selector outputting the clock signal of the predetermined frequency as the first system clock signal when the first storage area of the register means is placed in a first state, the selector further outputting one of the plurality of clock signals as the first system clock signal in accordance with information held in the second storage area when the first storage area of the register means is placed in a second state.

15. A semiconductor integrated circuit according to claim 14, wherein the first function block includes a central processing unit for placing the first storage area of the register means in the second state upon returning from the exception handling.

16. A semiconductor integrated circuit according to claim 14, wherein the first function block comprises a data transfer controller for outputting an end signal when the exception handling is completed, the end signal causing the first storage area of the register means to be placed in the second state.

17. A semiconductor integrated circuit according to claim 13, wherein each of the second function blocks includes a clock signal generation circuit for generating internal clock signals on the basis of a second system clock signal having a predetermined frequency, the second function blocks operating in accordance with the internal clock signals; and wherein the semiconductor integrated circuit further comprises second register means for retaining control information for controlling the clock signal generation circuit generating the internal clock signals, the second register means being loaded with information for inhibiting the clock signal generation circuit from generating the internal clock signals in response to the detection of an event by the event detection circuit.

18. A semiconductor integrated circuit according to claim 13, wherein the event detection circuit operates in accordance with the first system clock signal.

19. A semiconductor integrated circuit comprising:

a central processing unit wherein in response to a request for exception handling, the central processing unit retrieves information from a vector area in a memory corresponding to the requested exception handling, the central processing unit operating in accordance with a first system clock signal;

an event detection circuit for detecting an event and outputting an exception handling request to the central processing unit;

first register means for retaining information for designating the frequency of the first system clock signal;

peripheral circuits each including a clock signal generation circuit for generating internal clock signals on the basis of a second system clock signal, the peripheral circuits operating in accordance with the internal clock signals; and second register means for retaining information for controlling the clock signal generation circuit generating the internal clock signals in each of the peripheral circuits;

wherein the information to be loaded into the first and second register means upon request for exception handling is retained in an area in the memory corresponding to the vector area, wherein the information is retrieved from the area in the memory corresponding to the vector area and loaded into the first and the second register means when exception handling is requested.

20. A semiconductor integrated circuit according to claim 19, wherein the central processing unit saves into a stack area of the memory information retained in the first and the second register means prior to the exception handling request, wherein after the exception handling request the information is retrieved from the area in the memory corresponding to the vector area and loaded into the first and said second register means.

21. A semiconductor integrated circuit according to claim 19, wherein the event detection circuit operates in accordance with the first system clock signal.

22. A semiconductor integrated circuit having a plurality of function blocks operating in accordance with a system clock signal, the semiconductor integrated circuit comprising:

a clock signal generation circuit generating the clock signal; and a pre-scaler generating a first clock signal by dividing the clock signal by a frequency division ratio greater than a first frequency division ratio, the first clock signal being fed via clock signal lines to at least two function blocks within the plurality of function blocks;

wherein one or more of the plurality of function blocks include a frequency divider for dividing the clock signal by a frequency division ratio smaller than the first frequency division ratio.

23. A semiconductor integrated circuit, comprising:

a CPU operating in response to a first clock signal;

a plurality of peripheral modules operating in response to a second clock signal commonly supplied to each of the plurality of peripheral modules; and a clock controller receiving a predetermined clock signal, wherein the clock controller variably divides the predetermined clock signal to generate the first clock signal having a variable frequency in response to control information in a register, wherein the clock controller generates the second clock signal having a frequency based on the predetermined clock signal;

wherein the frequency of the first clock signal is varied while the frequency of the second clock signal is not varied.

24. The semiconductor integrated circuit of claim 23, wherein the control information in the register is changed by the CPU.

25. The semiconductor integrated circuit of claim 23:

wherein the CPU includes a non-overlapping signal generation circuit for generating non-overlapping first two-phase clock signals on the basis of the first clock signal;

wherein the plurality of peripheral modules each include a non-overlapping signal generation circuit for generating non-overlapping second two-phase clock signals on the basis of the second clock signal; and wherein the first two-phase clock signals and the second two-phase clock signals have phases with a defined phase relationship therebetween, wherein, data to be fed to the CPU is changed in synchronism with the defined phase relationship.

26. The semiconductor integrated circuit of claim 23, wherein each peripheral module includes an internal timing signal generation circuit generating internal timing signals of a plurality of phases on the basis of the second clock signal when the peripheral module is selected, wherein the internal timing signal generation circuit includes a control circuit for limiting the internal timing signals to a predetermined state when the peripheral module is unselected.

27. The semiconductor integrated circuit of claim 26, wherein the internal timing signals comprise non-overlapping two-phase timing signals; and wherein each peripheral module includes a dynamic circuit and a static circuit, wherein the dynamic circuit operates dynamically in accordance with a first one of the two-phase timing signals, wherein the static circuit is connected serially to the dynamic circuit and operates statically in accordance with a second one of the two-phase timing signals.

28. The semiconductor integrated circuit of claim 23, wherein the CPU performs first processing and exception handling in accordance with the first clock signal, the semiconductor integrated circuit further comprising an event detection circuit for outputting, upon detection of an event, a request signal requesting the CPU to execute exception handling and a control circuit for varying the frequency of the first clock signal in response to the request signal.

29. The semiconductor integrated circuit of claim 28, wherein the first clock signal has a first frequency when the CPU perform first processing, wherein, in response to the event detection, the control information in the register is changed to control information for the detected event, wherein the first clock signal has a second frequency during exception handling, wherein, in response to completion of the exception handling, the control information is restored in the register, wherein the first clock signal has the first frequency after completion of the exception handling.

* * * * *